(12) United States Patent
Bailey et al.

(10) Patent No.: US 7,564,208 B2
(45) Date of Patent: Jul. 21, 2009

(54) ELECTRONICALLY CONTROLLED ELECTRIC MOTOR

(75) Inventors: James L. Bailey, Draper, UT (US); Kyle J. Bunch, Salt Lake City, UT (US)

(73) Assignee: Xidem, Inc., Panola, TX (US)

( * ) Notice: Subject to any disclaimer, the term of this patent is extended or adjusted under 35 U.S.C. 154(b) by 0 days.

(21) Appl. No.: 11/782,541

(22) Filed: Jul. 24, 2007

(65) Prior Publication Data

US 2008/0067965 A1 Mar. 20, 2008

Related U.S. Application Data

(63) Continuation of application No. 10/612,602, filed on Jul. 1, 2003, now Pat. No. 7,248,006.

(60) Provisional application No. 60/393,134, filed on Jul. 1, 2002.

(51) Int. Cl.
*G05B 19/10* (2006.01)
(52) U.S. Cl. .................. 318/567; 318/569; 318/600
(58) Field of Classification Search ................. 318/567, 318/569, 600, 634, 783; 388/907.5, 934
See application file for complete search history.

(56) References Cited

U.S. PATENT DOCUMENTS

| | | | | |
|---|---|---|---|---|
| 4,642,759 A | * | 2/1987 | Foster | ........................ 703/24 |
| 4,692,759 A | * | 9/1987 | Phan Van Cang | ........... 345/545 |
| 2004/0174270 A1 | * | 9/2004 | Choi | ..................... 340/870.02 |

* cited by examiner

*Primary Examiner*—Karen Masih
(74) *Attorney, Agent, or Firm*—Morgan, Lewis & Bockius LLP; Steven D. Underwood

(57) ABSTRACT

A system for controlling an electric motor comprises, in one embodiment, an encoder; a central processor in communication with said encoder; a module processor in communication with said central processor; feedback circuitry in communication with said module processor, wherein said encoder is an electronic device that provides rotor and stator positional information to said central processor, and further comprising a user interface in communication with said central processor, wherein said user interface enables a user to select preferred operational parameters for an electric motor. Another embodiment comprises a method for controlling an electric motor, comprising: determining rotor position based on data received from an encoder; determining how to energize stator coils; directing a power module to provide appropriate current to appropriate coils; and monitoring rotor response, wherein determining how to energize stator coils comprises consulting a look-up table.

14 Claims, 57 Drawing Sheets

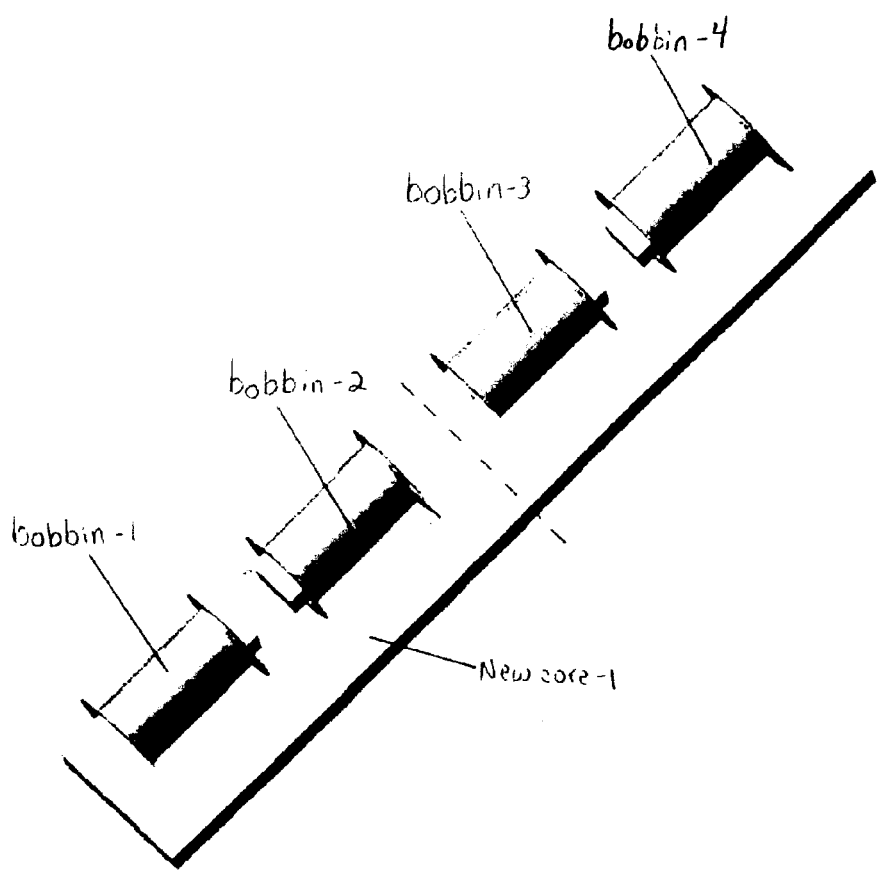

Comparison of the efficiency of the OEM vs. a conventional 3-phase motor with a transmission.

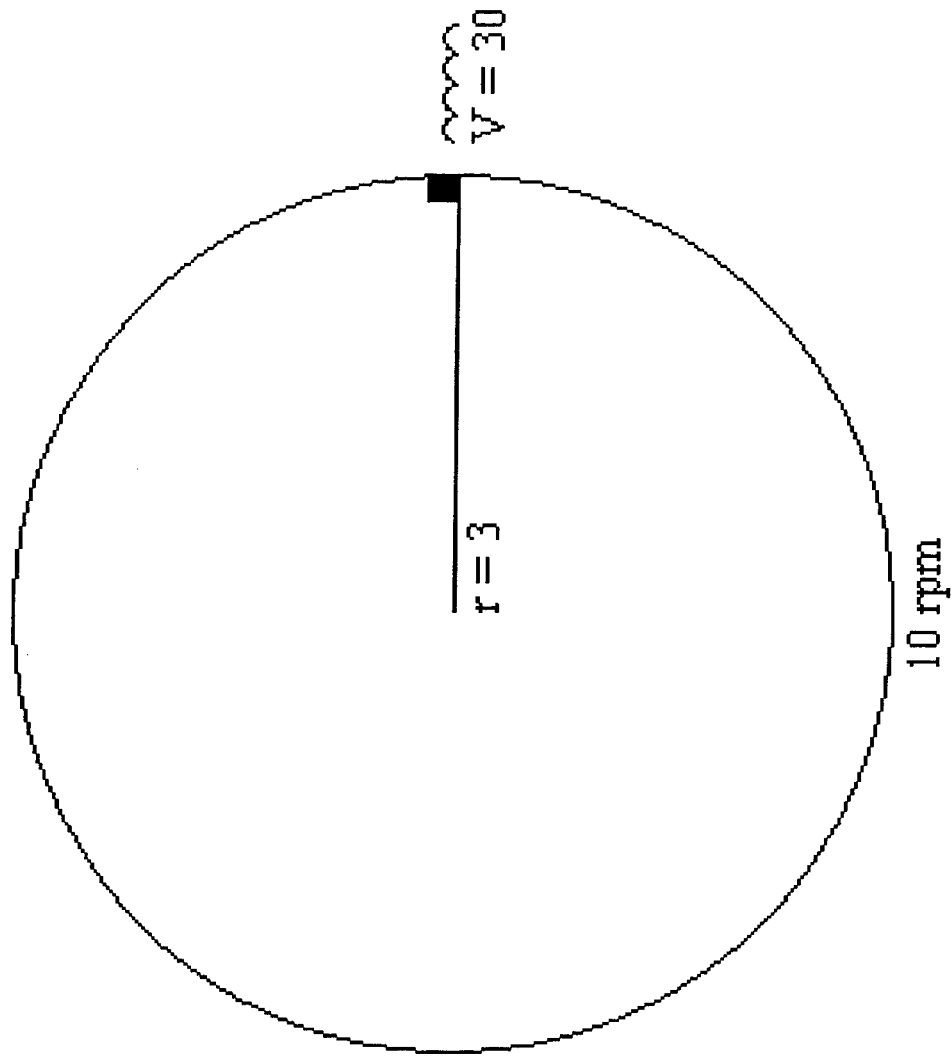
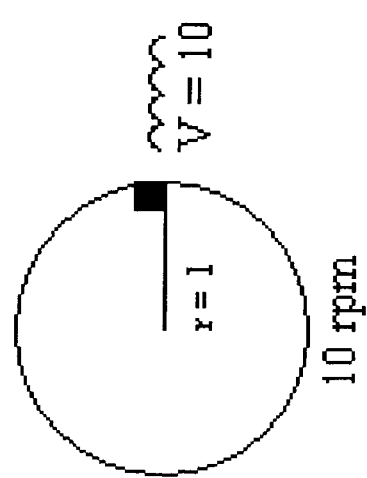
FIG. 44

ELECTRONICALLY CONTROLLED ELECTRIC MOTOR

CROSS-REFERENCE TO RELATED APPLICATIONS

This application is a continuation application of U.S. patent application Ser. No. 10/612/602, filed Jul. 1, 2003, now U.S. Pat. No. 7,248,006, which claims priority to U.S. provisional patent application No. 60/393,134, filed Jul. 1, 2002, entitled "Electronically Controlled Permanent Magnet Motor," the contents of which are incorporated herein in their entirety by reference.

BACKGROUND

Conventional wisdom holds that electrical motors and generators are mature and that their efficiency can improve only incrementally. The truth is that these machines operate with 90-99% efficiency near their rated speed and load but with much lower efficiency when the speed or load varies from the rated values.

In a conventional electric motor, the maximum rotor speed and torque required by the application determine the key design parameters. The motor typically performs optimally only in a narrow speed-torque band centered close to the maximum steady-state speed and torque. Performance drops off when the motor must supply an intermittent burst, when the motor needs to deliver only a small fraction of its rated torque or power, or when it runs at low speed. Indeed, the specification sheets for power motors typically do not specify torque-efficiency performance for rotor speeds below about 1500 RPM, since motor performance degrades precipitously at those speeds.

Consequently, a diverse range of motor designs has evolved in the art, with each design optimized to serve a narrow set of applications. For example, a three-phase AC motor can drive a conveyor belt in a factory with close to 99% efficiency if the belt starts up once per shift and carries a nearly constant load. In practice, however, many applications require frequent starts and stops and encounter a wide range of loads. Therefore, a motor's efficiency rarely remains consistently high under real world operating conditions.

Use of electric motors to power electric vehicles (EVs) became somewhat more practical when engineers began replacing DC motors (which usually require brushes to make electrical contact with the spinning rotor) with three-phase AC motors. Since then, efforts have focused on improving the inverter that converts stored DC power into three-phase AC power to drive the motor. The inverter must also vary the frequency of the three-phase power to control the motor speed effectively. The Partnership for a Next Generation of Vehicles, a joint R&D effort between government and industry, has identified the inverter as a key technical obstacle to commercializing EVs at a reasonable price. The preferred motor design of the present invention eliminates the need for an external inverter—the inverter is integrated into individual coil modules.

In a conventional three-phase induction motor (3PIM), three sinusoidally varying currents 120° apart drive three electromagnets that comprise the stator, the part of the motor that remains fixed in place. Together these electromagnets create a strong primary magnetic field whose direction spins like the hour hand of a clock. This rotating field induces currents in the windings of the rotor (the part of the motor that spins) that in turn create a reactive magnetic field, which tries to align itself with the primary field by twisting the rotor. The rotor spins continuously, lagging behind the stator field. Each motor operates most efficiently at some design-specific combination of speed and torque that optimizes the rate at which the rotor slips a full rotation behind the stator field (the "slip rate"). Lower speeds induce a smaller secondary field and hence generate lower torque; in addition, at lower speeds the rotor slips more frequently, reducing energy transfer to the rotor and increasing dissipation (loss of energy as heat). A 3PIM becomes an adjustable speed drive motor with the addition of an inverter, an expensive power module that generates three-phase AC power with adjustable frequency and amplitude from a DC supply to vary the speed of the motor. Reducing the frequency allows the motor to start up more gently and efficiently but also reduces the torque supplied. In general, varying the amplitude and frequency of the power provides some flexibility to tune motor operation, but cannot overcome the limitations inherent in the 3PIM's fixed number of poles and the geometric factors that determine the ideal angular velocity of the rotor relative to the stator field precession.

SUMMARY

The present invention comprises a novel electric motor that achieves high energy efficiency and high torque over a wide range of operating speeds and loads. The motor, in preferred embodiments, employs a novel multi-pole configuration together with a high performance embedded computer.

The present invention contemplates a system for controlling an electric motor that comprises, in one embodiment, an encoder; a central processor in communication with said encoder; a module processor in communication with said central processor; feedback circuitry in communication with said module processor, wherein said encoder is an electronic device that provides rotor and stator positional information to said central processor, and further comprising a user interface in communication with said central processor, wherein said user interface enables a user to select preferred operational parameters for an electric motor. Another embodiment of the invention comprises a method for controlling an electric motor, comprising: determining rotor position based on data received from an encoder; determining how to energize stator coils; directing a power module to provide appropriate current to appropriate coils; and monitoring rotor response, wherein determining how to energize stator coils comprises consulting a look-up table.

The preferred embodiment is referred to herein as a "digital electric motor" (DEM) because it relies on the processing power now available in inexpensive microcontrollers. The DEM is suitable for use in an electric vehicle and provides substantial benefits compared with a conventional three-phase AC motor and other prior art.

The DEM behaves somewhat like an entire family of electric motors, each optimized for a different speed/load combination, rolled into a single light-weight, cost-effective unit. A computer preferably dynamically reconfigures the magnetic energizing pattern of the motor stator coils on-the-fly as needed to accommodate sudden changes in load or speed.

Industrial applications for the present invention comprise transportation, power generation, power quality control, agriculture, and the military.

In one preferred embodiment, the present invention comprises an "intelligent" motor that:

detects and tracks the position of its rotor with resolution of at least ⅛th of a degree;

calculates rotation speed, load (torque), and power;

reconfigures itself dynamically in real-time to optimize the system for the current conditions;

runs smoothly and quietly;

when used in an electric vehicle, generates sufficient torque to accelerate a mid-sized passenger vehicle responsively; delivers sufficient power to maintain highway speeds; and operates efficiently under almost all rated conditions, thereby reducing power consumption and extending the range of the vehicle;

requires no external inverter;

saves significant power when driving industrial equipment;

allows greater flexibility in the operating conditions of electrical generation plants when operated as a generator;

is modular—i.e., parts can be replaced without removing the motor. Example modules are those comprising control electronics, transistors, H bridges, coils, and laminated cores, which can be replaced while the motor is attached to a vehicle; and/or provides redundancy. Soft failures can occur and the motor can "run through damage." For example, if the coil control electronics and transistors are damaged, the motor can still operate (but typically with lesser performance).

BRIEF DESCRIPTION OF THE DRAWINGS

FIG. 5 depicts a modified E-shaped stator coil of one embodiment.

FIG. 44 illustrates rpm/voltage/diameter advantages of a generator embodiment.

DETAILED DESCRIPTION OF PREFERRED EMBODIMENTS

Figure 20:
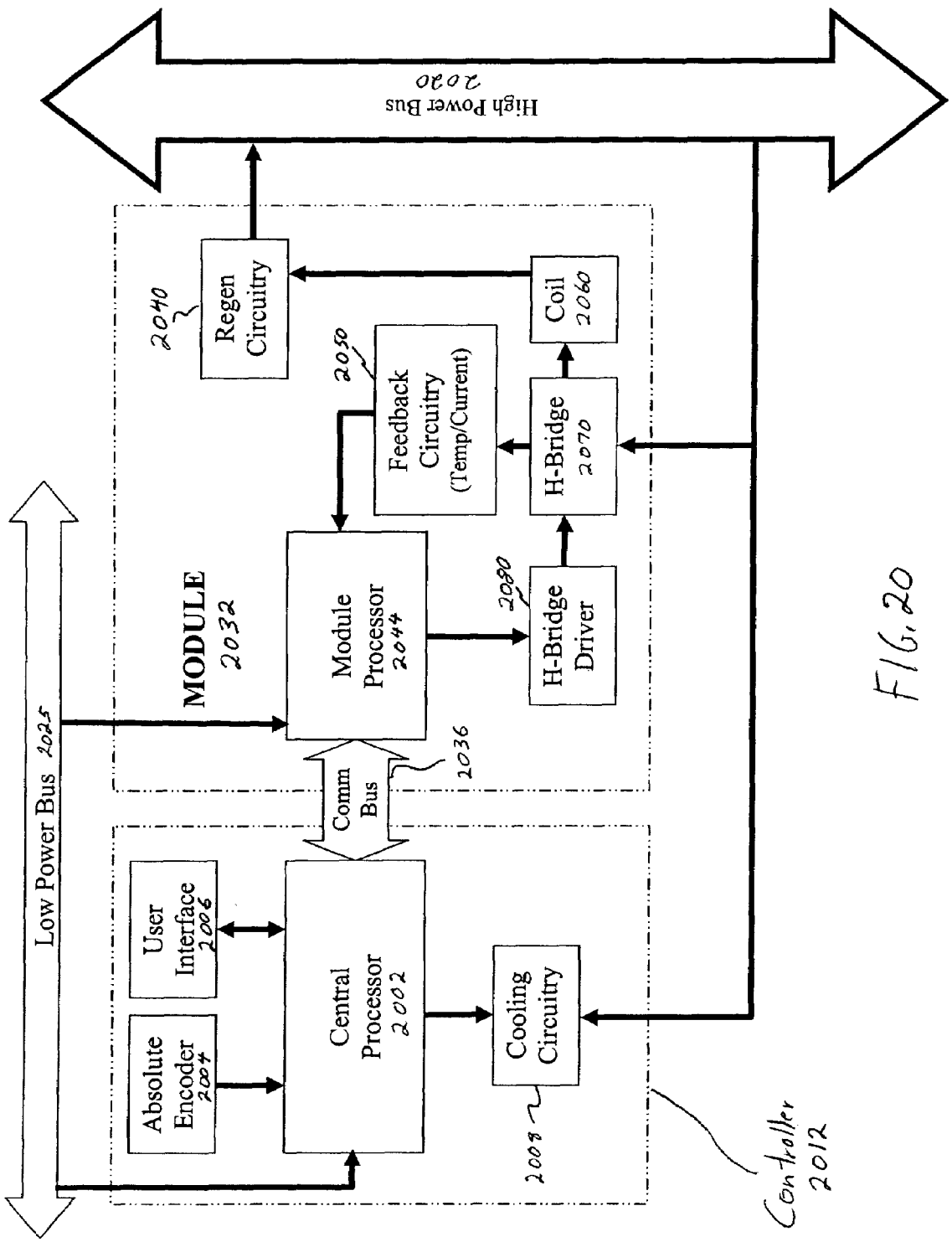
FIG. 20 depicts a module configuration of one embodiment, along with controller components.
Figure 21:
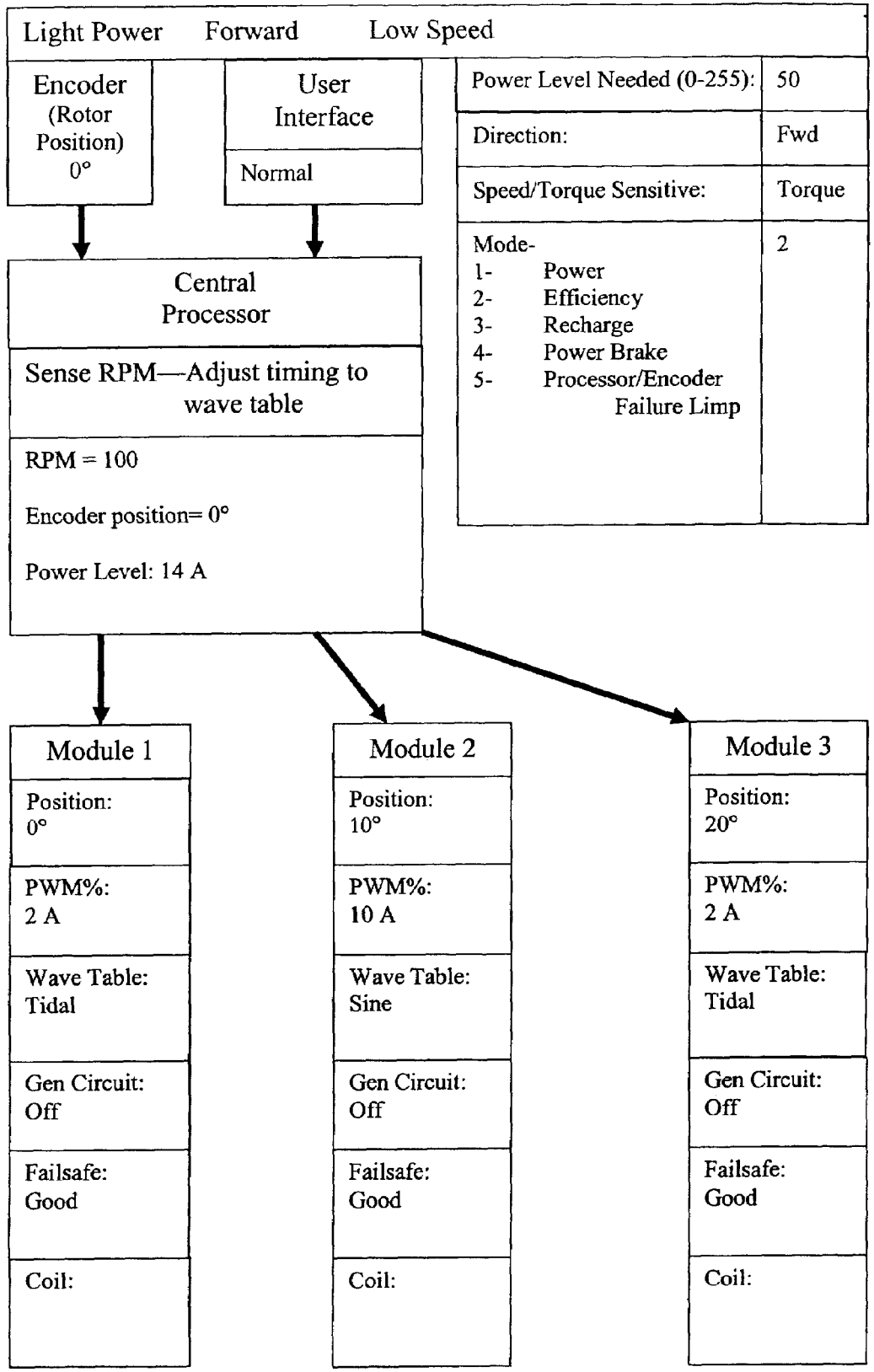
FIGS. 21-31 depict illustrative examples of controller operation of one embodiment.
Figure 22:
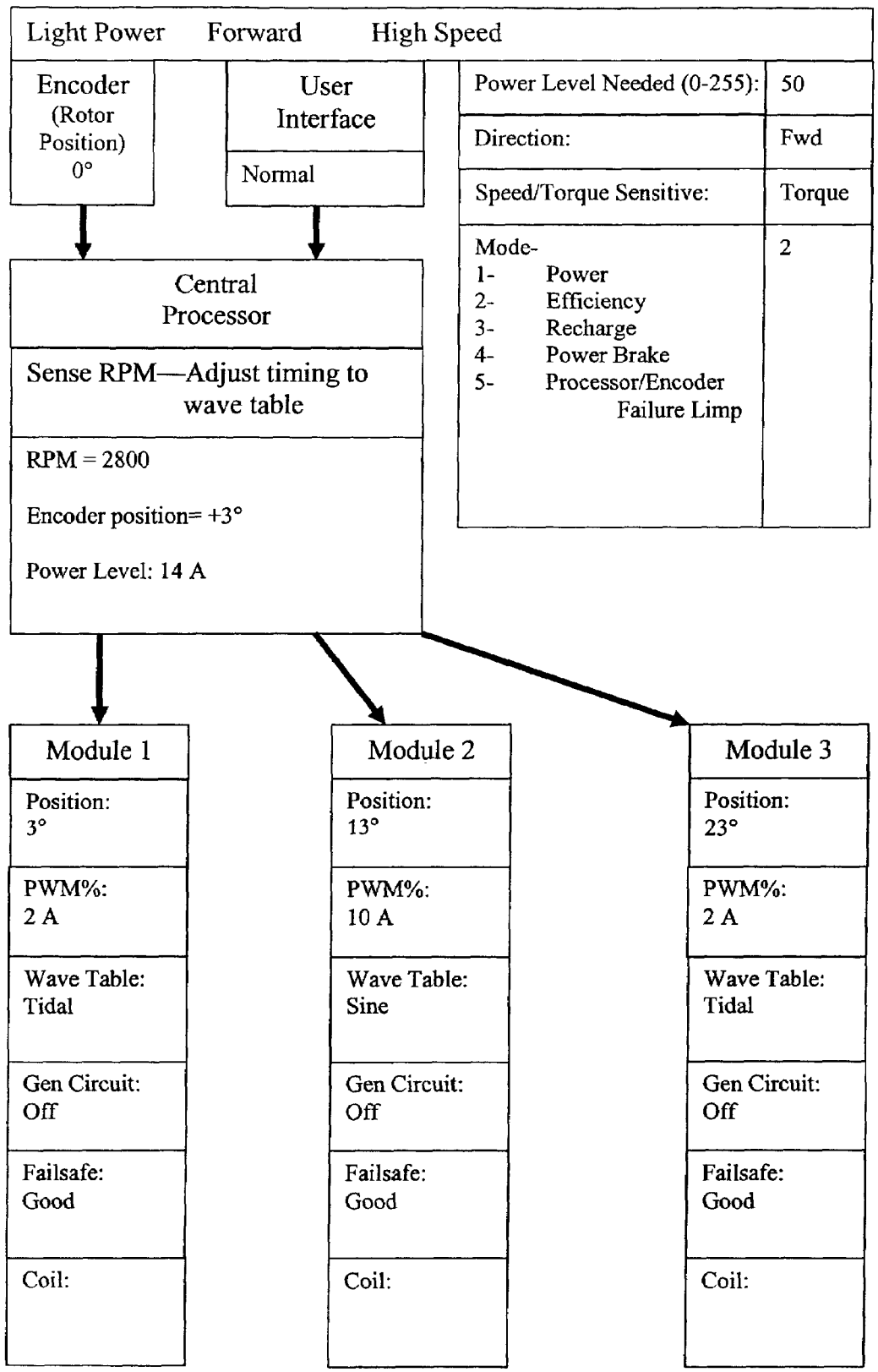
Figure 23:
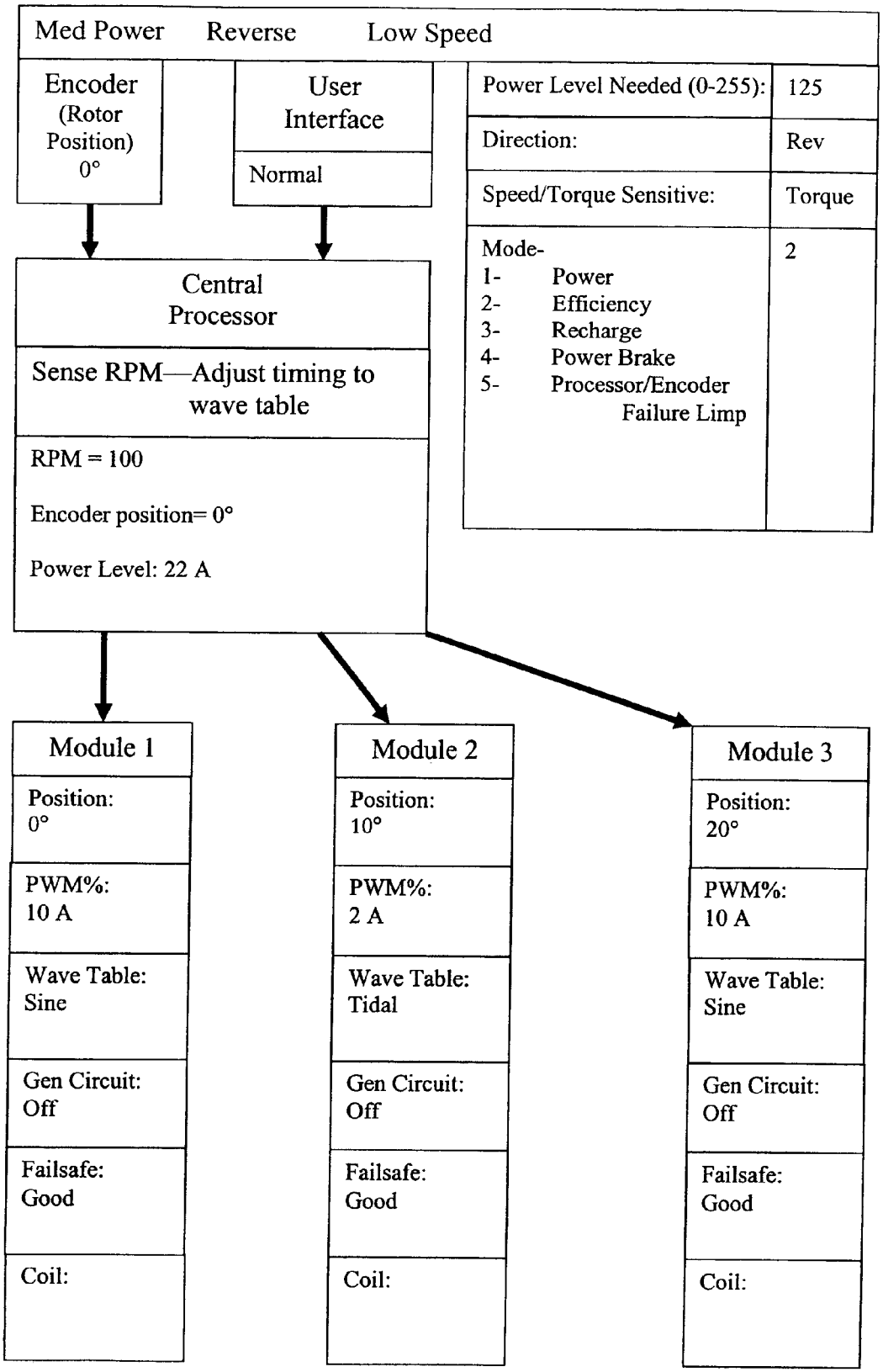
Figure 24:
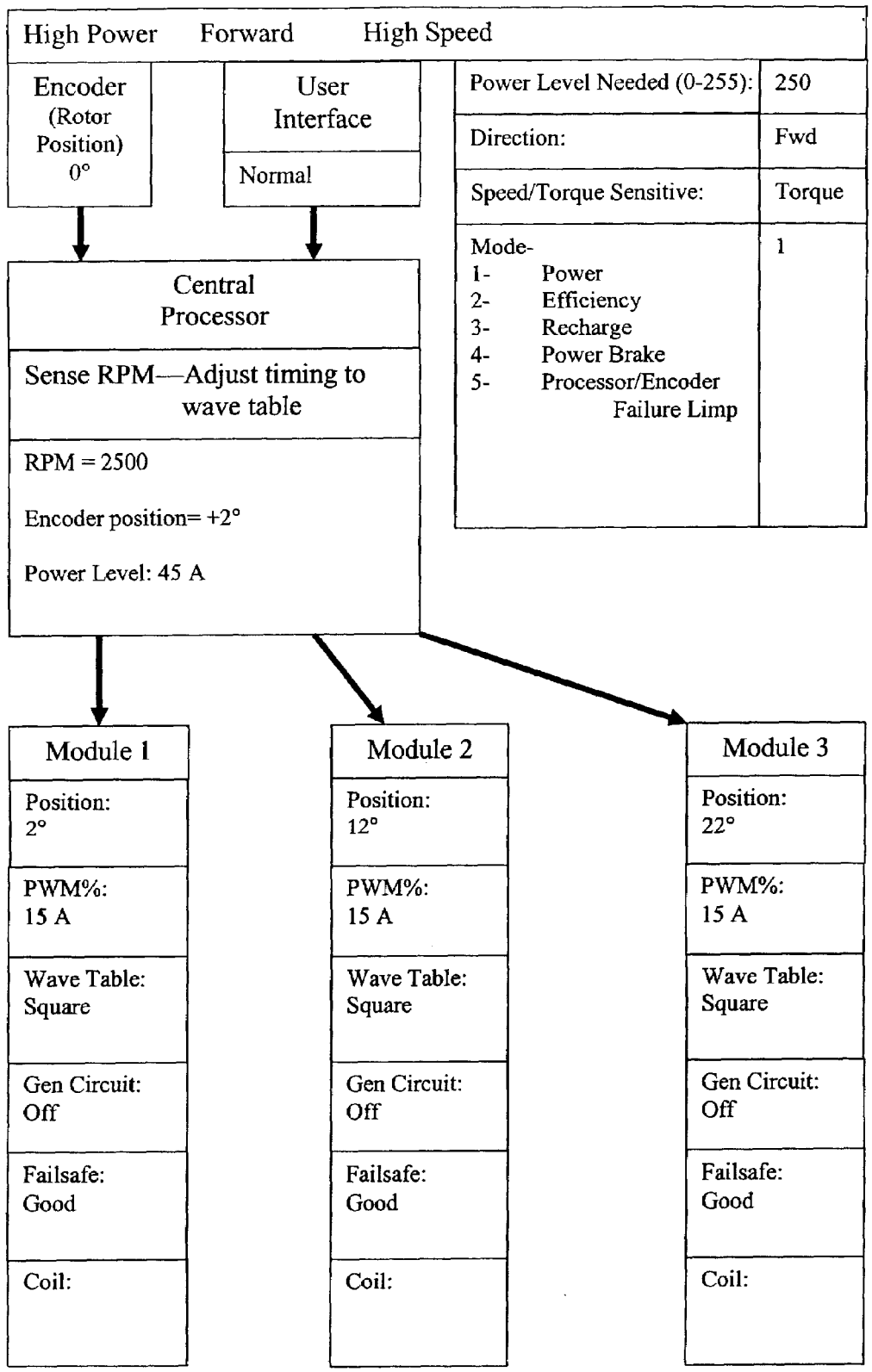
Figure 25:
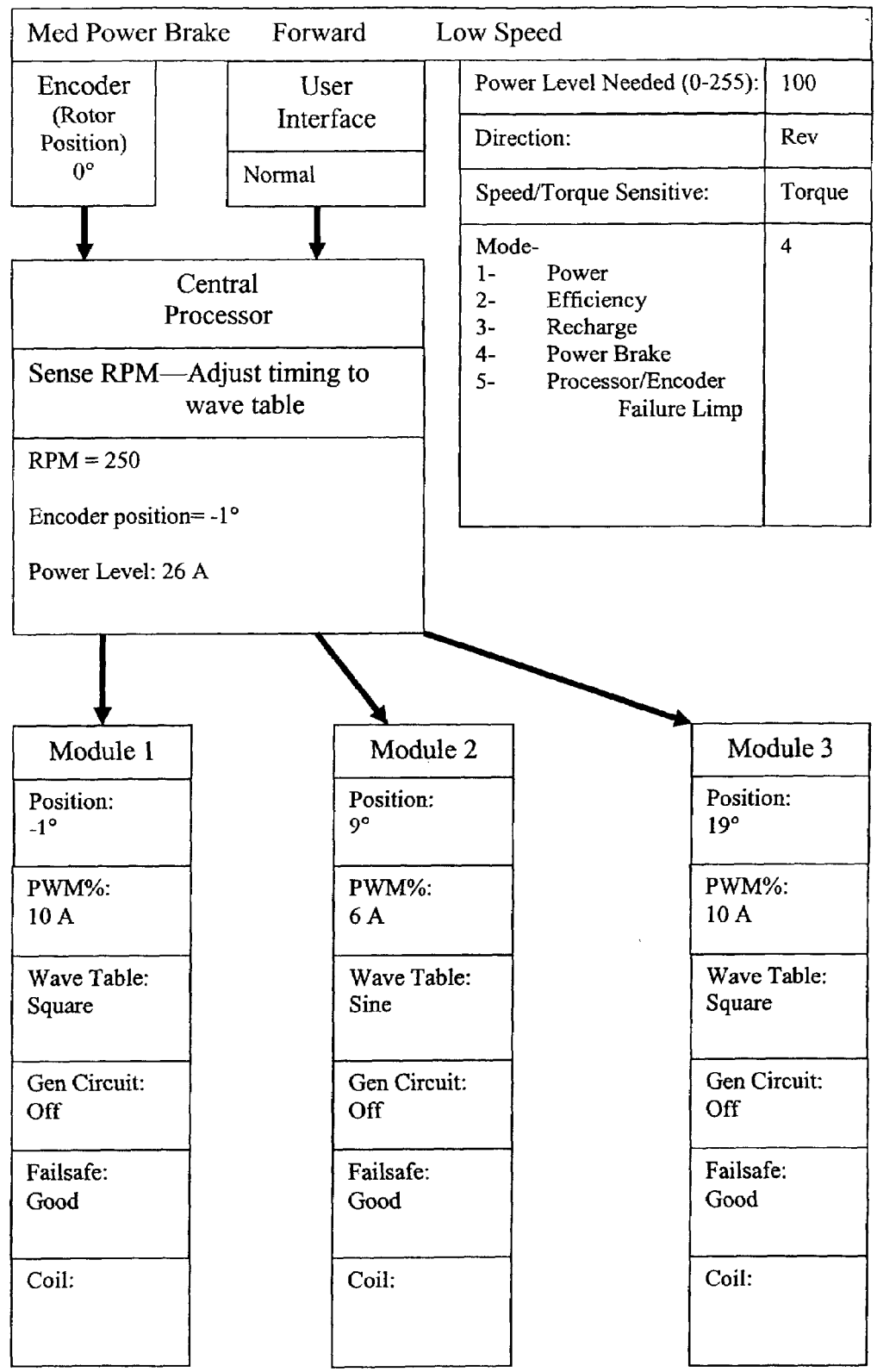
Figure 26:
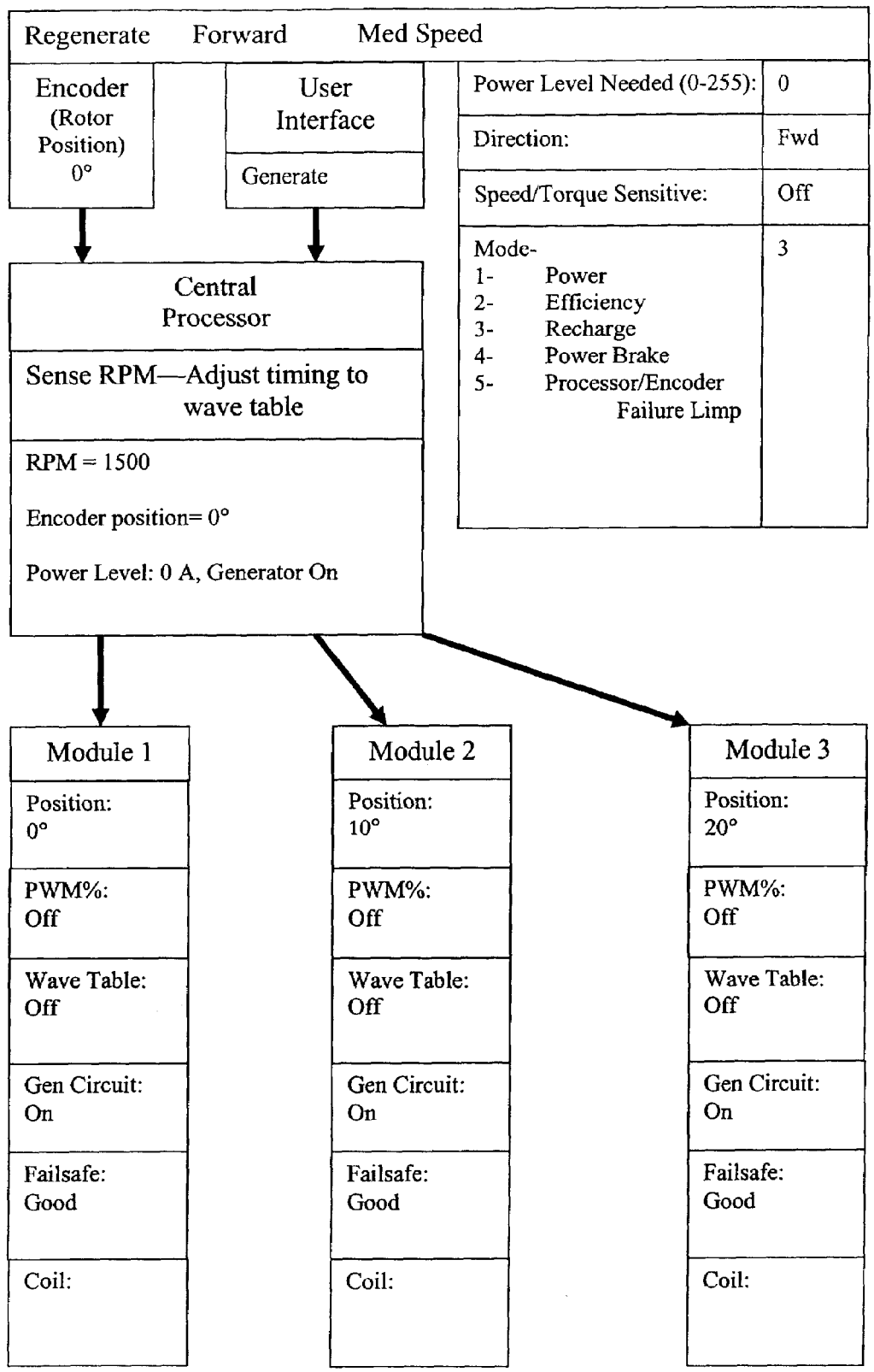
Figure 27:
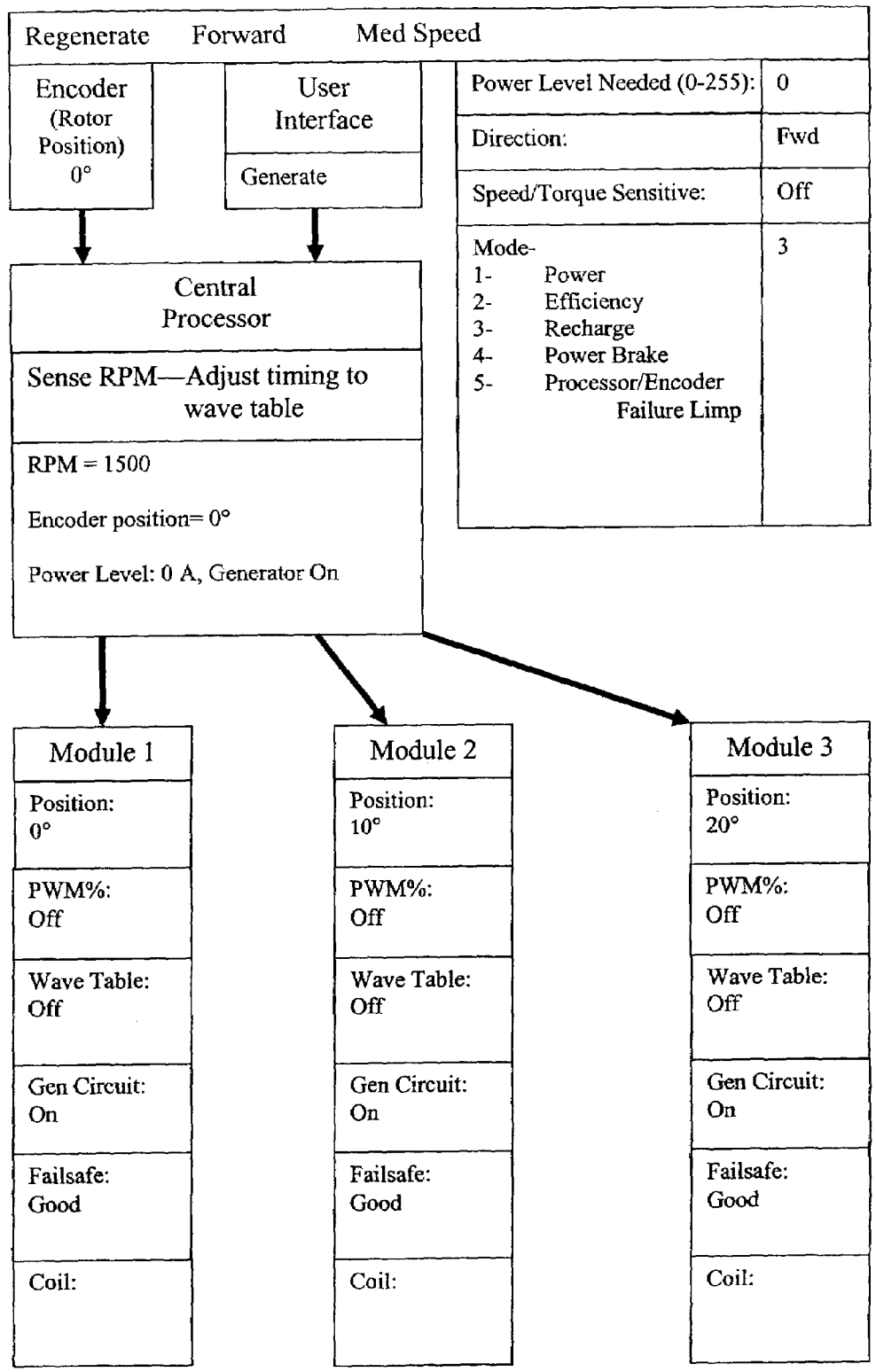
Figure 28:
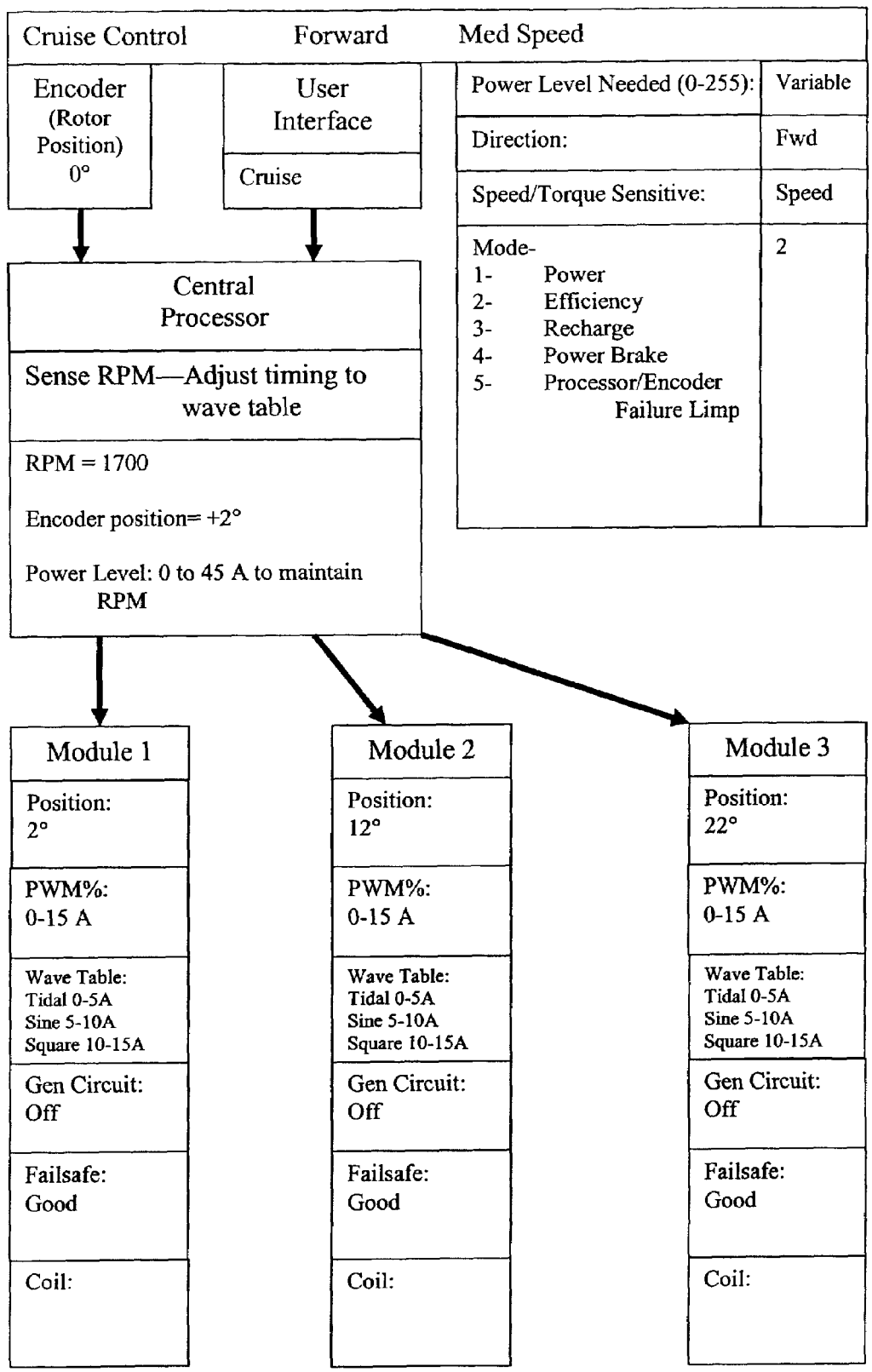
Figure 29:
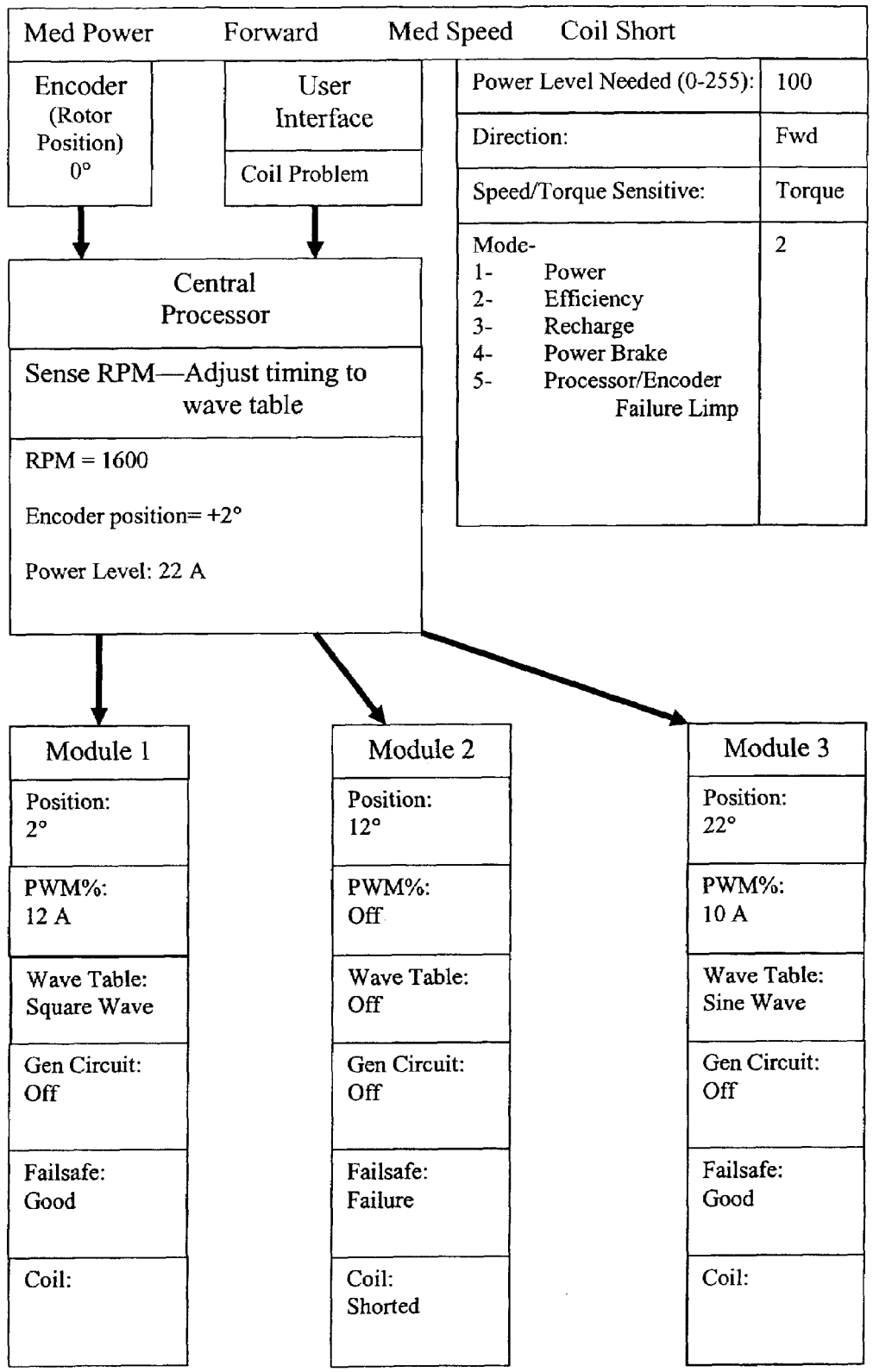
Figure 30:
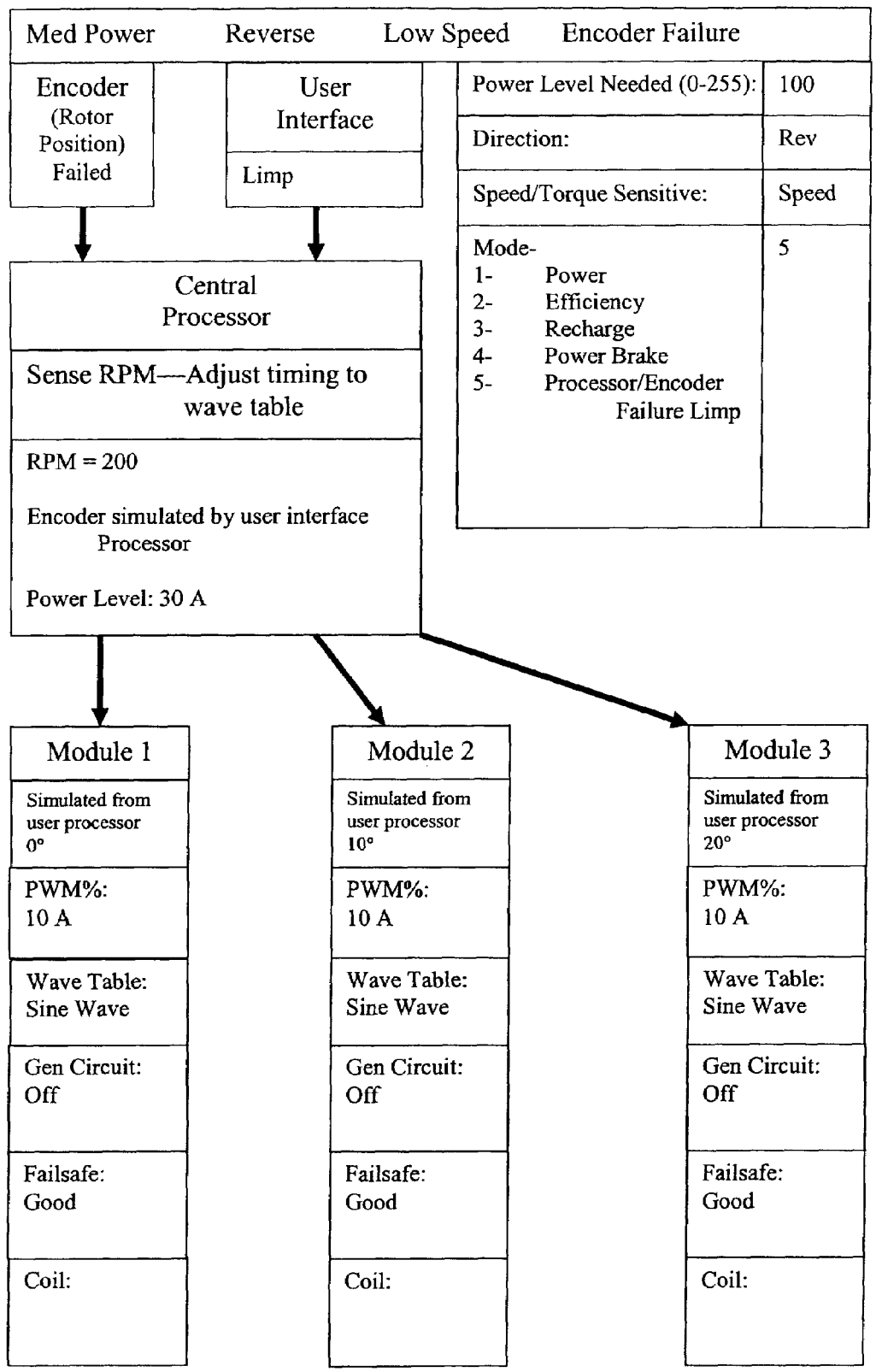
Figure 31:
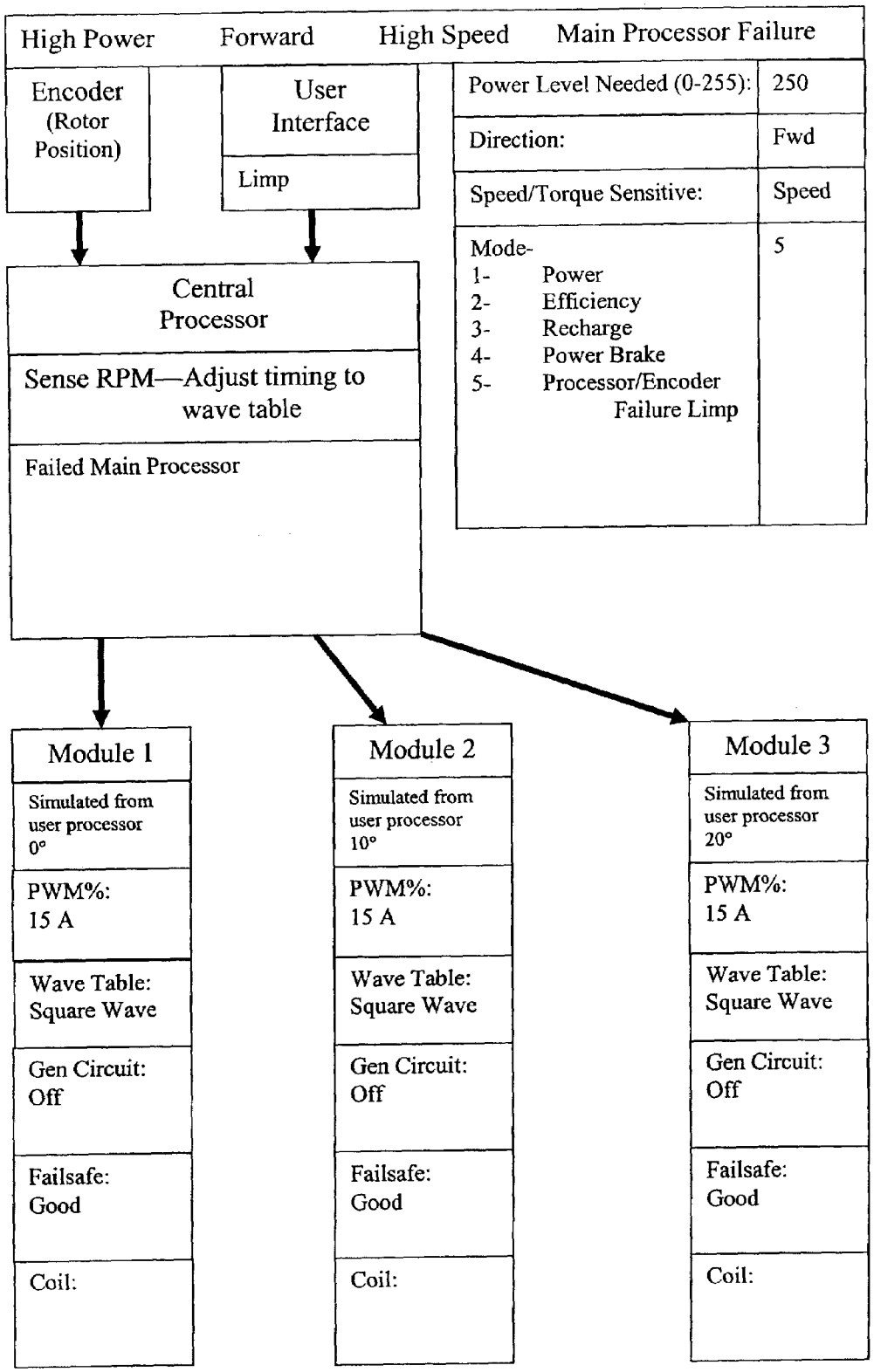
Figure 32:
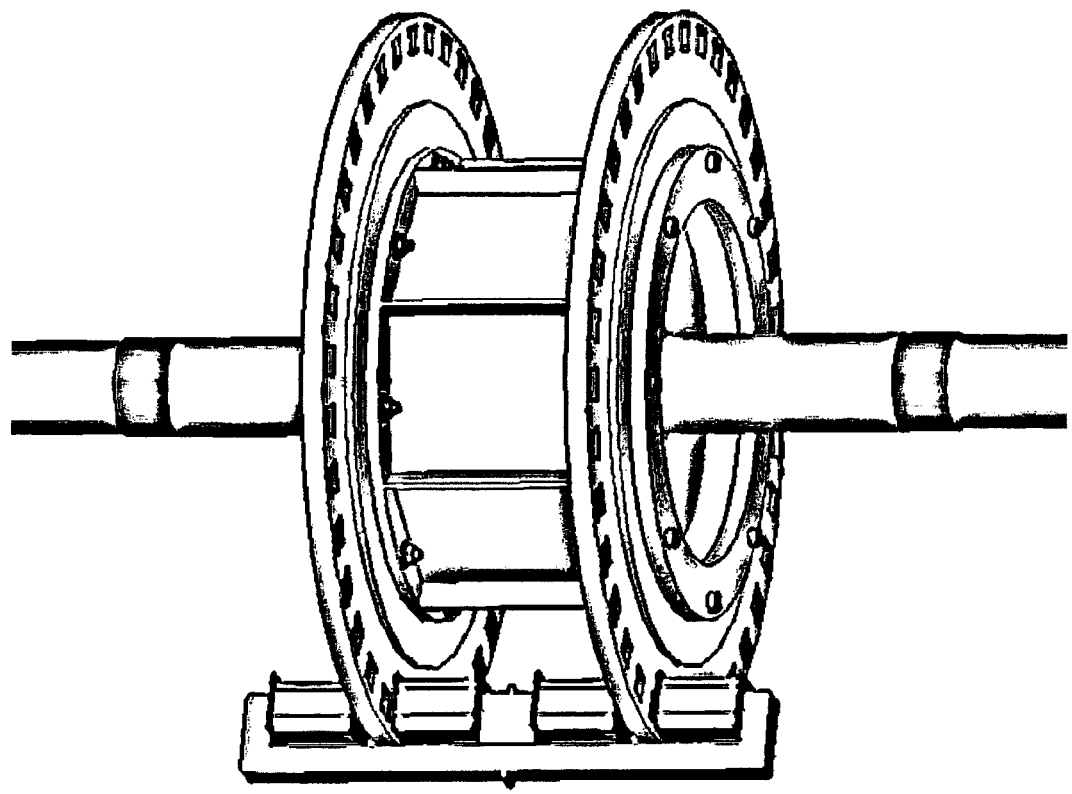
FIGS. 32 & 39 depict a rotor of one embodiment.
Figure 33:
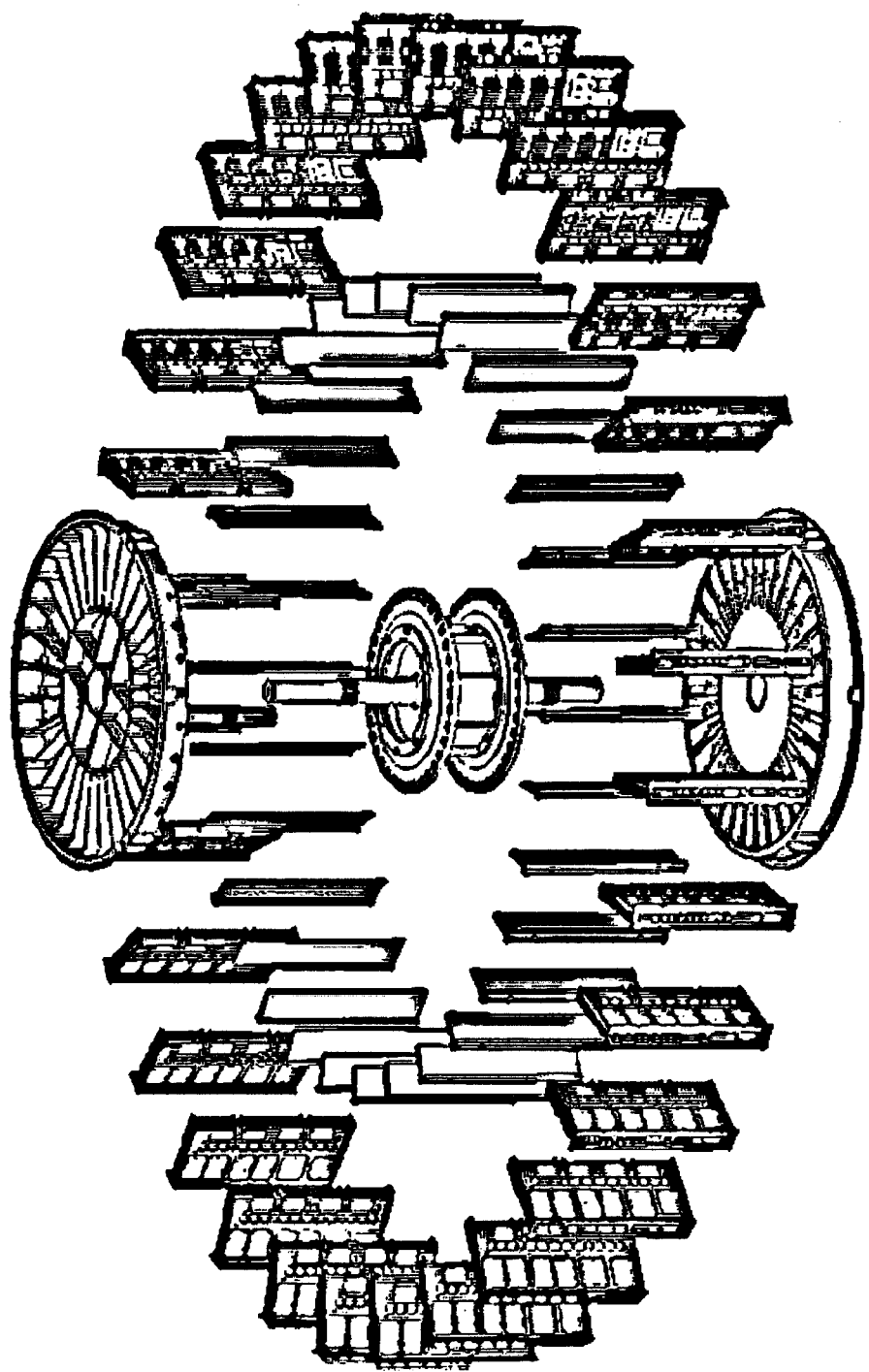
FIG. 33 provides an exploded view of the motor of one embodiment in its housing.
Figure 34:
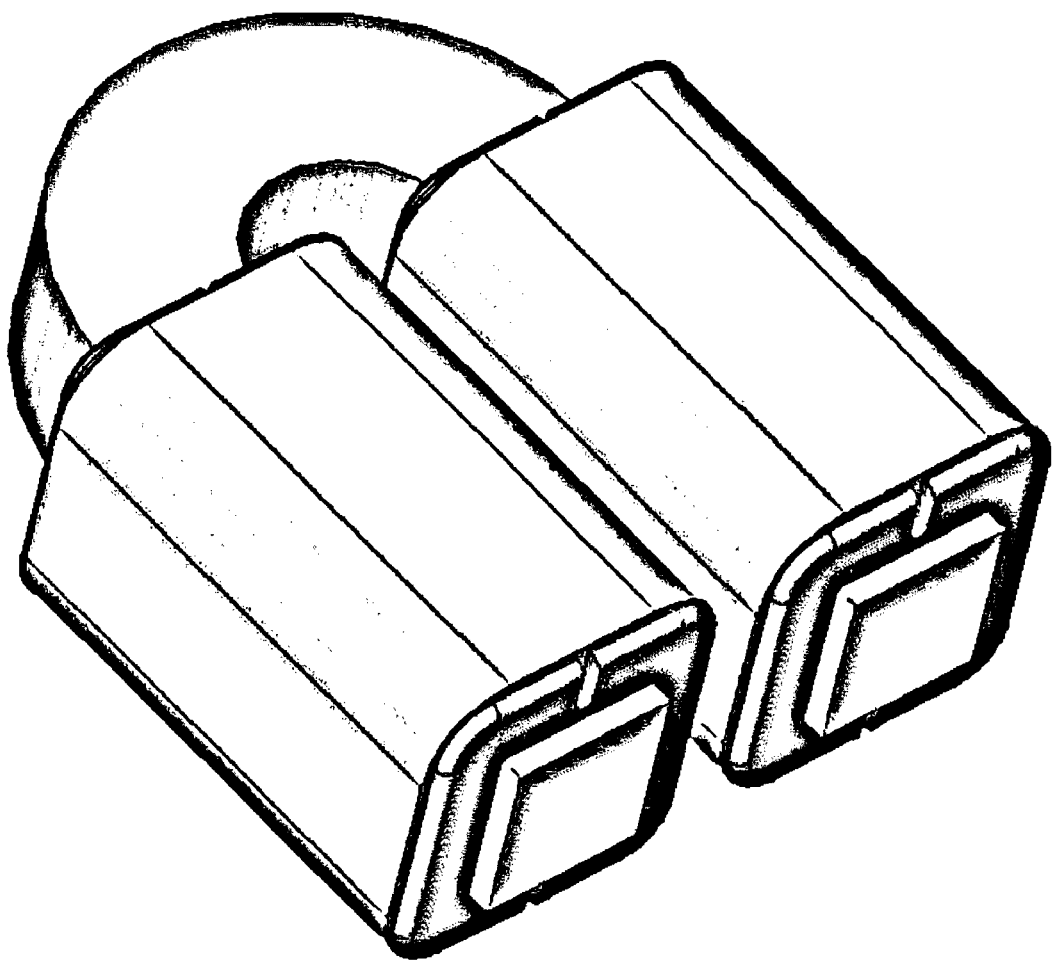
FIG. 34 depicts a modified U-shaped coil used in one embodiment.
Figure 35:
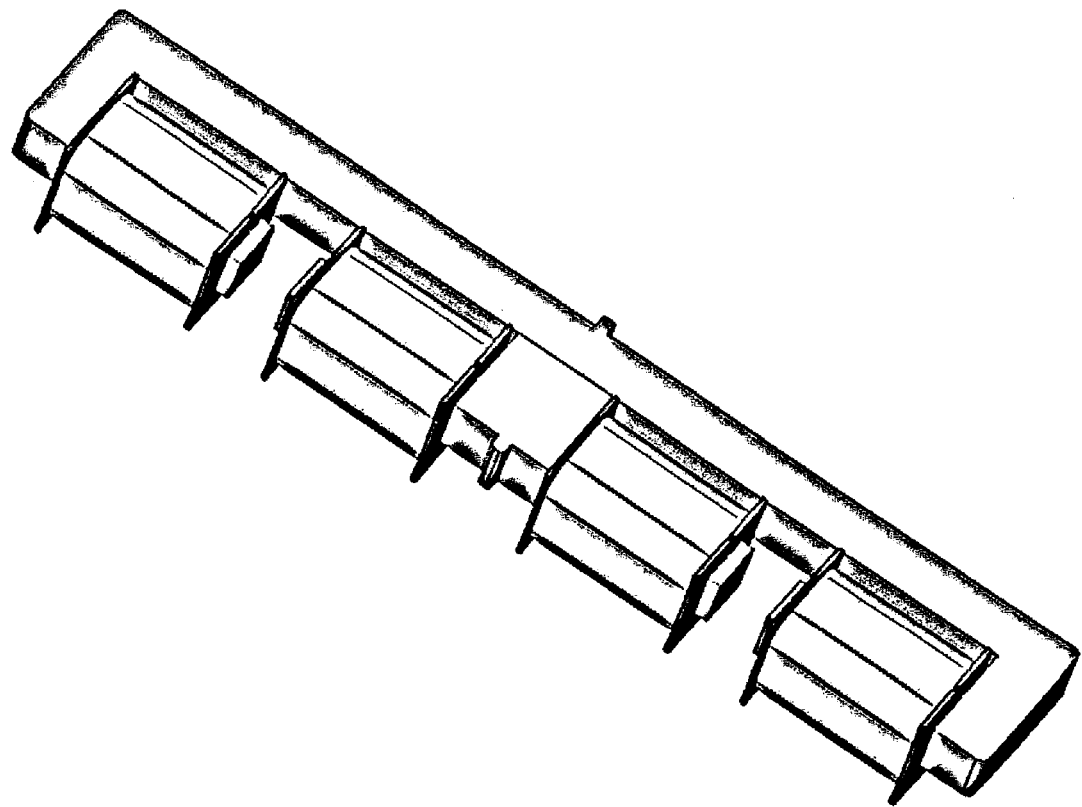
FIG. 35 depicts a modified E-shaped coil used in one embodiment.
Figure 36:
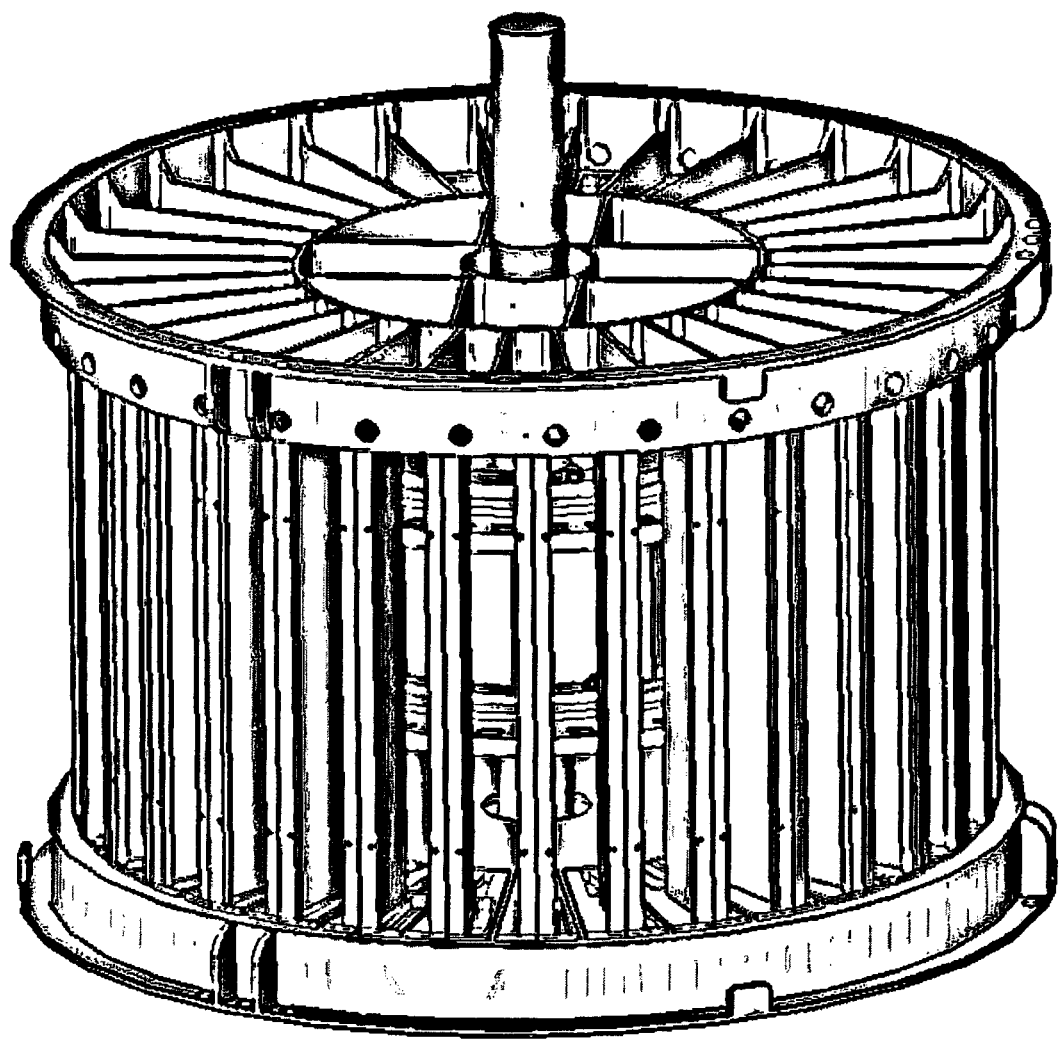
FIG. 36 depicts a stator housing used in one embodiment.
Figure 37:
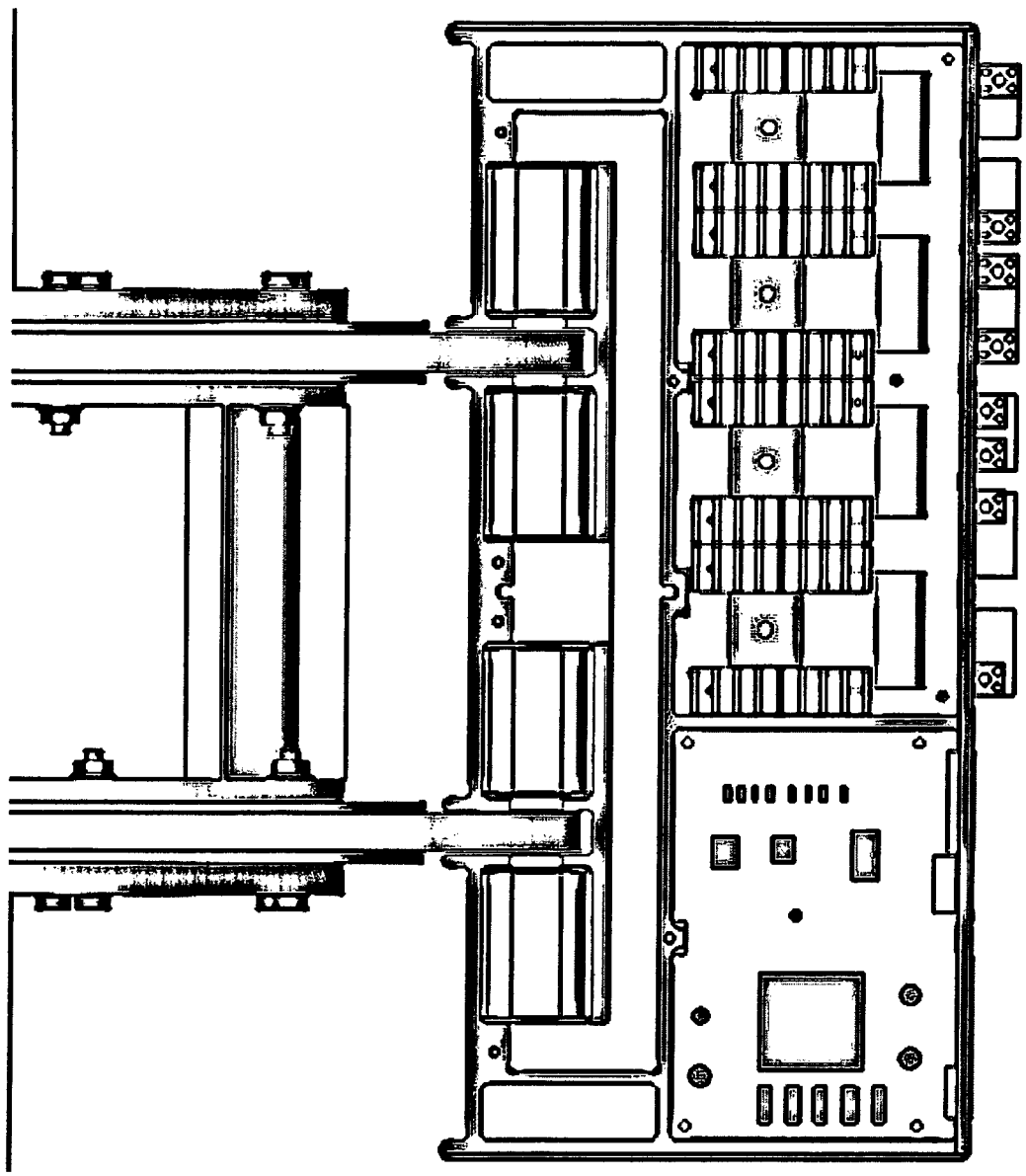
FIG. 37 depicts modules comprised in a stator housing of one embodiment.
Figure 38:
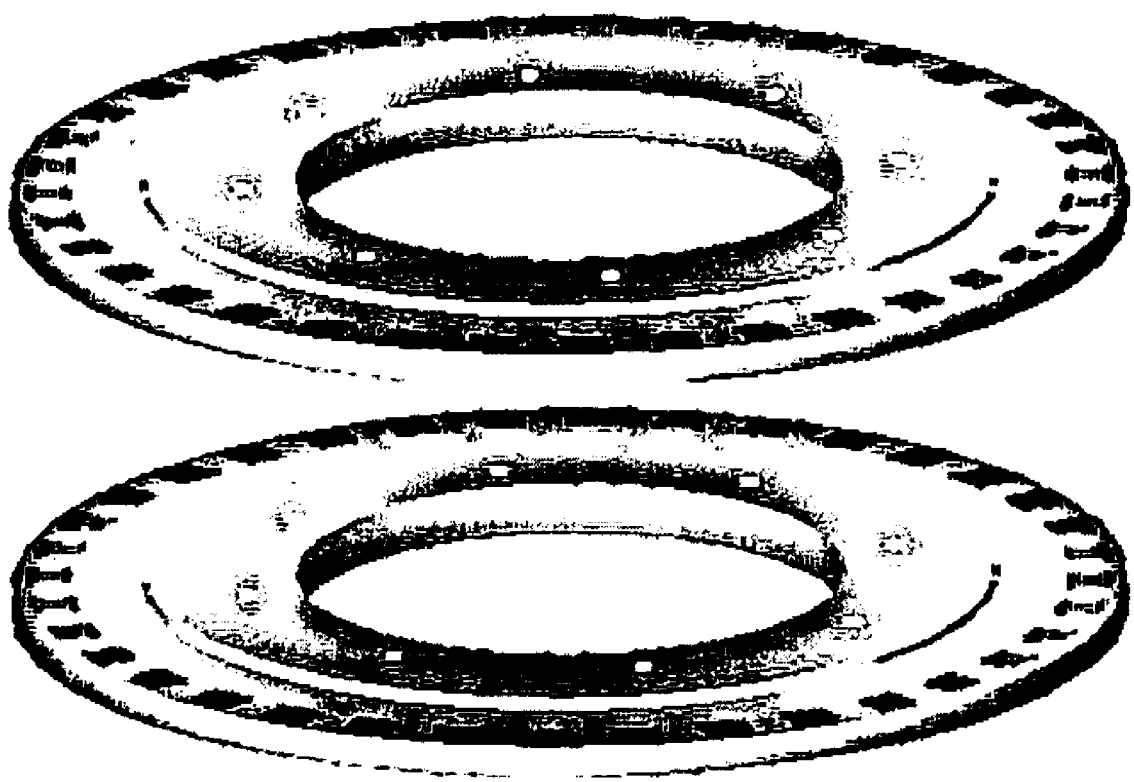
FIG. 38 depicts a rotor plate configuration of one embodiment, with embedded magnets.
Figure 39:
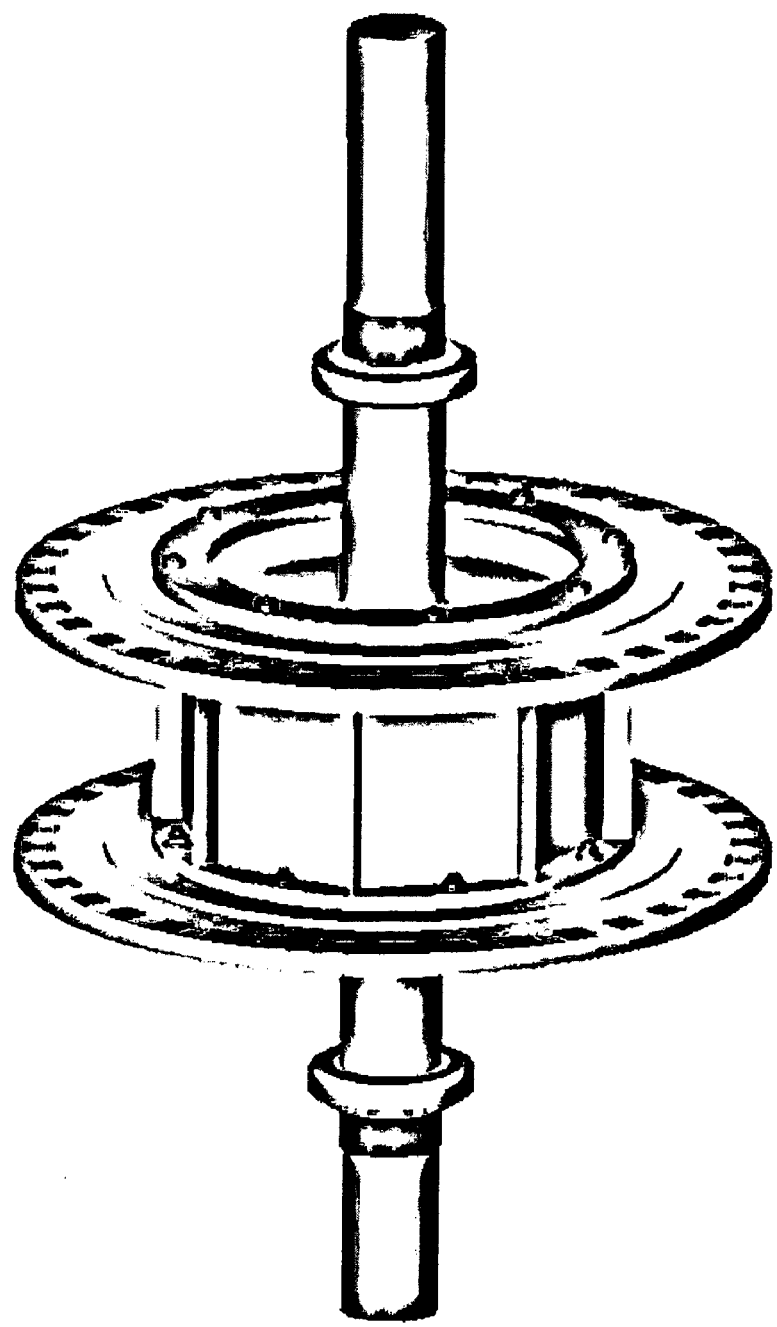
Figure 40:
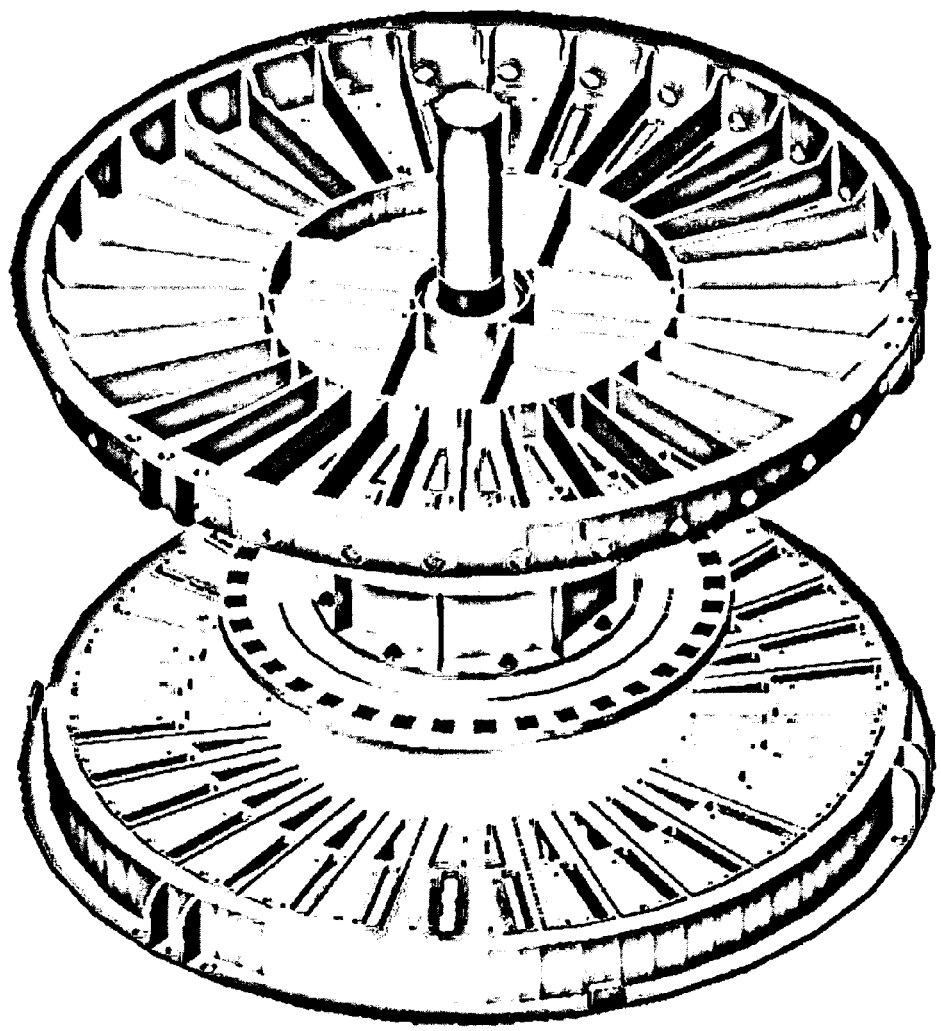
FIG. 40-43 depict alternate view of rotors of preferred embodiments.
Figure 41:
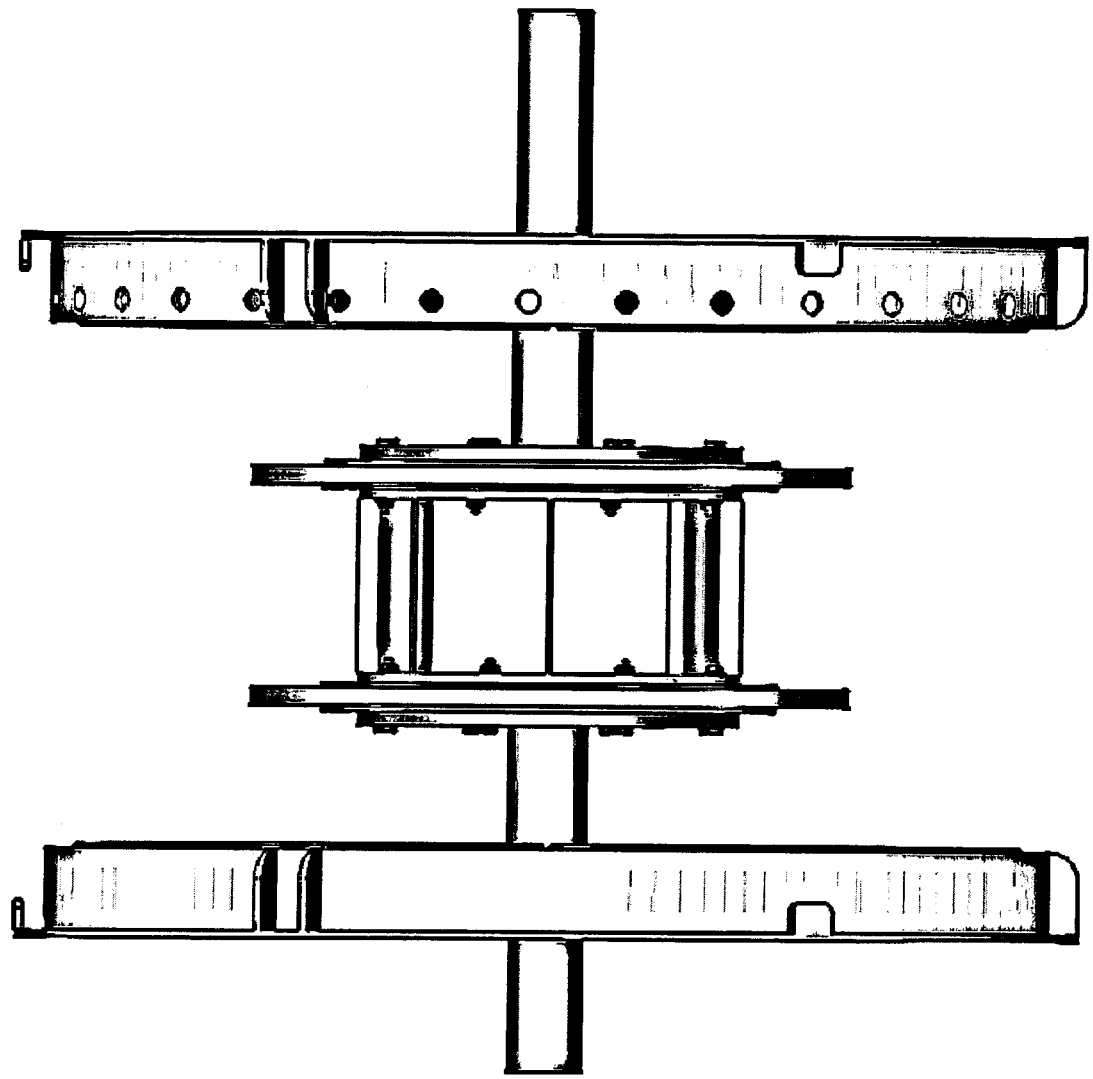
Figure 42:
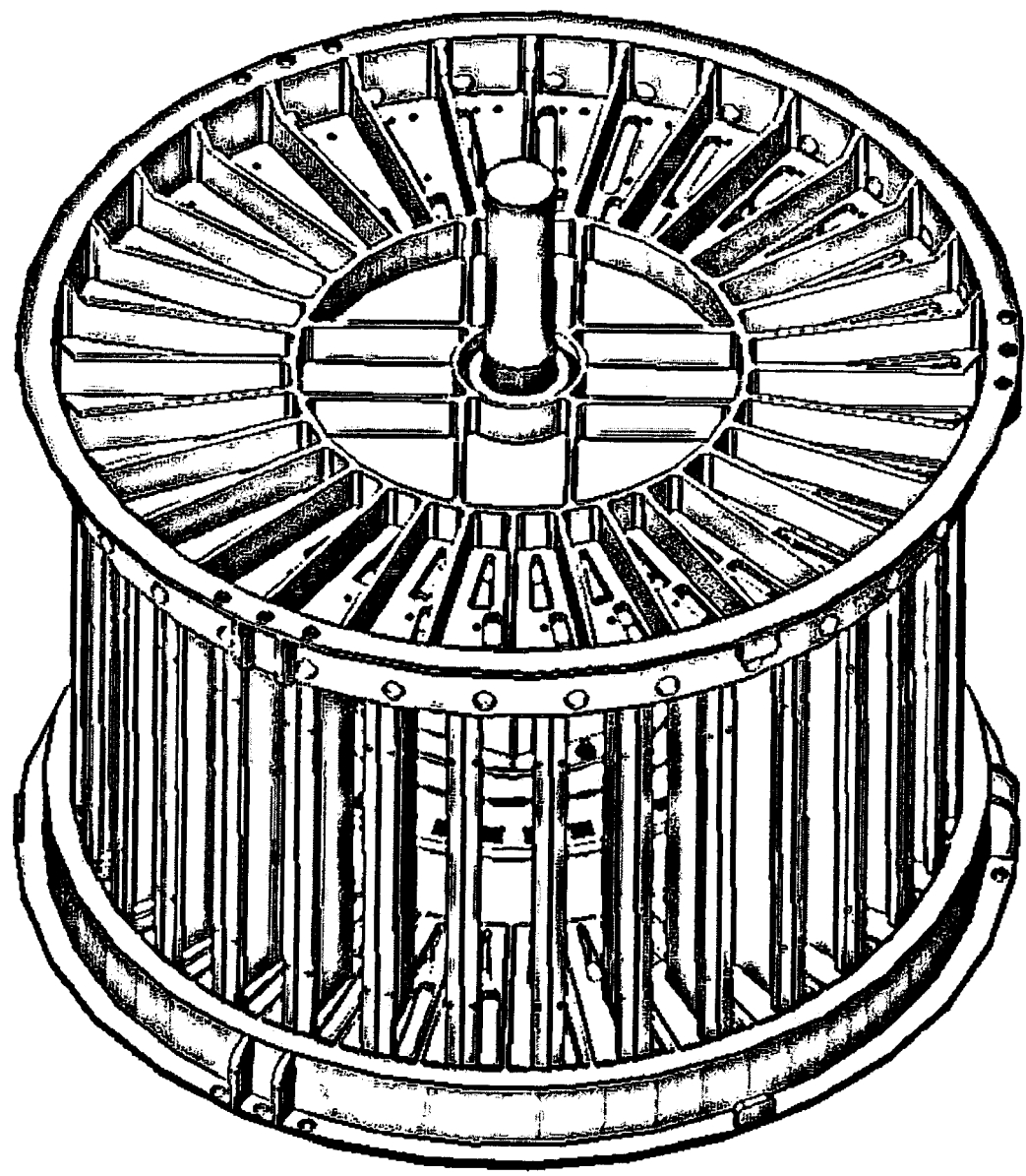
Figure 43:
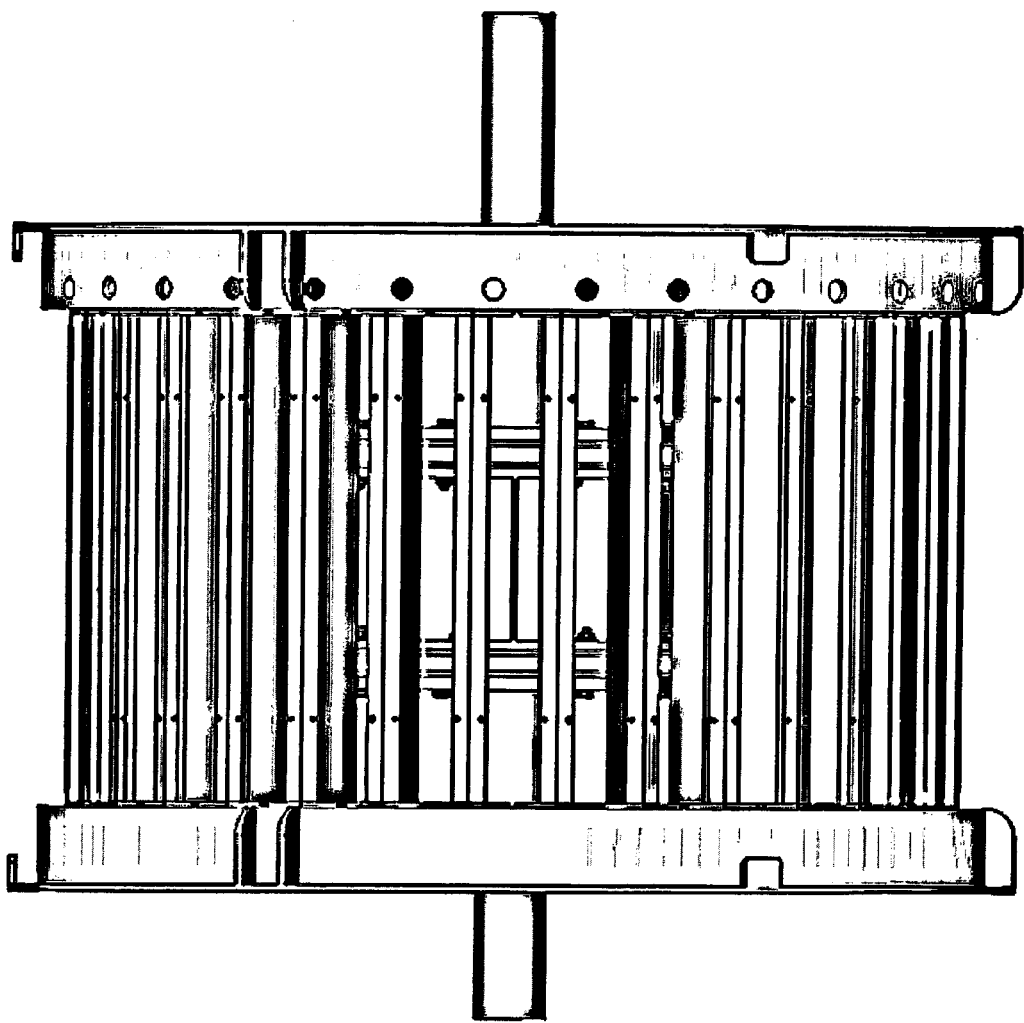
Figure 45:
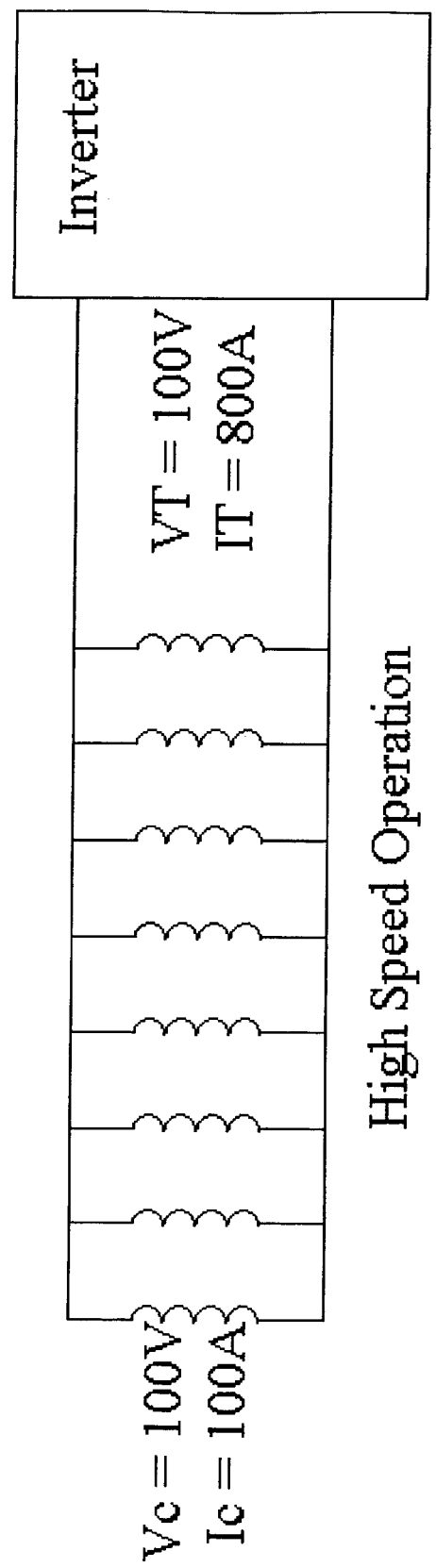
FIGS. 45-48 illustrate circuit switching advantages of a generator embodiment.
Figure 46:
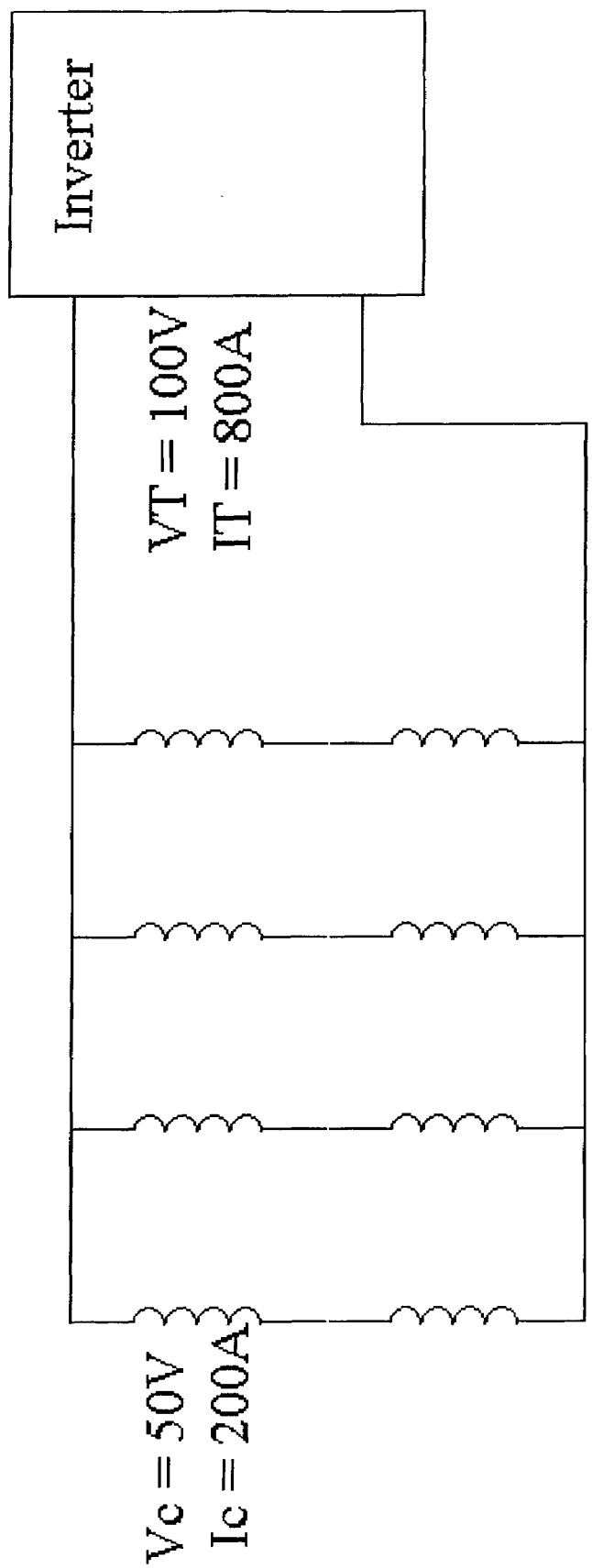
Figure 47:
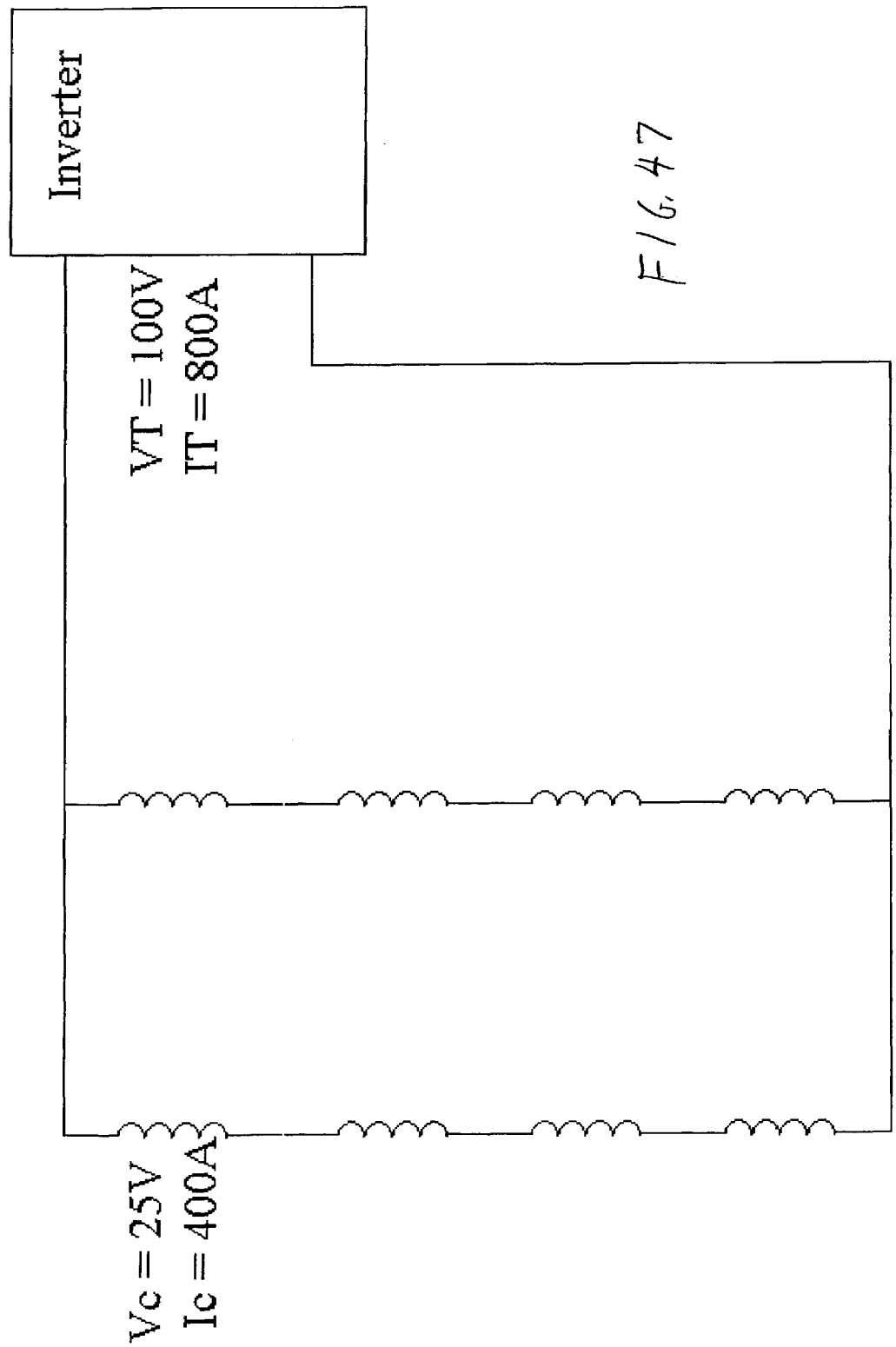
Figure 48:
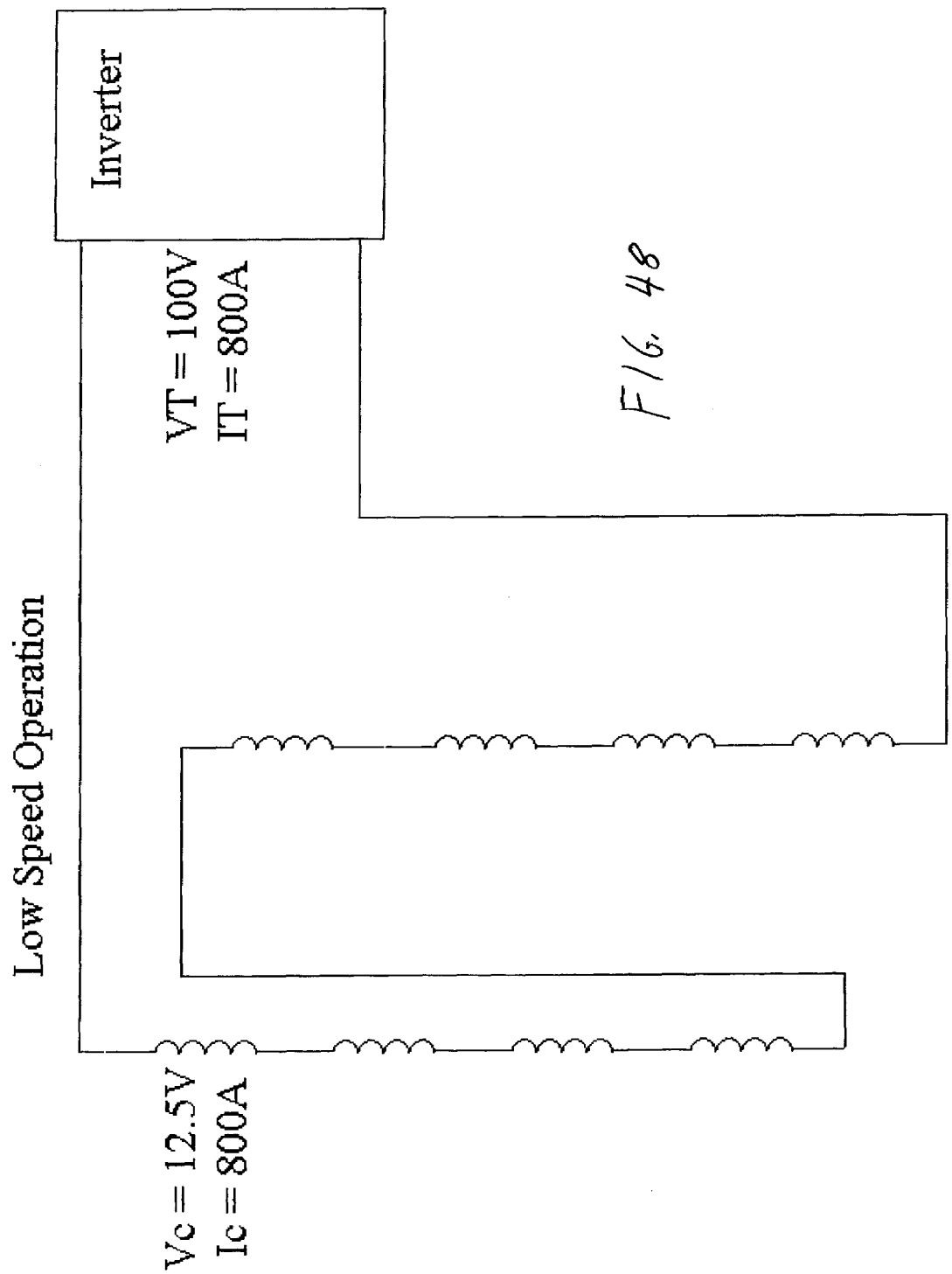

In a preferred embodiment (the DEM), the present invention comprises two or more sub-systems, including the motor itself (rotor, stator, bearings, and housing) and a controller/power module subsystem (see FIG. 20). The computational power available on a low-cost integrated circuit is typically sufficient to control the DEM and/or a generator subsystem.

Rotor

Figure 9:
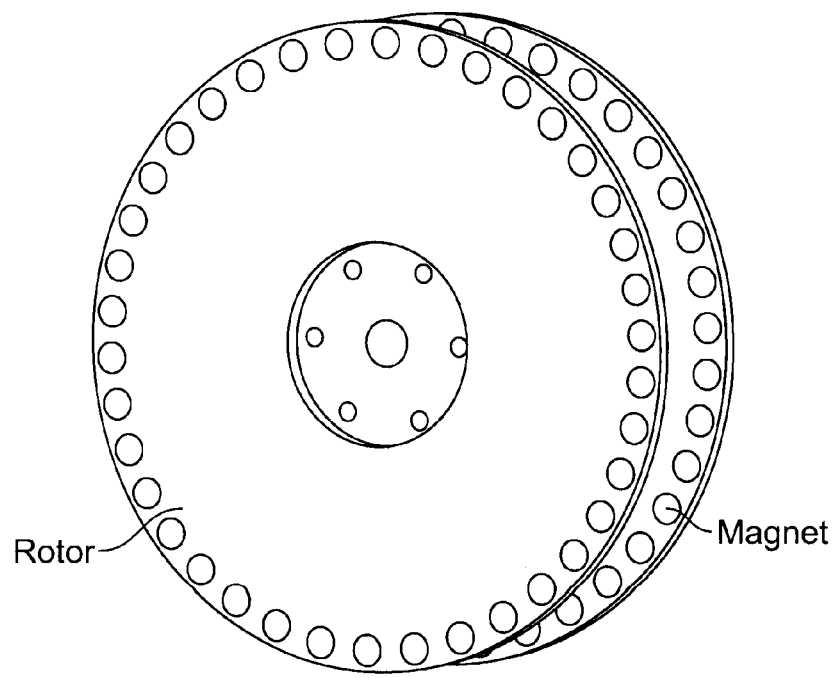
FIG. 9 depicts a rotor plate configuration of one embodiment with embedded magnets.

The rotor is the part of the motor that spins. One embodiment of the present invention comprises a rotor that contains two plates having 36 high-strength neodymium iron boron (NdFeB) magnets embedded around the circumference, with alternating north/south polarity. In another embodiment of the invention, the two circular plates are made of high-strength plastic (e.g., Lexan) which provides for a light inertia weight that will help in fast spin-up and slow-down rates. A configuration of the rotor plates with the embedded magnets is illustrated in FIG. 9. An alternate embodiment uses only one plate.

Figure 10:
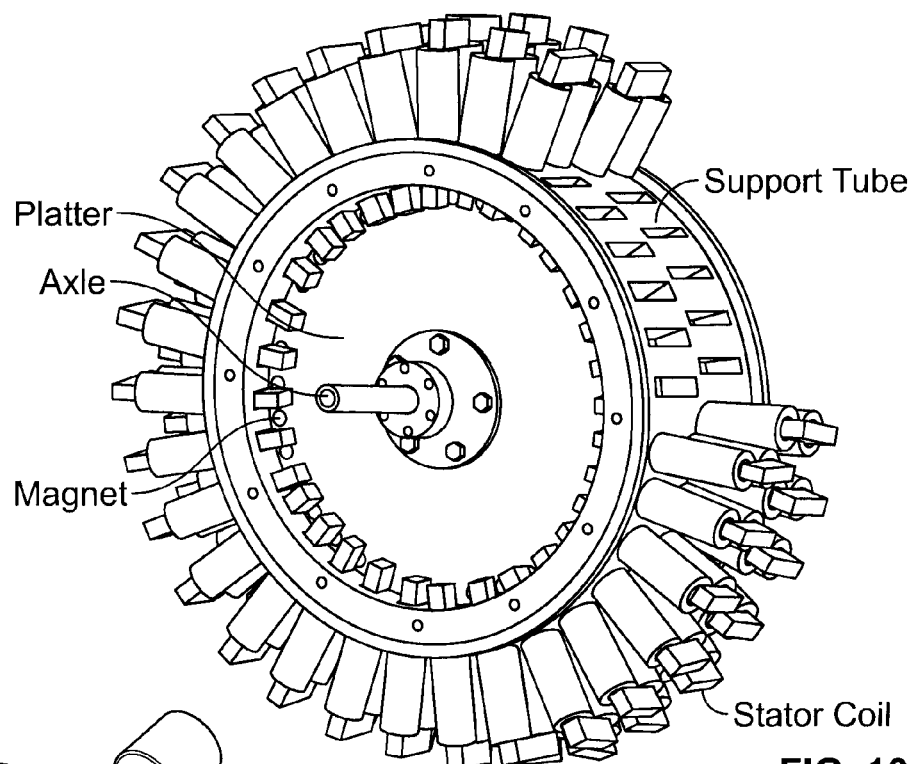
FIG. 10 depicts rotor plates of one embodiment fixed to an axle.

The plates preferably are fixed to an axle as shown in FIG. 10. The axle spins freely in a set of bearings at both ends of the motor housing and extends through the housing to drive an external load. The relatively flat aspect ratio of the rotor is unusual for a motor. It creates space for all of the magnets and allows the motor to develop high torque with relatively low magnetic forces.

Figure 1:
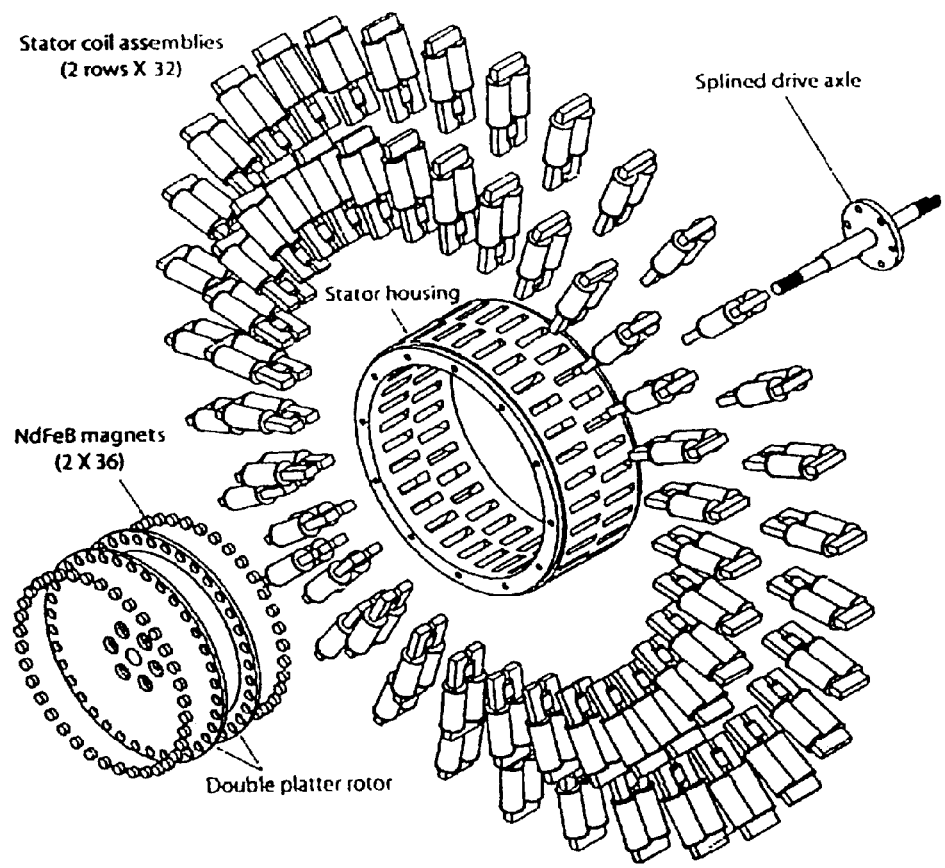
FIG. 1 depicts a rotor of one embodiment of the present invention.

FIG. 1 is a close up diagram of the rotor of one embodiment of the present invention. The NdFeB magnets are embedded in the two rotor platters. Each platter sits between the pole pieces of one row of stator coils. The stator coil assemblies fit into the opening on the stator housing. Other embodiments are described below.

Figure 2:
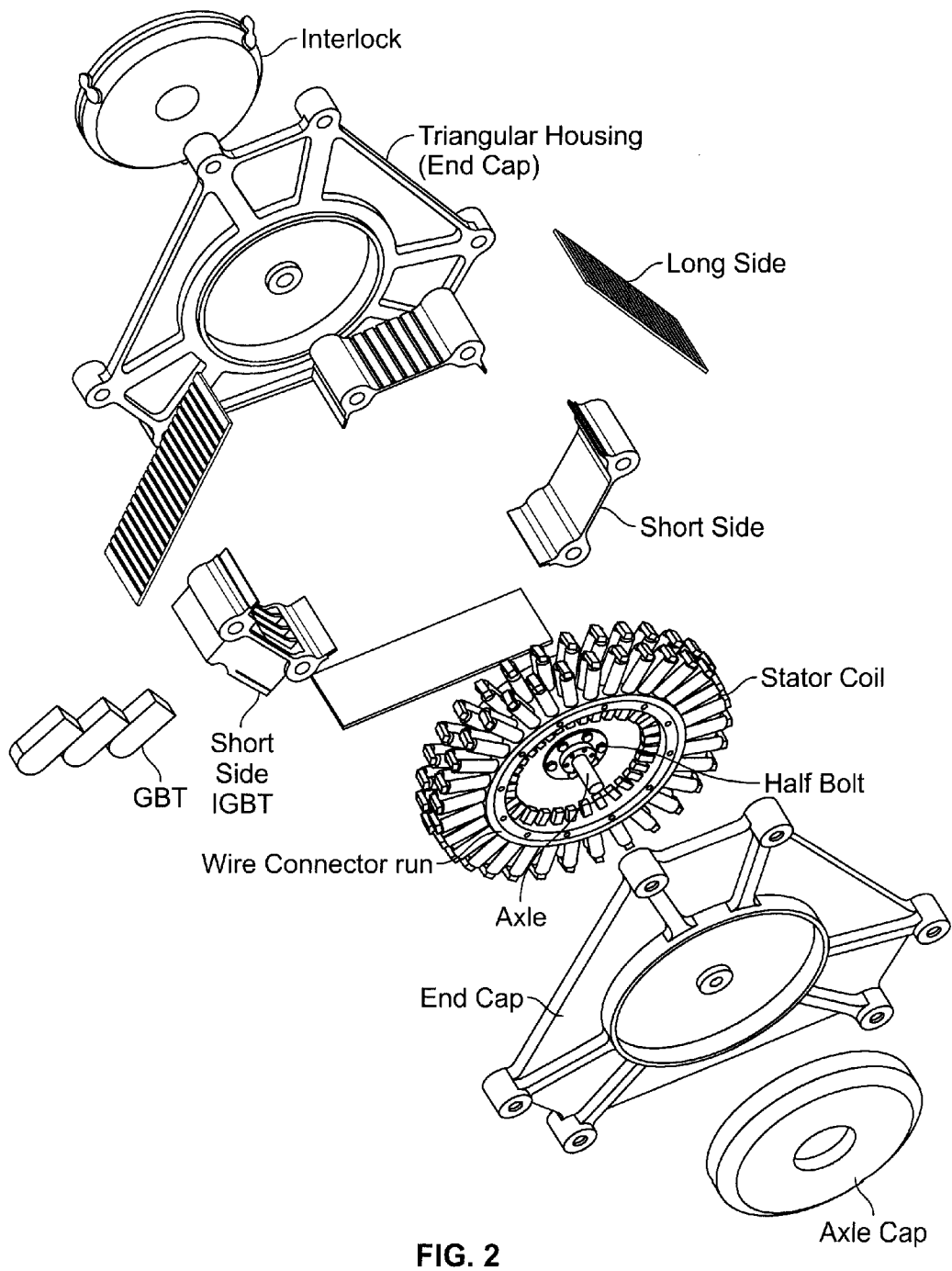
FIG. 2 provides an exploded view of the motor of one embodiment in its housing.

FIG. 2 is an exploded view of the preferred motor in its housing. The three plug-in insulated gate bipolar transistor (IGBT) modules are the power modules. Power and controller circuitry preferably fits in the removable modules and the corners of the triangular housing, which comprises the end caps, axle caps, and interlock. In other embodiments, they are integrated with the coil assemblies.

Stator

Figure 3:
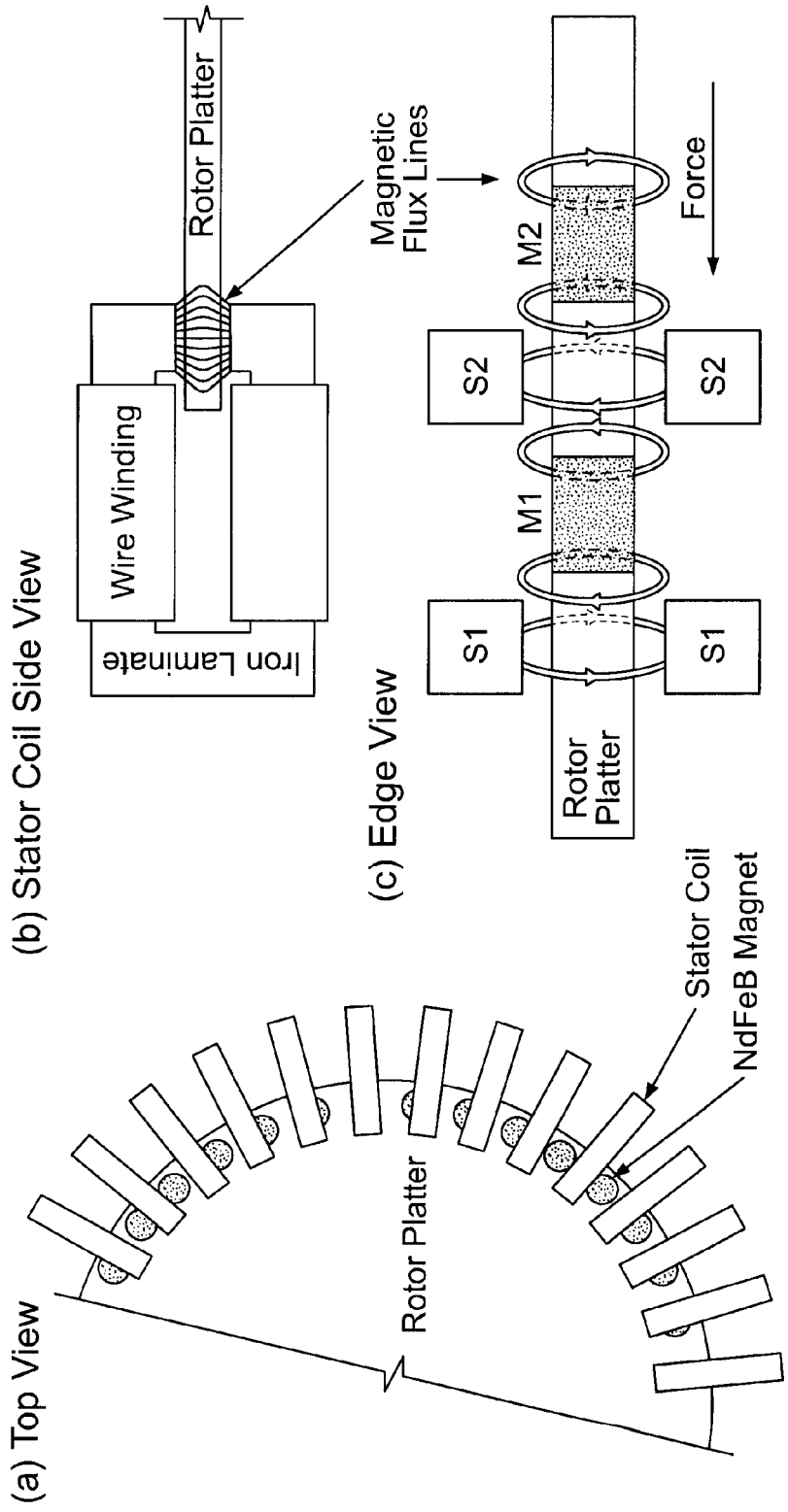
FIG. 3 depicts a view of a stator housing of one embodiment, showing stator coil and electromagnet modules.
Figure 7:
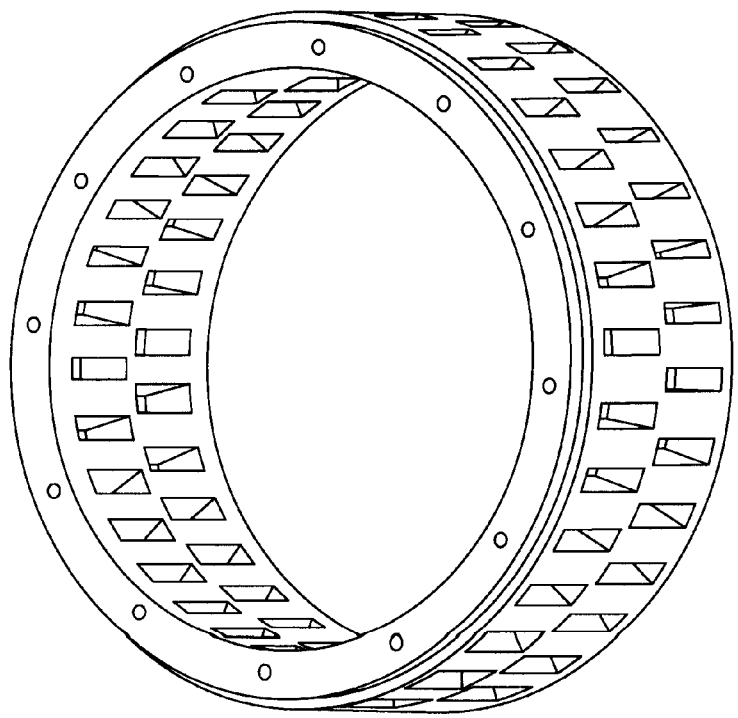
FIG. 7 depicts a stator housing of one embodiment.
Figure 8:
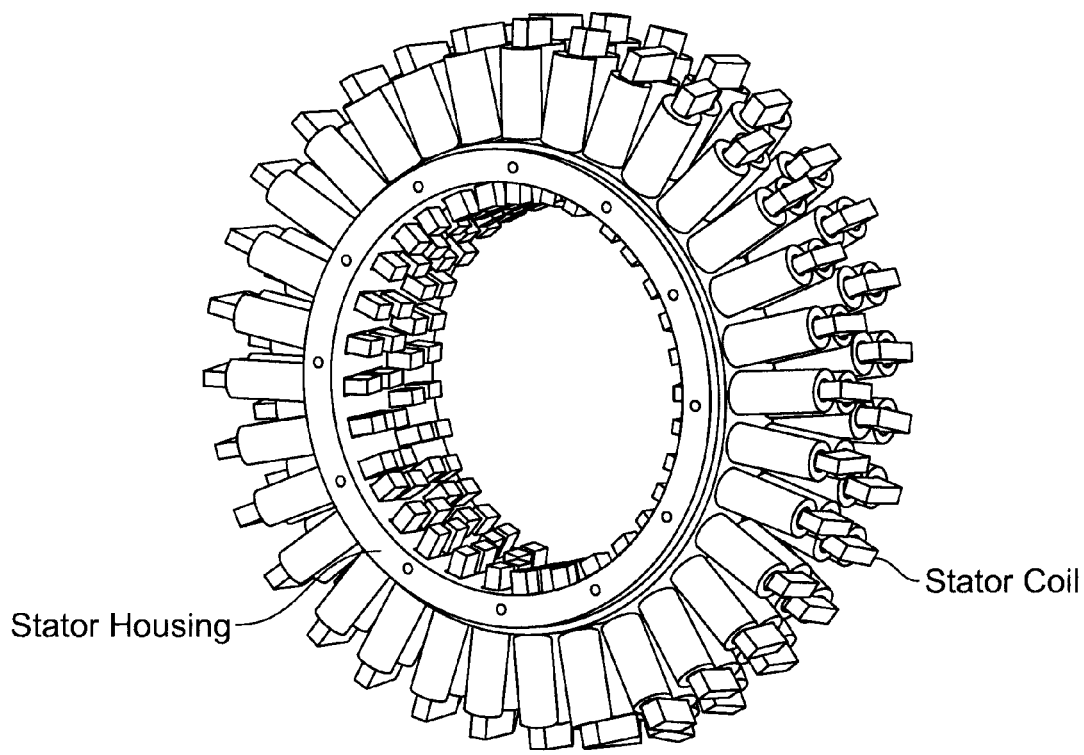
FIG. 8 illustrates modules comprised in a stator housing of one embodiment.

The preferred stator housing, also referred to herein as the support tube, is a cylindrical shell that surrounds the rotor plates, separated by an air gap, as shown in FIG. 7. The stator housing preferably holds modules containing electromagnets and stator coils, as shown in FIG. 8. A close-up of this configuration is illustrated in FIG. 3. Each stator coil preferably comprises a C-shaped or modified E-shaped laminated silicon steel bar surrounded by a tightly wound wire. In embodiments using E-shaped laminations, the housing is a frame webbing with vertical support webs for the modules to slide in between.

Figure 4:
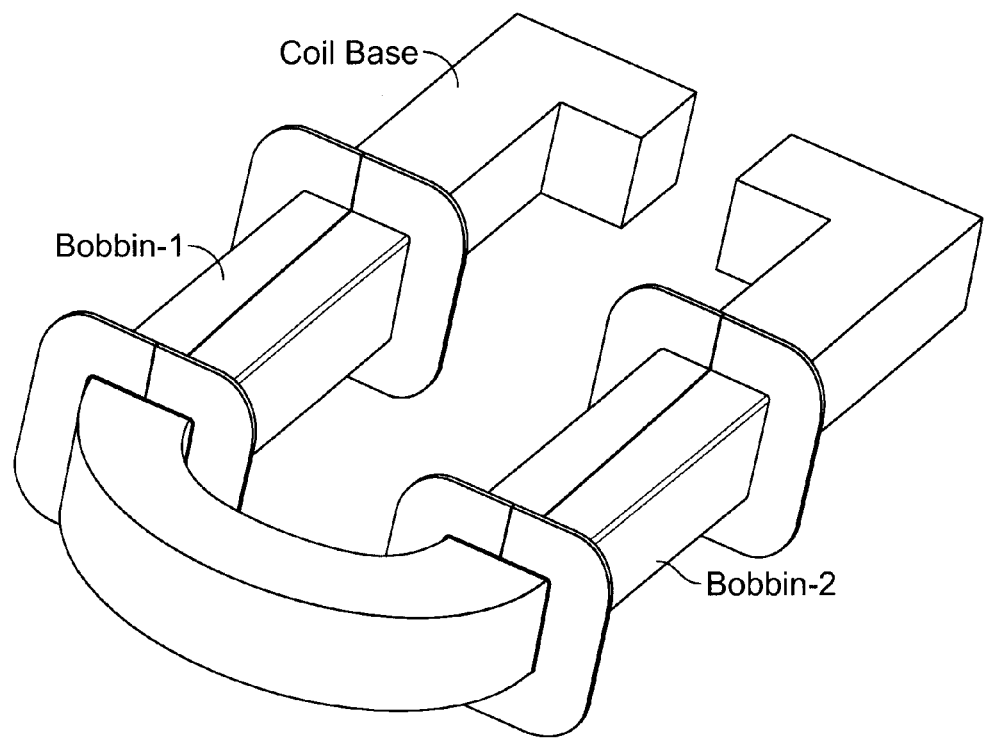
FIG. 4 depicts a C-shaped stator coil of one embodiment.

FIG. 4 and FIG. 5 illustrate preferred embodiments of the stator coil. The two ends of the bar protrude through the stator housing and surround the edge of the rotor plates. When a controller energizes the stator coil, magnetic flux lines run through the bar and across the gap between the stator poles. This magnetic field interacts with the fixed NdFeB magnets on the rotor to generate torque. Reversing energizing current to the stator coil reverses the direction of the field. Each rotor plate preferably responds to 32 stator coils. Among the advantages of using this type of stator coil are a complete flux path surrounding the magnet to improve efficiency using both sides of the magnet with one core, laminations to improve current flow in the core, and decreased air gap between the coil and the magnet. Finally, this design provides coil proximities on both sides of the magnet, thereby decreasing the inherent pull on the coil in the housing, and providing less physical stress on the housing. For example, if the top air gap and the bottom air gap are equal, then the vertical pull on the rotor decreases, since the top part of the core pull cancels out the bottom core pull on the magnet.

FIG. 5 illustrates a preferred embodiment in which there are multiple separate coils on the same core. This configuration provides staging and reduces crossover voltage spikes when making a polarity change, which allows for systematic increases and/or decreases of the torque and/or the voltage in both motor and generator functions. Furthermore, this embodiment provides the ability to change and focus the magnetic field on the end of the core (using pulse width modulating schemes) and, in combination with phase shifting, between different windings on the same core.

Another preferred embodiment of the present invention can be seen by cutting in half (along the dotted line depicted) the stator coil illustrated in FIG. 5. Doing so results in a stator coil with the same tall "C" design as shown in FIG. 4, but having only 2 bobbins instead of 4.

FIG. 3(a) is a top view of part of a rotor platter of a preferred embodiment with NdFeB magnets embedded near the rim. The relative positions of the magnets and the stator coils shift going around the rotor because there are 36 magnets but only 32 coils per platter. These magnet-to-coil ratios can be modified if the motor is scaled up or down in size.

FIG. 3(b) is a Stator Coil Side View, a cross section of an individual stator coil of a preferred embodiment. The rotor rotates within the gap between the pole pieces. The magnetic flux lines spread out as they cross the gap between the poles and then run within the C-shaped laminated silicon steel bar to close the loop. Modules energize the wire windings, which activates the field. Reversing the current in the windings reverses the field direction.

FIG. 3(c) is an Edge View, a cross section of a small arc of one rotor platter viewed on edge, showing just two magnets and two coils of a preferred embodiment to demonstrate the basic principle of operation. Note that the polarity of the fixed NdFeB magnets alternates around the rotor. With magnet 1 (M1) between stator coils 1 and 2 (S1 and S2), the controller energizes the stator magnetic field pattern as shown. The NdFeB magnet field pattern is permanent. Magnetic flux lines that run parallel repel while flux lines that run anti-parallel attract. Thus, S1 attracts M1 while S2 repels M1 and attracts M2. All of these forces drive the rotor clockwise (to the left). By the time M2 reaches the position that M1 currently occupies, the controller will have reversed the direction of the stator fields. The stator field pattern always runs ahead of the magnets to keep the motor spinning. Note that the actual pattern of coil energization is rather complex because the spacing between the coils differs from the spacing between magnets.

Figure 11:
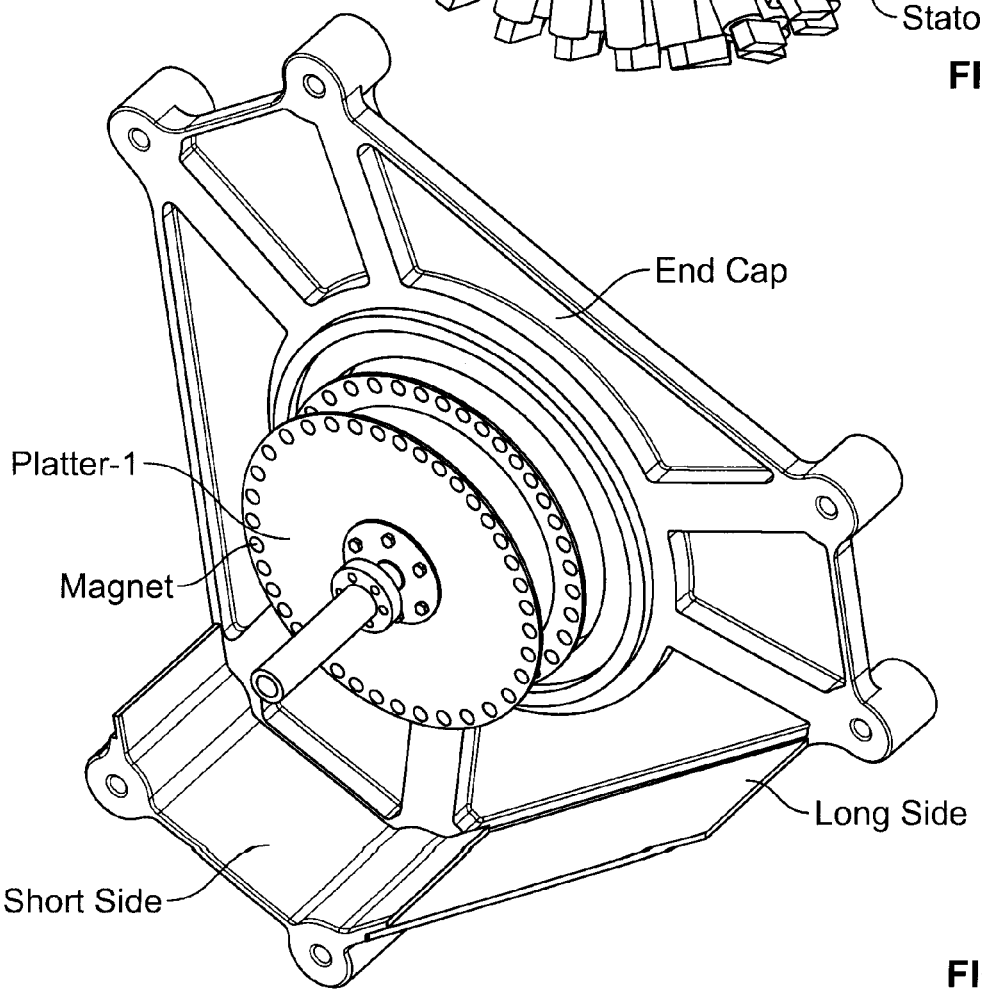
FIG. 11 provides a front view of a rotor and magnet assembly of one embodiment within a triangular housing.
Figure 12:
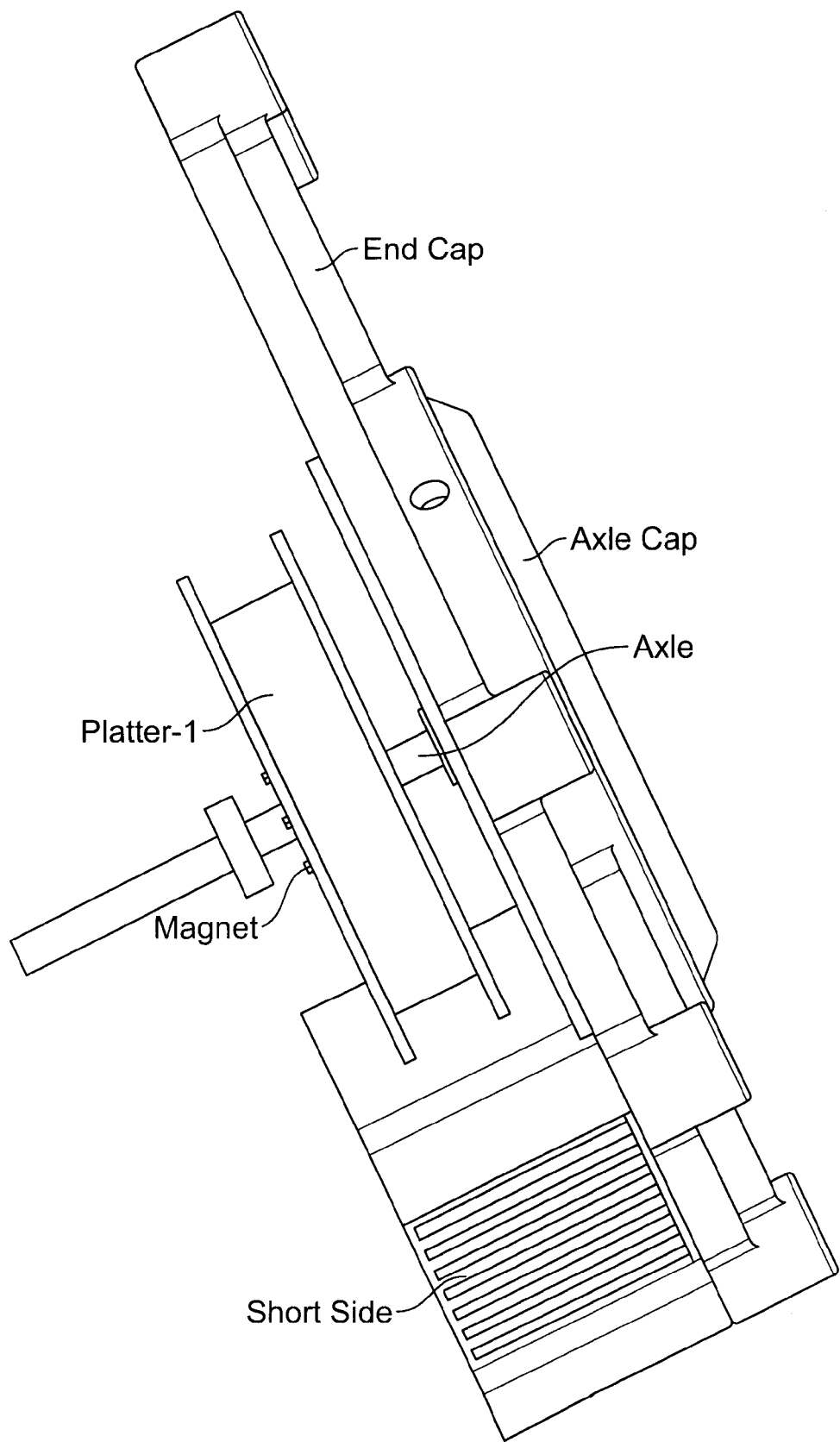
FIG. 12 provides a side view of a rotor and magnet assembly of one embodiment within a triangular housing.

FIG. 11 and FIG. 12 are, respectively, front and side views of the rotor and magnet assembly of a preferred embodiment within its triangular housing. The rotor is affixed to the end caps on a rotating axle. The triangular housing, comprising the end caps and axle caps, surrounds and protects the rotor and the magnets.

Figure 13:
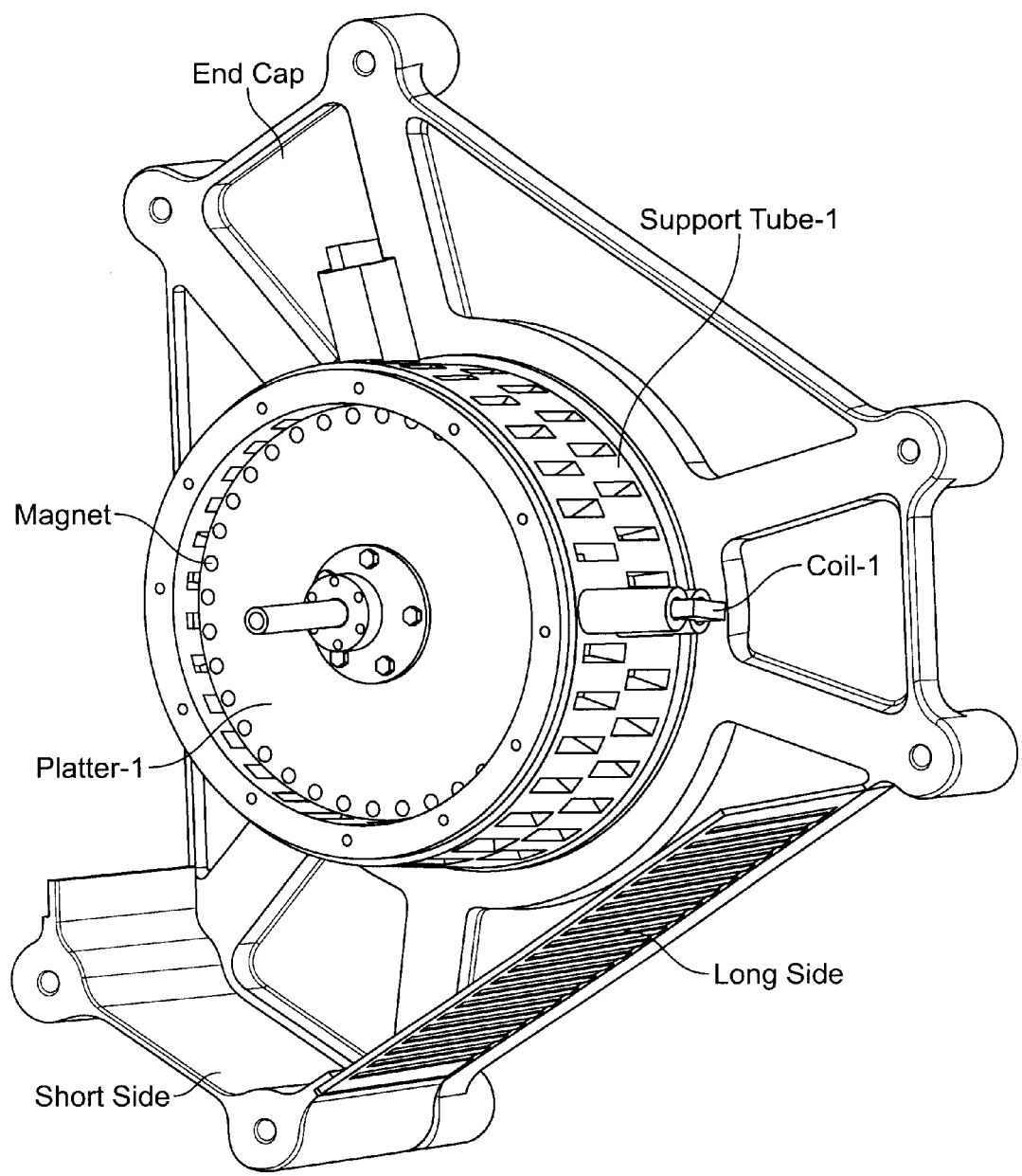
FIG. 13 provides a front view of a rotor and magnet assembly of one embodiment.
Figure 14:
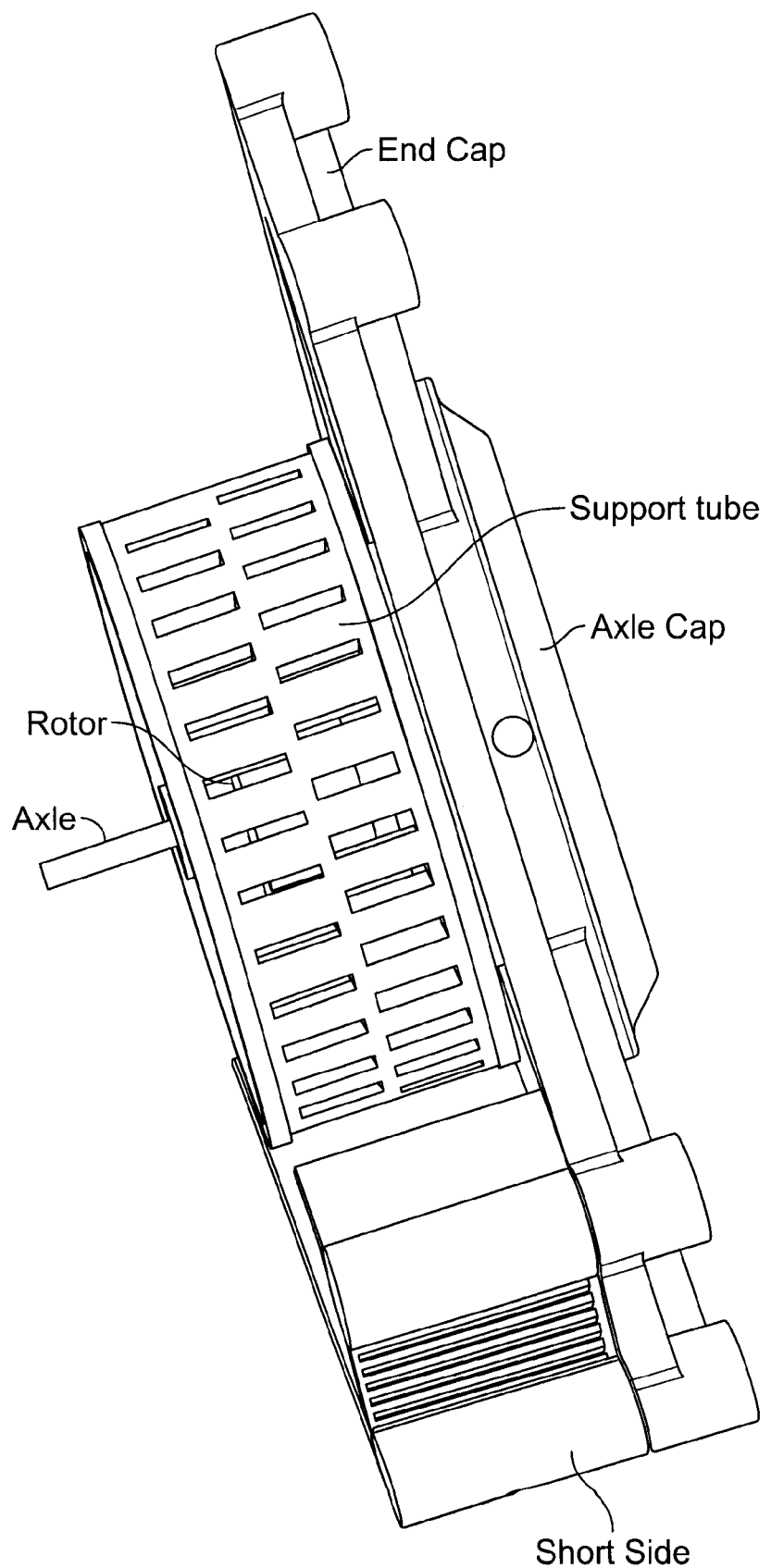
FIG. 14 provides a side view of a rotor and magnet assembly of one embodiment.

FIG. 13 and FIG. 14 are, respectively, front and side views of the rotor and magnet assembly of a preferred embodiment, highlighting their relative positions with regard to the support tube. Note that the support tube preferably is fixed to the triangular housing. The rotor assembly is allowed to rotate freely within the housing, but the support tube is fixed and does not move. Its purpose is to hold the stator coils in place while the rotor and magnet assembly rotates on the axle.

Figure 15:
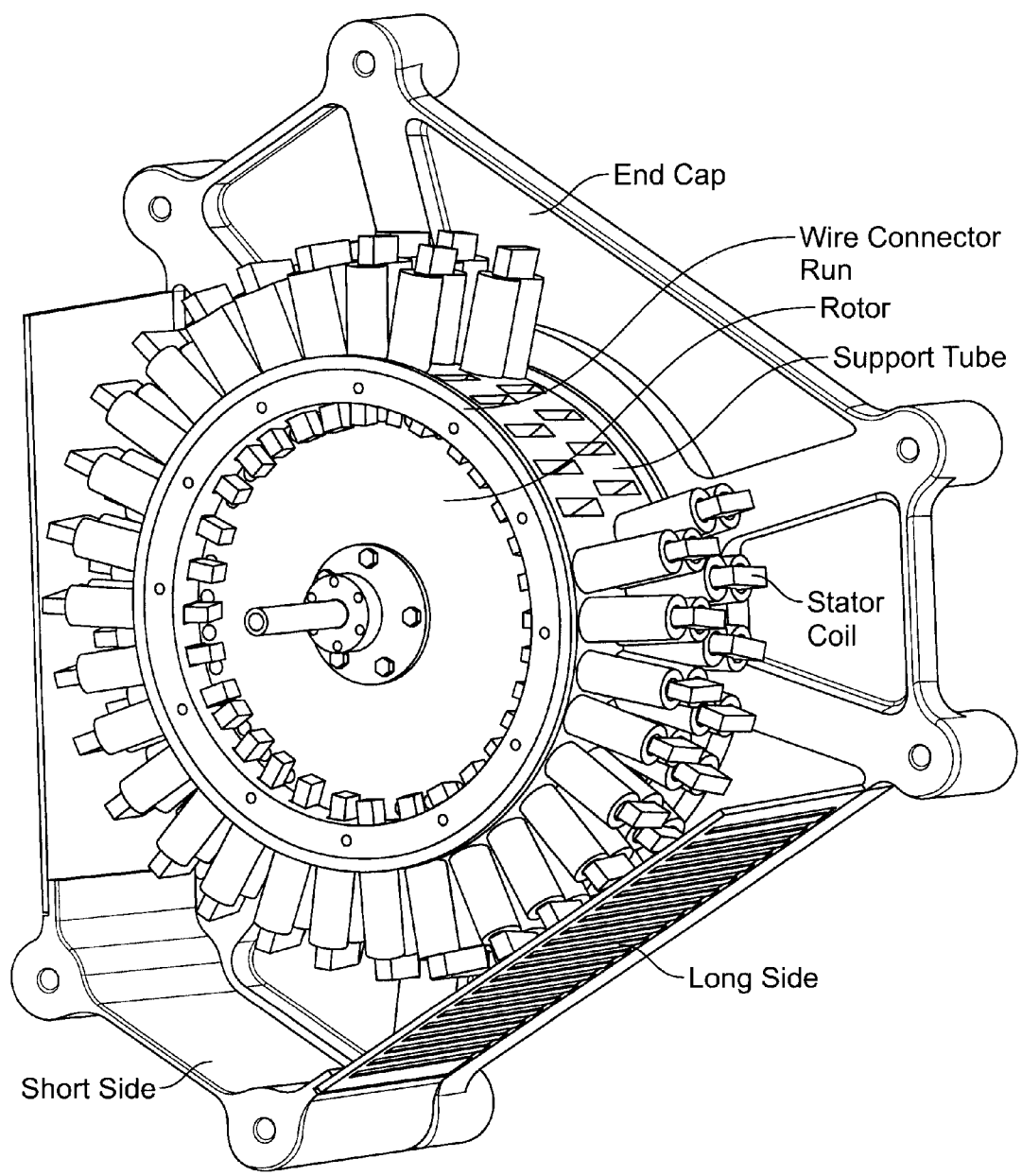
FIGS. 15, 16, & 17 provide additional views of a rotor and magnet assembly within a housing of one embodiment.
Figure 16:
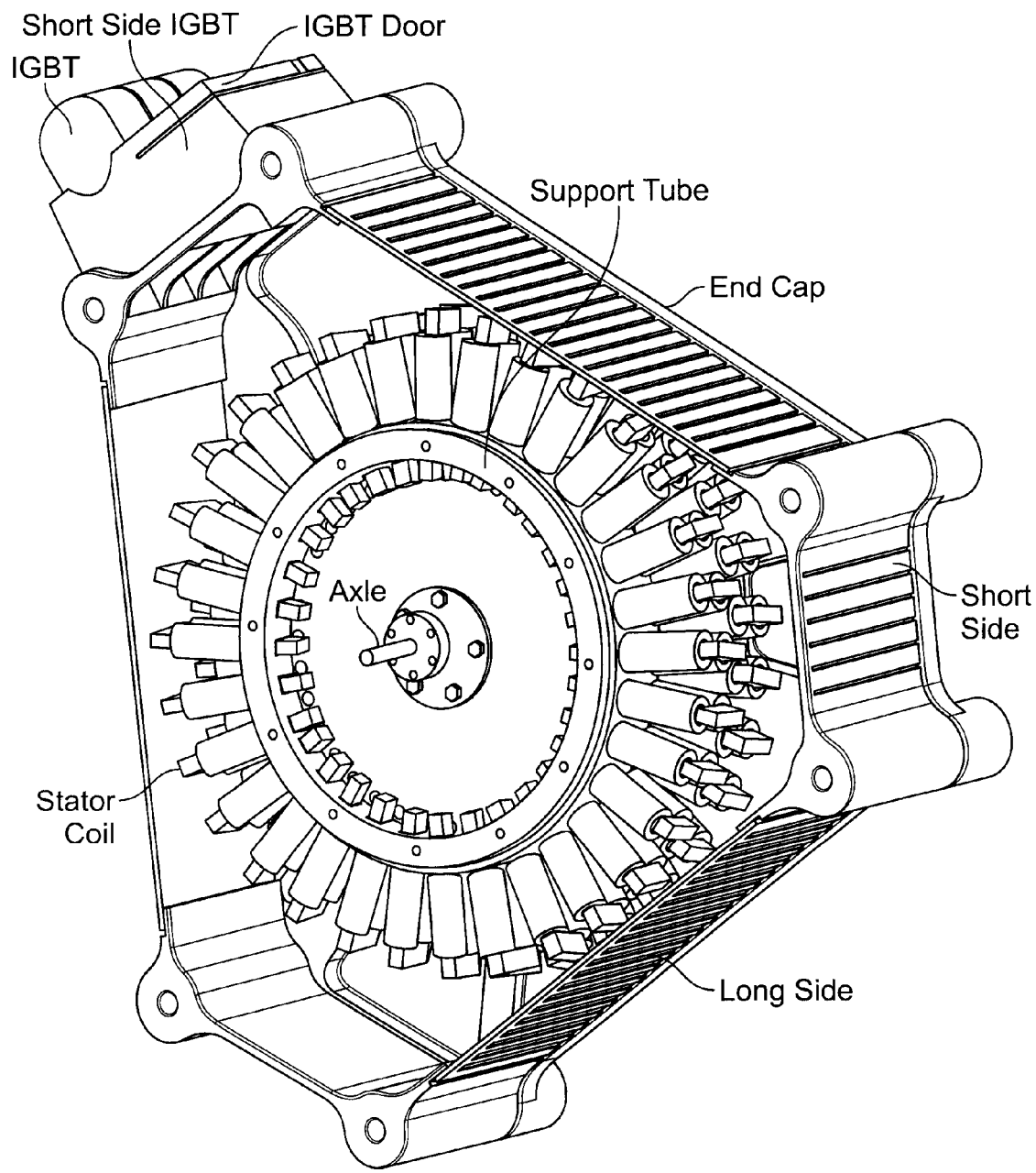
Figure 17:
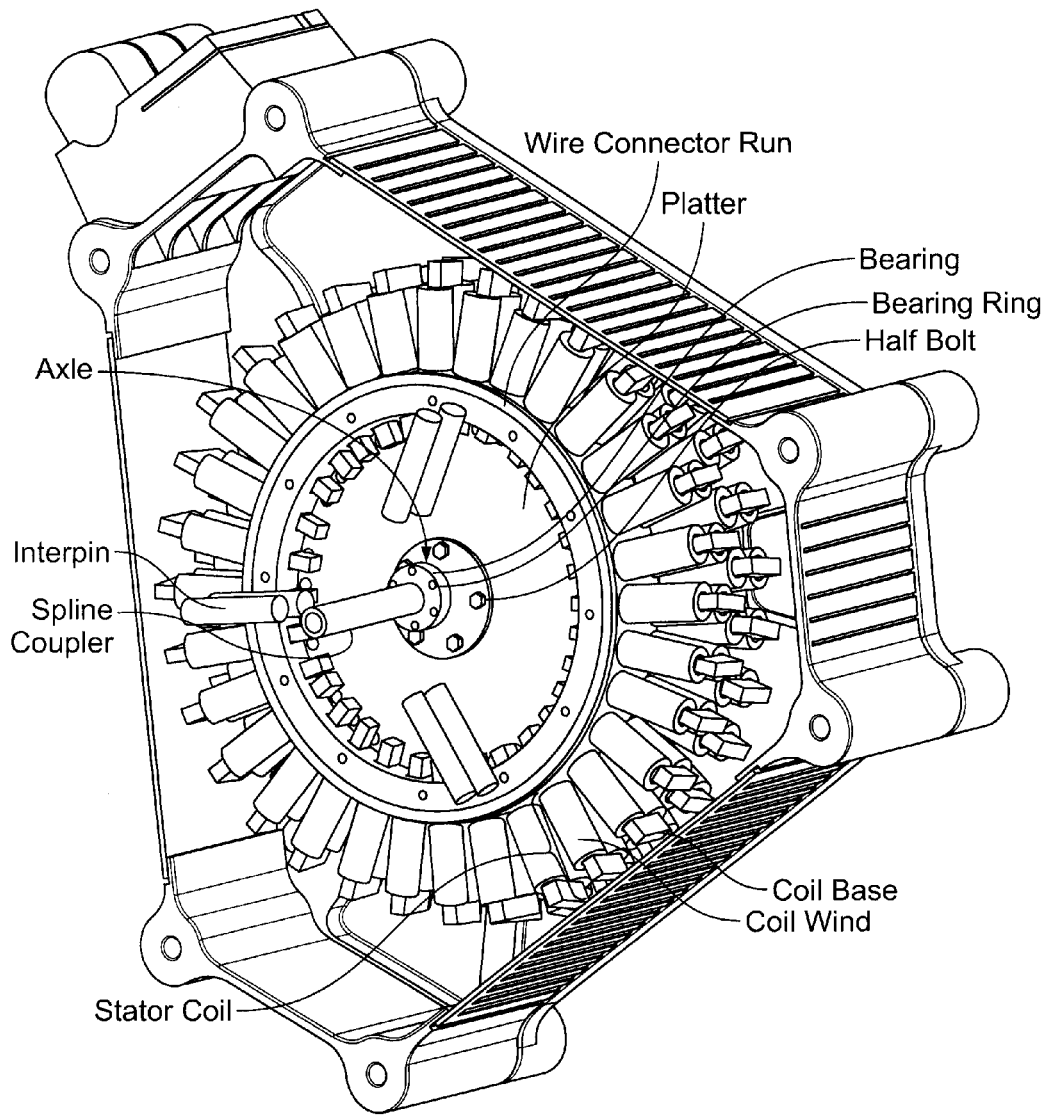

FIG. 15, FIG. 16 and FIG. 17 are additional views of the rotor and magnet assembly within the housing.

Principle of Operation of a Preferred Embodiment

A preferred controller 2012 (see FIG. 20) momentarily energizes each coil (as needed) to create a magnetic field that attracts the closest approaching rotor magnet and repels the closest receding magnet. Each such "kick" adds incremental torque to the rotor. FIG. 3 illustrates the basic principle for a few isolated magnets. In practice, the system preferably energizes the coils in sets of two or four at a time per rotor plate to take advantage of the system's symmetry. The timing must be precise or the impulse will retard the rotor instead of accelerating it. The timing typically needs constant adjustment to allow for varying loads and time for the coils to expand and contract the magnetic field. An encoder (described below) keeps track of the position of the rotor. In contrast to a conventional 3PIM, the DEM does not have to employ all of the poles. As the speed or load changes, the controller can reconfigure the coil firing sequence dynamically to utilize anywhere from 4 to 64 coils.

A pulse-width modulation (PWM) created waveform can be changed from a simple sine wave to a square wave for maximum torque. In energy saving modes a waveform can be changed to a modified half sine wave for an unused coil at a very low current situation in the trailing side of the magnet passing through the coil, to repel it just enough to avoid creating a huge back EMF and slowing down the motor; other coils are run at normal sine waves in this mode. The controller preferably also can vary the amplitude and timing of each magnetic impulse. Each coil-to-rotor impulse is a distinct controllable action. Thus, the DEM controller can effectively vary the capacity of the motor in real-time so that it is always operating as if it were designed to run optimally under the conditions present. U.S. Pat. No. 6,046,523, entitled, "Computer controlled electric motor and method thereof," which is incorporated herein in its entirety by reference, describes a variety of coil excitation methods that can be used by a controller of the present invention.

The controller of a preferred embodiment also senses and adapts to failures of individual stator coils or power supply modules in real time. In fact, the motor will operate even if more than half the coils have malfunctioned, although typically with impaired efficiency and capacity. The preferred design allows a technician to replace faulty modules while the motor is running; the DEM senses when a coil has returned to service and utilizes it. This capability is valuable for industrial applications that must run continuously and for generators.

The present invention also can provide a digital electric generator (DEG): a turbine or other mechanism drives the rotor shaft, and the controller configures the coils to extract energy from the system. The DEG can generate DC power without using brushes, external inverters, or bridge rectifiers. It can also generate AC power over a wide range of frequencies. Conventional AC generators produce power at a frequency fixed by the turbine speed. A preferred DEG can generate power at a steady 60 Hz, for example, even if the rpm fluctuates, using PWM schemes in the IGBT modules. This advantage can greatly simplify the control requirements on power plants. In a car, the present invention can switch itself into DEG mode to capture the vehicle's kinetic energy and store it in the battery to slow the vehicle (regenerative braking), with the same efficiency advantages as it possesses in DEM mode.

To reconfigure the stator, the central processor takes the variables from the user interface, determines the total power needed, then selects by priority the number of coils needed and their position. This selection is straightforward. For example, if 20% of the total power available is needed (e.g., 200 kw total, so 40 kw is needed) the processor looks at the absolute position and creates a "map" of the stator. Then it calculates the number of coils needed (e.g., 10 coils out of a total of 64 coils will use 2380 watts each, with a sine wave, and 54 coils will use 300 watts each, with a "tidal" wave (a half sine wave to repel only; the natural attraction of the magnet to the laminated core provides rotation without added power to the coil). This will provide most of the coils (54) running in a "standby" mode and configure the remaining 10 coils to do the actual "hard work" of running the motor. The reason for this standby mode is to resolve the back EMF caused by the magnets passing by the coil cores. And the 10 remaining coils doing the work are treated as though they were the only stator existing, so they are optimized for the particular speed and torque requirements. If later 100% power is needed, the motor will "reconfigure" itself to use all the coils to produce the needed torque. This reconfiguring process is done "on the fly" as needed in real time to always provide the most efficiency for given torque and speed requirements. In one embodiment, the "tidal" wave is substituted for a mechanical process to actually move the coil assembly away from the path of the magnets to eliminate the back EMF and include the turning off of the coils that are not needed. Illustrative examples are shown in FIGS. 21-31.

Controller

The controller in preferred embodiments of the present invention comprises a Xilinx field programmable gate array (FPGA) and a Microchip 16C series microprocessor or common PC processor and software. The FPGA functions like a dedicated hard-wired logic circuit, except that the microprocessor can "rewire" the circuit at any time. The FPGA preferably:

determines the rotor position from the data flowing from the encoder module;

consults a look-up table (LUT) to decide which stator coils to energize, at what time, for how long, and with how much power;

directs the power module to provide current to appropriate coils; and monitors the rotor response to ensure that operating conditions have not changed.

If the FPGA detects that the rotor speed or load is no longer optimally matched to its programmed configuration (or if an external signal, such as a driver stepping on the accelerator, requests a change in torque), it alerts the microprocessor. The microprocessor calculates which of several preset programs best matches the new conditions and downloads the new program from non-volatile memory to the FPGA. The new program loads in less than a single coil pulse time, so the transition occurs seamlessly.

Power Circuitry

In a preferred embodiment, a separate power driver energizes each stator coil under the direction of the FPGA. The power drivers preferably are insulated gate bipolar transistors (IGBTs)—H-bridge circuits that can source current in either direction to create the desired field polarity. Since the maximum current directed to a coil in one embodiment is only about 20 A, the individual drivers can be fairly small, straightforward circuits. A technician can hot-swap modules while the motor continues to run if a circuit fails. The controller module and the power module preferably are integrated within the motor chassis, as shown in FIG. 2. Thus, the DEM as a whole runs directly from DC power (e.g., batteries). It does not require separate inverters, reformers, etc. Even at 10,000 RPM the required switching time for the power drivers is 20 μs, which is not difficult to achieve. Advantages of this configuration comprise: (1) better efficiency due to less resistance from the H-bridge to the coil; (2) ease of diagnostics in case of failures; (3) space efficiency; (4) ease of replacement as a unit; (5) cost reduction in manufacturing; and (6) fewer wires needed to drive circuits (and therefore smaller wire harnesses).

The design for hot-swappable applications is advantageous as well. When the drive circuitry and power are turned on and off by the main controller, the output for faults and problem conditions (shorts and opens in the circuit) are relayed to the main controller. The preferred embodiment is physically constructed to be removed and replaced while running.

Figure 6:
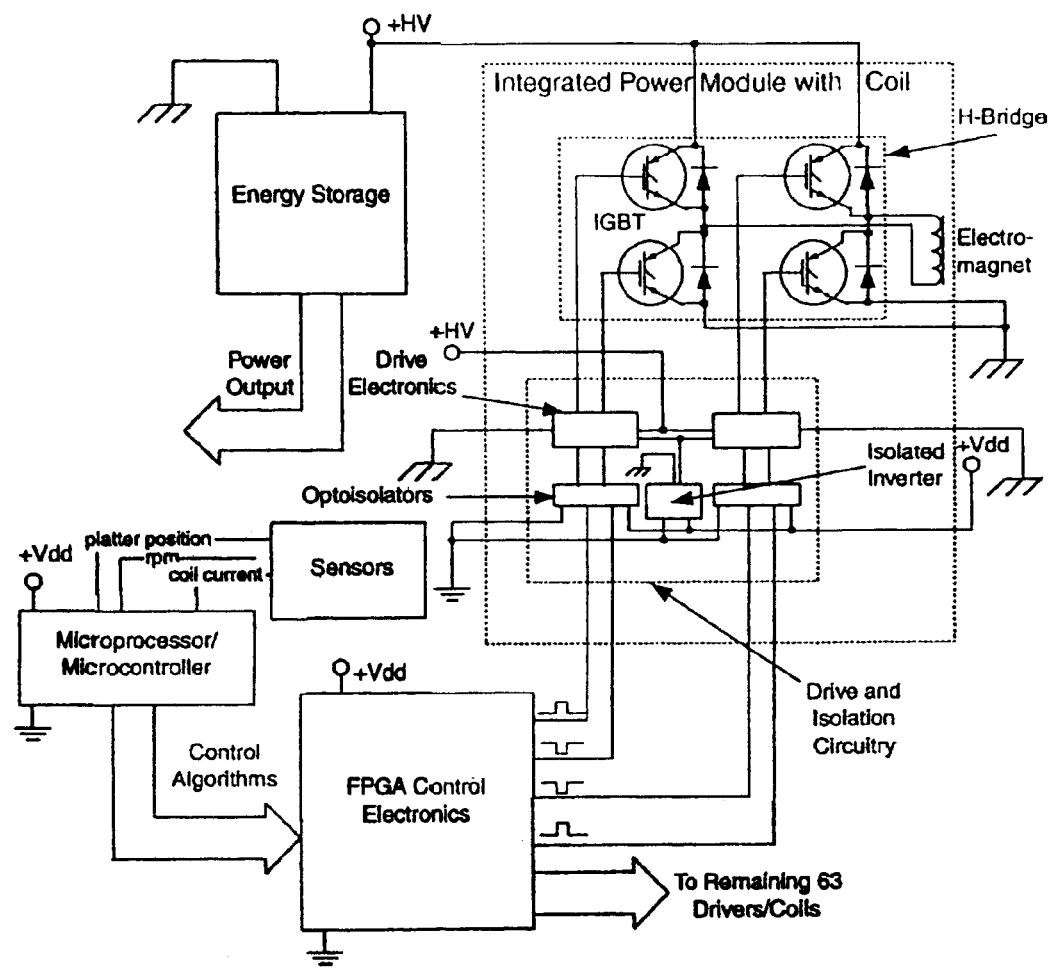
FIG. 6 provides an illustration of a power module, with a diagram of the generator controller circuitry used in one embodiment of the invention.

Preferred IGBT H-bridge circuits are shown in configuration in FIG. 6, an illustration of a power module with block diagram of the generator controller circuitry of a preferred embodiment of the invention. The control pulses are pulse width modulated. The FPGA may produce the pulse width modulation (PWM) or trigger dedicated external PWM chips (not shown). The simplicity of this circuit is possible because of the complexity embedded in the microprocessor and FPGA.

Encoder

In a preferred embodiment, an encoder is an electronic device that gives a number that relates the absolute rotational position of the rotor in reference to the stator. It basically tells the central processor 2002 where the rotor is for the timing of each module. A preferred module configuration is depicted in FIG. 20, along with preferred controller components.

User Interface

The user interface 2006 of a preferred embodiment comprises several input sensors and switches that enable a user to select: (a) direction (forward/reverse); (b) power level (e.g., gas pedal in a vehicle); (c) operational sensitivity (speed/torque: speed sensitive means the user interface will select and/or adjust the speed and the torque, and power input is the variable to maintain the speed selected, and torque sensitive means the motor tries to achieve maximum speed for any given power input); (d) and mode of operation. Mode of operation includes: (i) power—adjust the motor to produce the most power output regardless of the efficiency; (ii) efficiency—adjust the motor to optimize for the best efficiency; (iii) recharge—put the motor into a generator mode to convert the braking energy into electrical power to recharge the batteries; (iv) power brake—use the motor to power in the reverse direction to stop or slow down; and (v) processor/encoder "limp" mode—if the Central Processor 2002 or the encoder 2004 fails, then this mode enables the motor to operate from the user interface processor 2006. The user interface processor 2006 simulates the encoder 2004, gives each power module 2032 a position, and increments this position to have the motor just "follow the wave patterns" without really knowing the exact position. This can allow the motor to operate at a less than desirable efficiency and power levels but still operate enough to perform a task until the system can be repaired.

Central Processor

Referring to FIG. 20, the central processor 2002 takes encoder and rpm values, then calculates the difference in latency to return to the modules 2032. Also it takes variables from the user interface 2006 and, based on power levels, priority, direction, sensitivity, and mode, gives the individual modules 2032 the values they need to perform. Illustrative examples of this process are depicted in FIGS. 21-31.

Cooling Circuitry

Cooling circuitry 2008 takes the input from feedback of the H-bridge 2070 to determine the temperature and control the cooling fans.

Low Power Bus

Low power bus 2025 is the power supply for the control electronics.

High Power Bus

High Power Bus 2020 is the power supply for the coils.

Communication Bus

Communication Bus 2036 is the data line from the user interface 2006 and the central processor 2002 to the individual modules 2032.

Module Processor

Module processor 2044 takes the data from the user interface 2006 and the central processor 2002 in order to determine PWM requirement, wave type, wave position, generator circuit, failsafe circuit, and coil condition. This processor also directly controls the coils 2060 and includes wave tables in memory for look up.

H-Bridge Driver

H-Bridge Driver 2080 is the control chip to enable, disable, and/or give polarity to the H-bridge 2070.

H-Bridge

H-Bridge 2070 is the circuit that feeds the high power bus 2020 to the coils 2060.

Feedback Circuitry

Feedback circuitry 2050 takes temperature, coil condition, H-bridge condition and feeds it to the module processor 2044.

Coils

The coils 2060 are responsible for creating the magnetic fields to push and pull the magnets to create rotation, and also for taking mechanical energy from the rotor and converting it to electrical energy in the generator mode.

Regeneration Circuitry

Regeneration circuitry 2040 comprises a bridge rectifier to convert the AC from the coil to DC and send it to the high power bus 2020 for recharging batteries.

Advantages

The present invention offers a wide range of attractive features that will generally benefit most applications:

On-the-fly dynamic reconfiguration. The intelligent controller enables this unique capability, which is responsible for the DEM's high efficiency, high starting torque, unprecedented flexibility, scalability, and fault tolerance.

High energy efficiency over its entire operating range. Conventional motors become grossly inefficient at low speeds. The DEM remains efficient over a wide range of speeds. For example, it is efficient enough at low speeds to drive the wheels of a car with a 1:1 (direct) gear ratio (i.e., without a transmission).

High starting torque. The DEM delivers about 90% of its rated torque at less than 1 RPM. It can accelerate its load responsively while consuming only slightly more power than it delivers to the load. A conventional motor must be pushed hard to generate high torque on start-up, wasting energy and causing substantial heating.

Flexibility. A single DEM design can serve many different applications: high constant power, high low-end torque, precision control (e.g., for machining), and/or frequent start-stop operation. The controller's adaptation of the motor is transparent to the user.

Scalability. The design for a single DEM scales economically. The user can stack multiple DEMs in parallel on a single axle to achieve higher power and/or torque; the motors will independently adapt automatically. To stack conventional motors, the user must reconfigure the motor gear ratios—a difficult task.

Fault tolerance. The controller can detect failures of individual stator coils and power modules and compensate instantly. The DEM will continue to run with fewer than half the coils functioning, albeit possibly with reduced capacity and efficiency.

Cool operation. The flat efficiency curve means that the DEM generates relatively little heat. In EV applications and most other applications, air cooling will suffice.

Smooth, quiet operation. The high number of effective poles combined with the preferred non-commensurate 36/32 ratio of coils to magnets results in a smooth, low-noise operation without cogging.

Low cost. The DEM shifts complexity from the motor's physical construction (especially the wire windings) and the sophisticated power electronics found in an inverter to a sophisticated set of control algorithms. The physical construction of the rotor and stator assemblies, especially the windings, is simpler than that of a conventional motor (winding contributes most of the complexity and cost to traditional motor manufacture). The stator coils and the power modules are repeated identical elements. The unit cost of production of the DEM is low. The DEM includes all the control and power circuitry required for operation from a DC source. Variable speed operation of conventional 3PIMs requires a separate inverter unit, which adds substantial cost per unit. The DEM, when used in a car, can also eliminate the need for other expensive car subsystems, such as a transmission.

Light weight. The low operating temperature enables the substitution of high-strength plastic for metal in the rotor and the stator housing, reducing the total weight by 30% or more.

Easy maintenance. The stator coils and power modules preferably are hot swappable. The controller and the rotor assembly are easily replaceable. Essentially the only moving part is the rotor axle, held by two bearing assemblies. There are no brushes.

Benefits for Electric Vehicles

Figure 18:
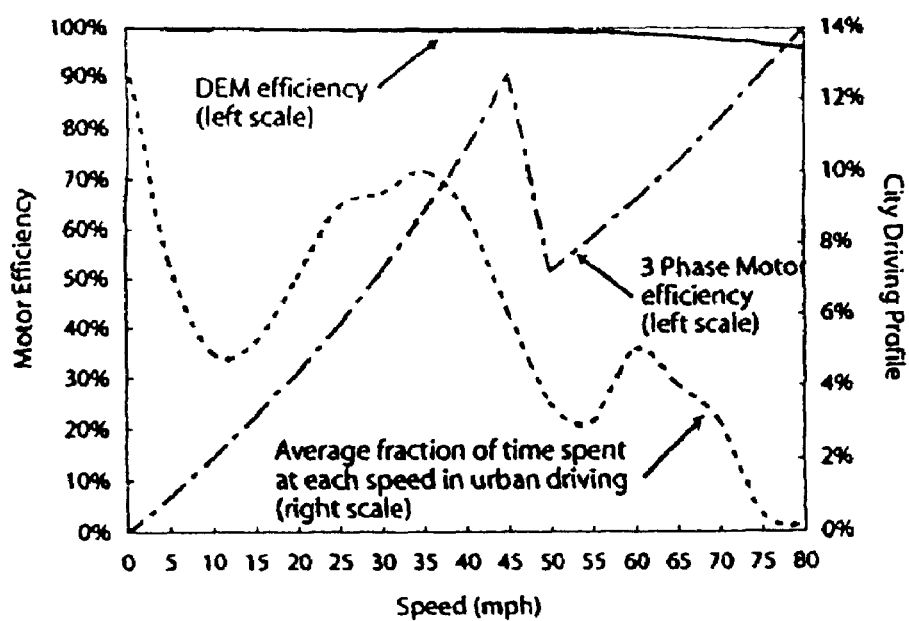
FIG. 18 depicts a comparison of the efficiency of one embodiment of the present invention to that of a conventional 3-phase motor with a transmission.

The general advantages of the present invention confer numerous specific benefits in EV applications, set forth below. FIG. 18 is a comparison of the efficiency of the DEM to that of a conventional 3-phase motor with a transmission. It illustrates the essential advantage of the DEM: high efficiency over a wide operating range.

The solid line shows the calculated efficiency of the DEM for a simplified configuration. The broken line shows the estimated efficiency curve for a state-of-the-art Ford EXT three-phase AC induction motor with variable speed driver and a two-step transmission (both curves are first-order approximations that neglect high-order terms, mechanical losses, and power supply losses; the latter will depress each curve by a uniform 2-4%). These efficiencies apply to acceleration, cruising, and recapture of energy through regenerative braking.

Note how the "peak efficiency" of the three-phase motor may be misleading. The dotted line shows the fraction of time that a car spends at different speeds under average city driving conditions in Los Angeles. The average car spends most of its time in the city at low speeds, accelerating from stop and braking—conditions under which the three-phase motor performs poorly. Convolving the typical driving profile with the efficiency curves demonstrates that the DEM can double the range of an EV compared with a three-phase motor for the same power supply. The efficiency curves for all conventional motor designs suitable for EVs share the same basic shape.

A conventional 3PIM requires a transmission and water cooling. Furthermore, there is a trade-off between efficiency and low-end torque, and a design with the responsive feeling of a combustion engine would be highly inefficient. Further, the inverter is too complex and expensive to discard as a result of a single component failure. A conventional 3PIM is also typically noisy when in use.

In contrast, a DEM requires no transmission because it provides internal automatic reconfiguration on-the-fly. It also provides the ability to brake hard at any speed, and has no need for caliper and/or drum brakes except at a complete stopped situation and for a mechanical safety backup. It has high efficiency over the entire operating range of the vehicle, more efficient acceleration and recapture of energy from regenerative braking, and high torque at low rotation speeds. It has responsive acceleration from a stop (comparable to a V-8 gasoline engine) without a transmission, enabling it to be used to power heavy equipment, such as trucks and tanks. It also has scalability. The motor is sufficiently inexpensive to give the user many options: one DEM can be used to power one axle, or two DEMs can be used to power two axles or even two separate wheels. This eliminates the need for a differential, which can cause loss of power.

The DEM's fault tolerance leads to higher reliability. It also results in a smooth, quiet, cool operation because no radiator is required. It is cheaper than a conventional 3PIM because it draws DC power from batteries, so it does not require a separate inverter. It is lightweight and efficient because it eliminates the need for a transmission and radiator, and reduces the requirements for batteries and/or hybrid generation capacity. This further reduces weight and increases efficiency without resorting to exotic car body materials. It is also easy to maintain, because the modular design permits easy repair by mechanics with minimal retraining, and the power modules are cheap enough to discard when they fail.

Advantages for Industrial Applications

The present invention's internal reconfiguration on-the-fly provides an adaptability to changing load conditions, making it ideal for driving machine tools, conveyors, compressors, and pumps. It also has automatic compensation for failure of a motor when multiple DEMs are used. Its ability to function as a power phase compensator (when connected to a dummy inertial load) reduces the cost of power to industrial plants that represent an inductive load to the power grid, and this can ultimately lead to the elimination of the need for capacitor banks.

The DEM's high efficiency over the entire operating range and ability to generate high torque at low rotation speeds leads to electricity savings of up to 50% or more (applications with more frequent starts/stops or highly variable loads will see the greatest savings) and efficient startup of high-inertia loads. Because of its flexibility in configuration, one or two DEMs can serve all of the needs of an entire factory. Its scalability makes it easy to add extra motors to drive a shaft to increase power or torque, and therefore eliminates the need to over-specify the motor capacity.

The DEM's fault tolerance leads to higher reliability. Hot swap repair eliminates down time. The low cost, smooth, quiet and cool operation leads to reduced plumbing requirements and less vibration. It is also easy to maintain, because the modular design permits easy repair by mechanics with minimal retraining, and the power modules are cheap enough to discard when they fail.

Advantages of the Digital Electric Generator

Because of its internal reconfiguration on-the-fly, the DEG has an ability to generate DC power or AC power over a wide range of frequencies when spinning at around 100 RPM or faster. It also can generate power at a constant frequency even as the turbine speed changes, and it enormously simplifies the operating constraints on a power plant, many of which are imposed by the need to maintain a constant frequency.

Because the DEG exhibits high efficiency over the entire operating range, it leads to greater flexibility in plant design and generator deployment. Its scalability leads to the advantage that the same underlying concept is capable of being scaled up to megawatt-sized units. Its fault tolerance is advantageous because hot swap repair eliminates generator down time. It has smooth, quiet operation with less vibration and lower capital costs.

Additional advantages of generator embodiments comprise:

1. Low rpm (Wind Speed) Operation

Due to the physical construction diameter, the generator can operate at a lower rpm (wind speed) than conventional generators, while maintaining output voltages and varying the current output as the available torque changes. See FIG. 44.

2. Series/Parallel Switching

By having the coils arranged in parallel, the generator will produce its maximum current output. However, by also having a circuit to switch incrementally to several stages of series/parallel, higher voltages can be generated with less current at lower rpm, thus providing a generator that will reconfigure itself to become a smaller current output generator for lower speeds. This function will greatly enhance a wind generating system when the wind is slower; at such times prior art wind generating systems often need to shut down. See FIGS. 45-48.

3. Modular Soft Fail

Because the generator is modular and the coils can be incrementally removed, if one happens to fail it will only be taken offline and the other coils will still operate. Thus, the generator can incrementally fail and still operate at a reduced maximum output, depending on the number of failures.

4. True DC 64 Phases

Figure 49:
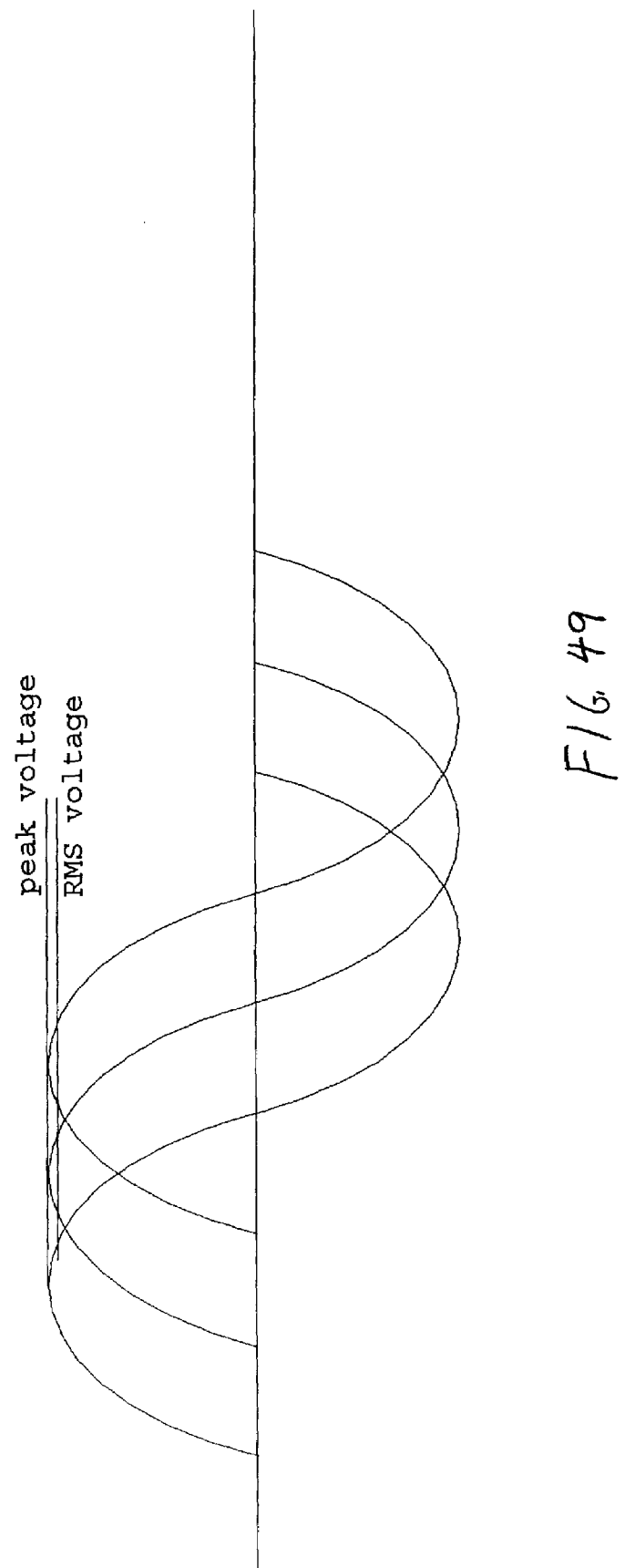
FIGS. 49-50 illustrate advantages of having more than 3 phases.
Figure 50:
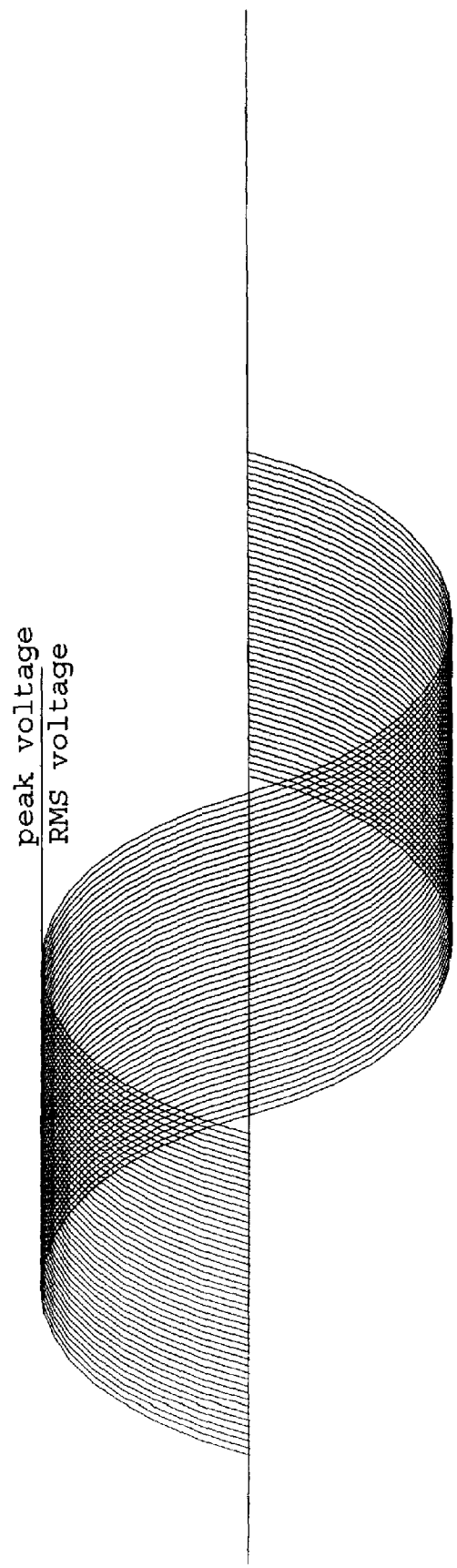
Figure 51:
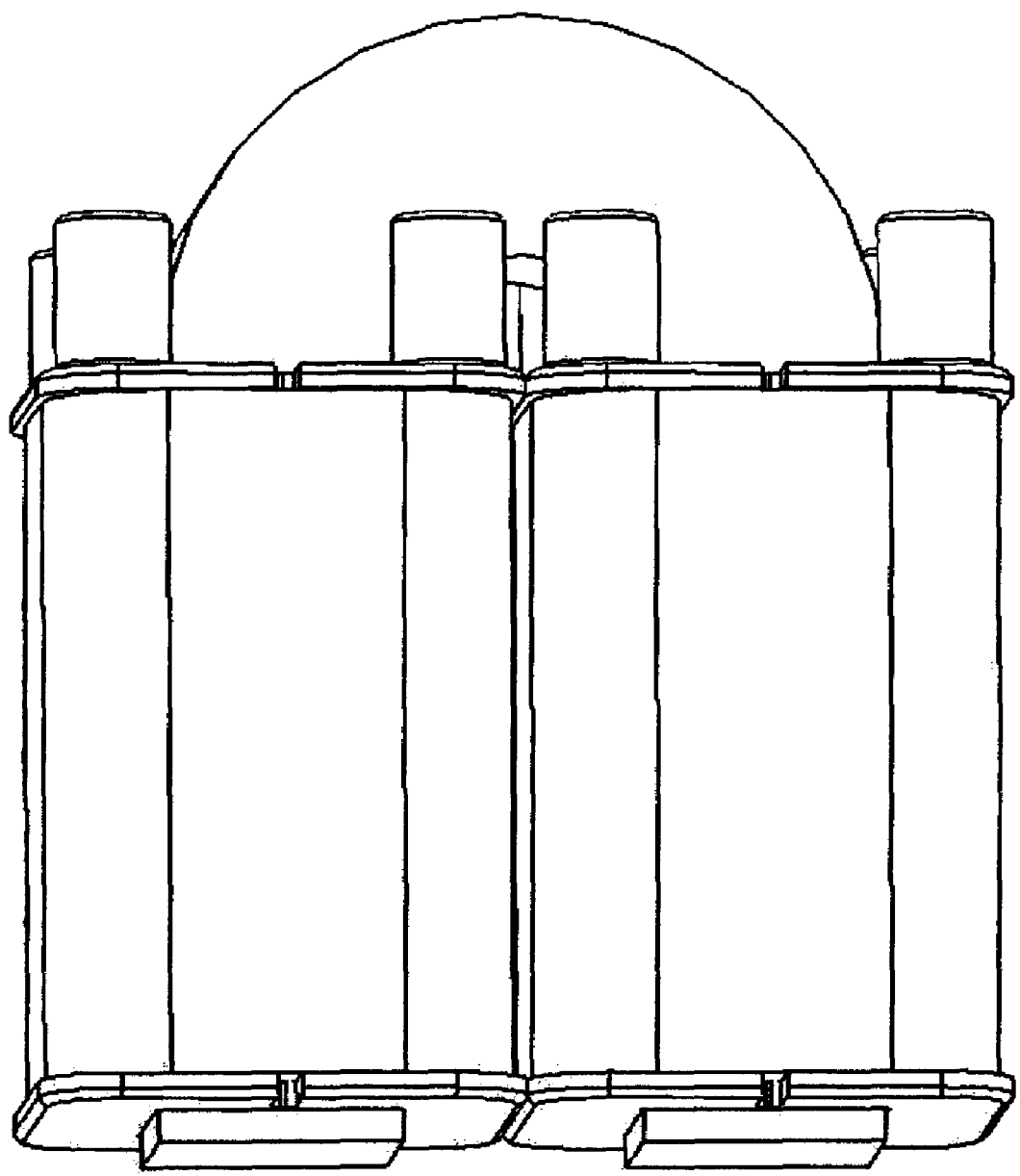
FIG. 51 depicts a preferred bobbin core assembly.
Figure 52:
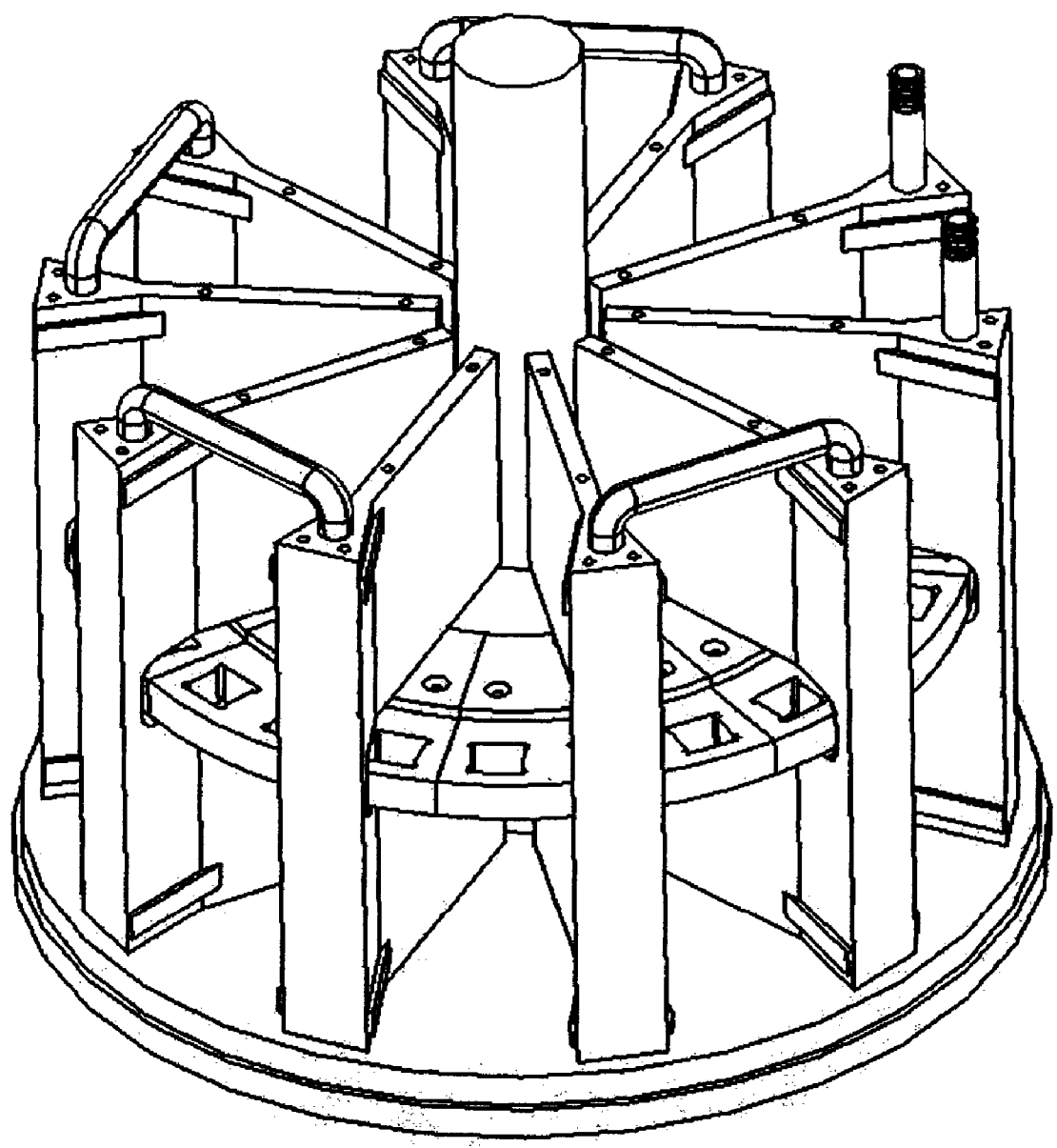
FIG. 52 depicts a preferred cooling system.
Figure 53:
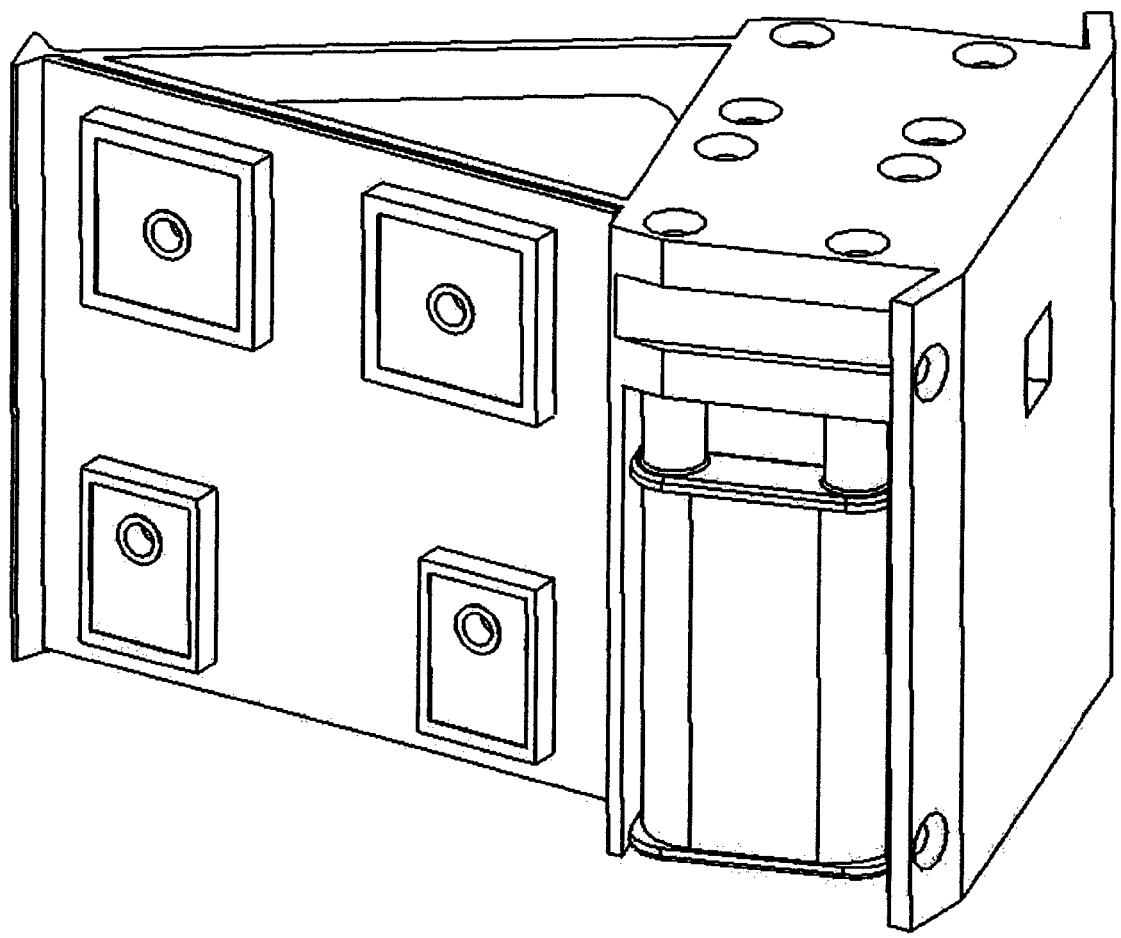
FIG. 53 provides a view of a preferred module.
Figure 54:
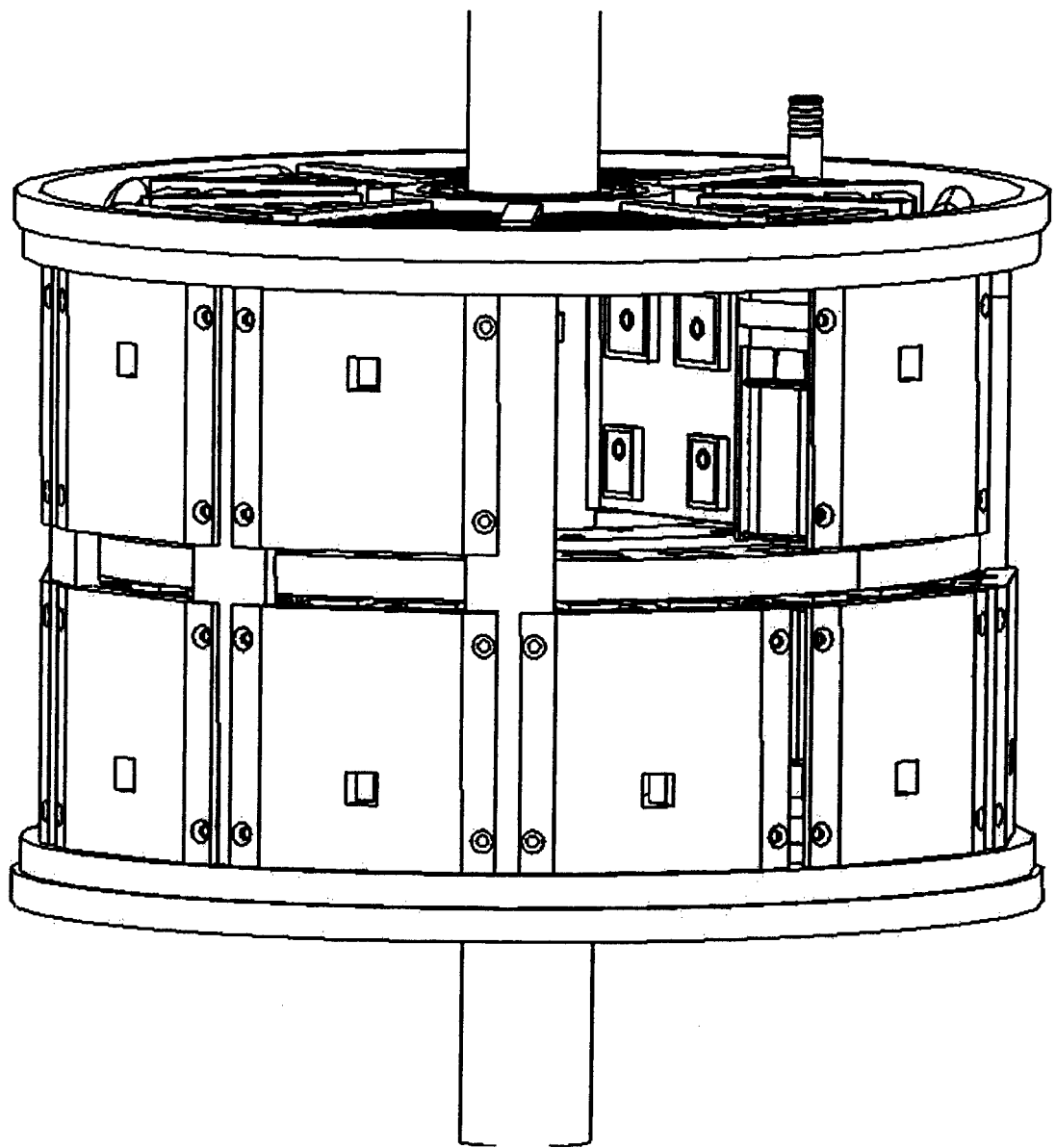
FIG. 54 depicts a preferred motor with column and module removed.
Figure 55:
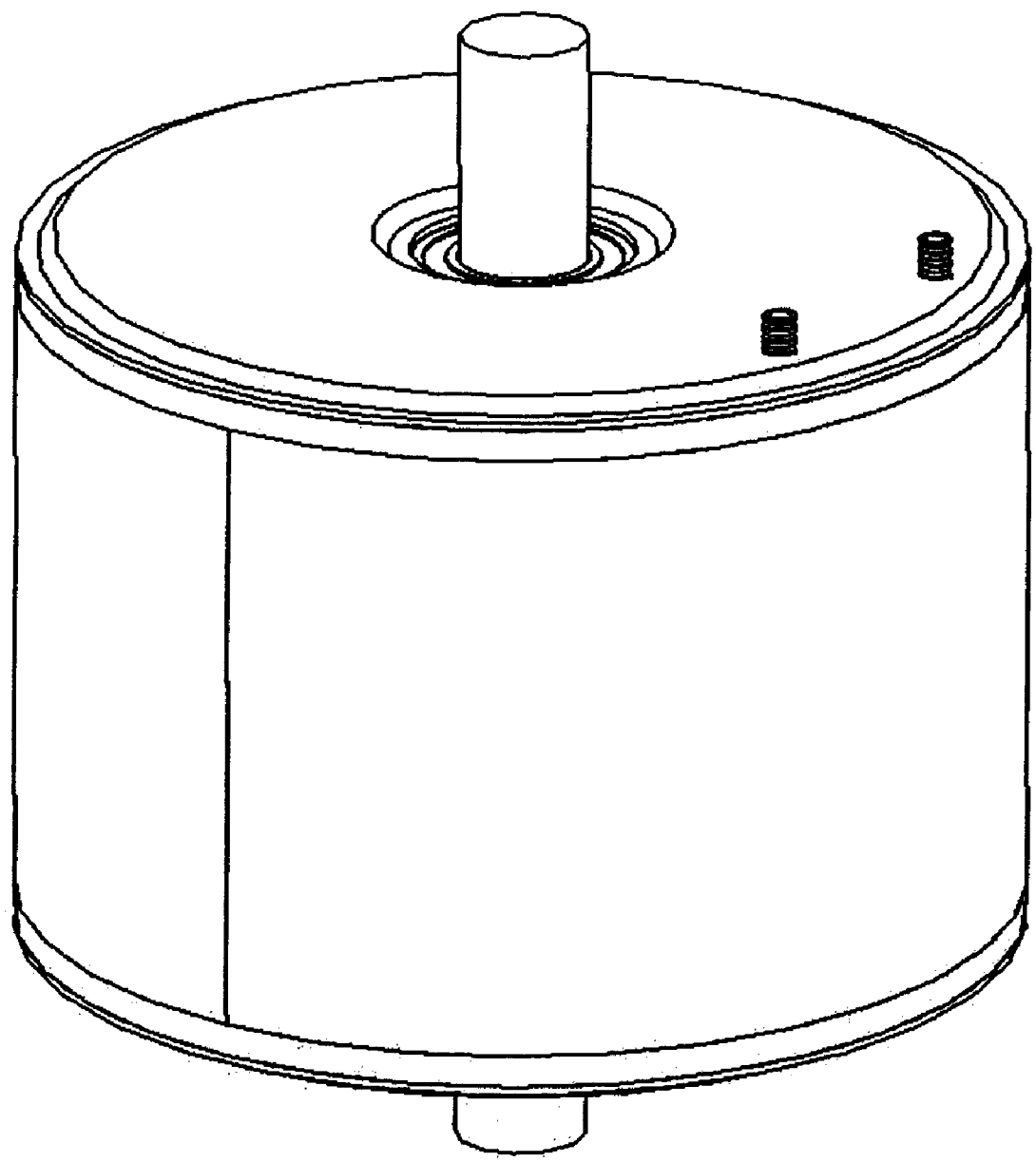
FIG. 55 depicts a preferred motor with covers.
Figure 56:
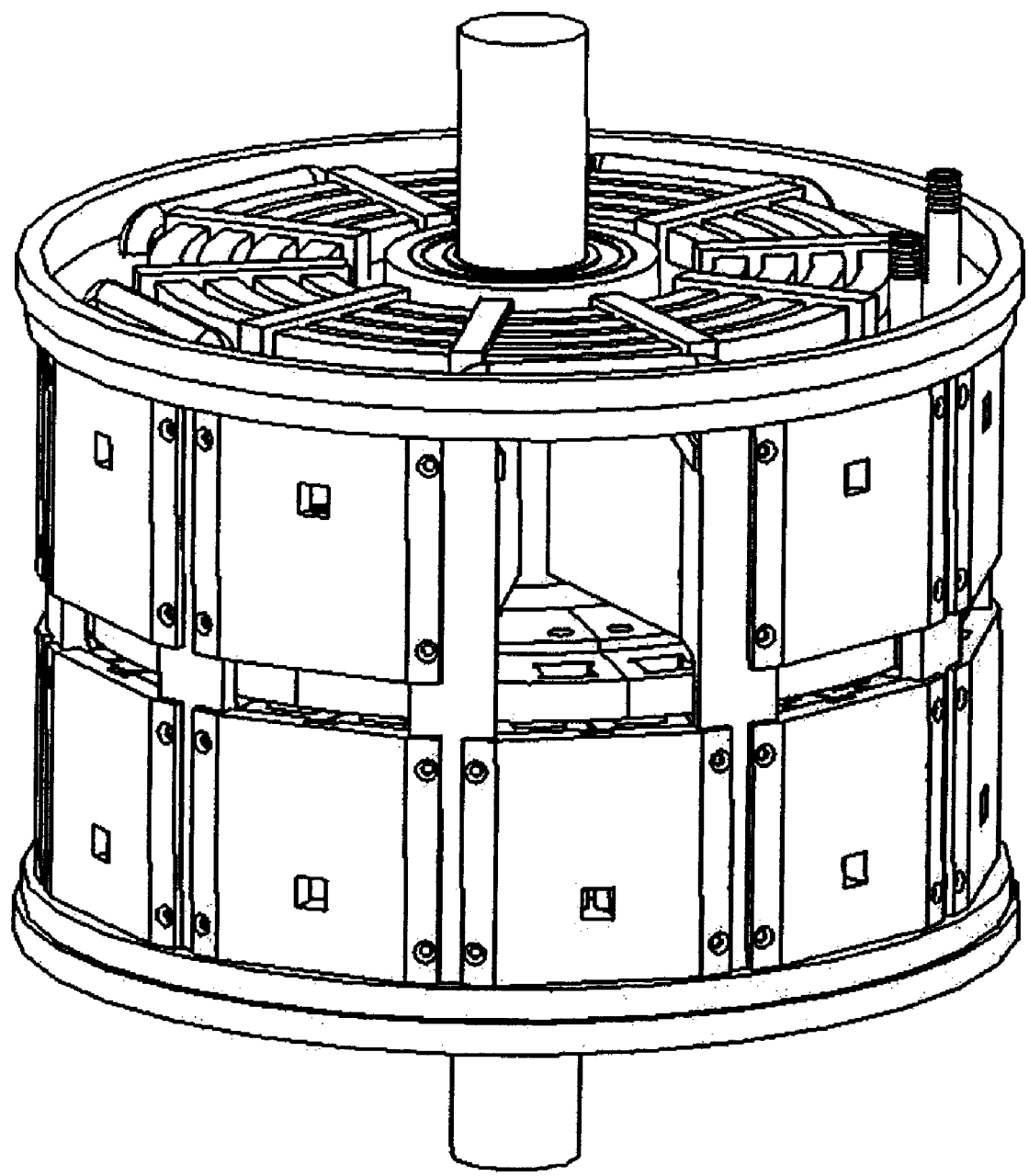
FIG. 56 depicts a preferred motor with module removed.
Figure 57:
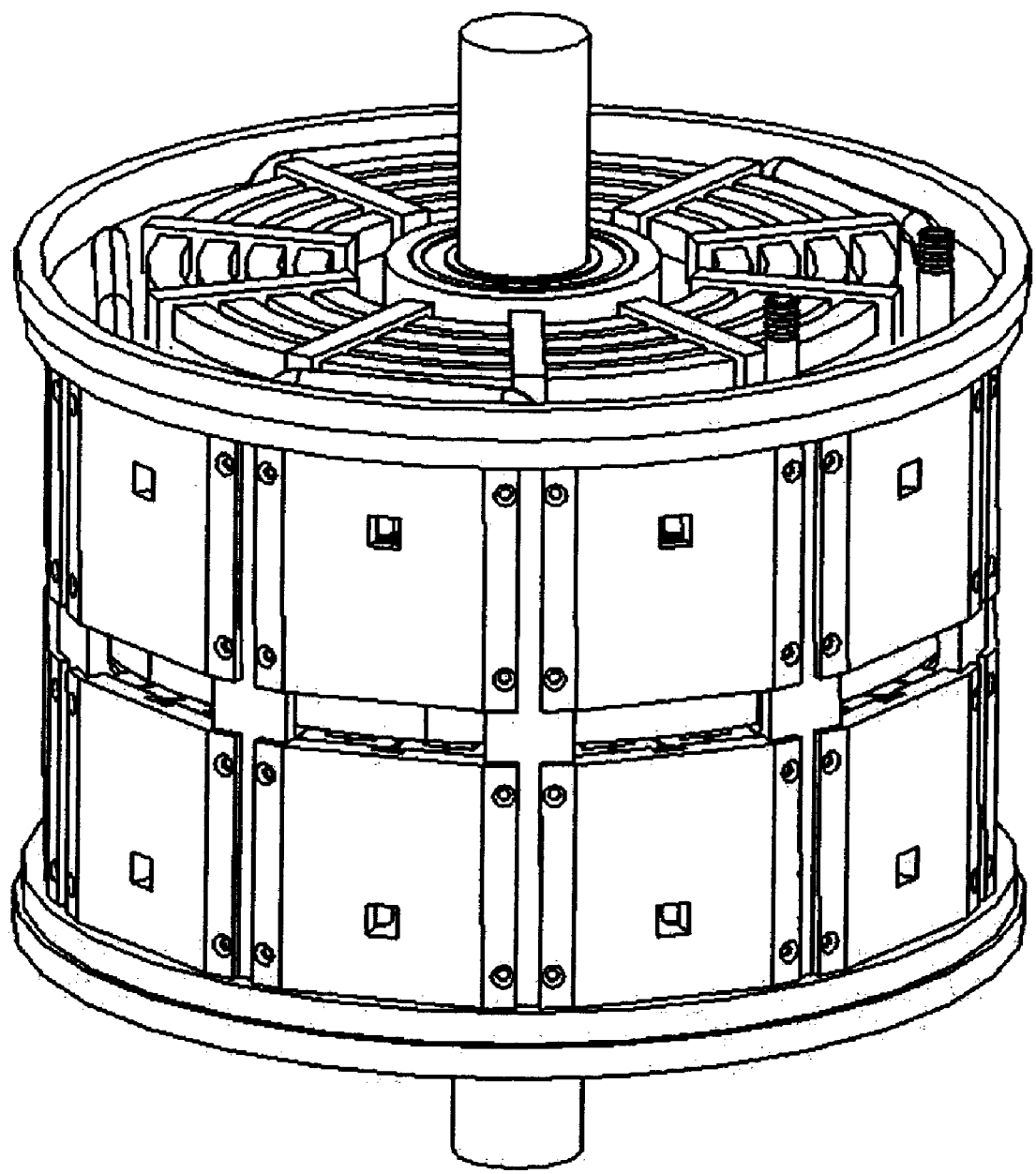
FIG. 57 depicts a preferred motor without covers.
Figure 58:
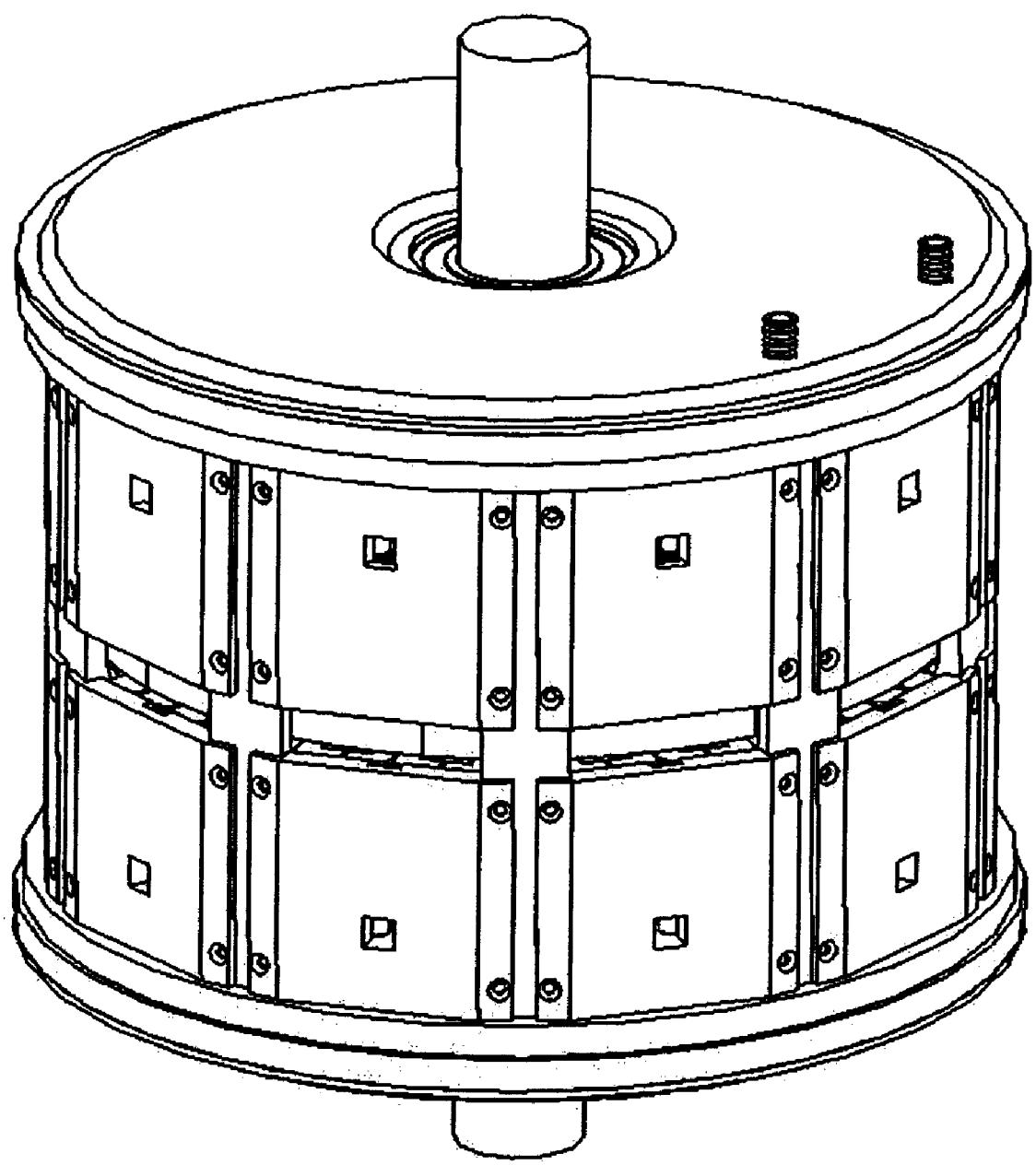
FIG. 58 depicts a preferred motor without side covers.

Conventional generators normally have 3 phases, and thus when producing a DC output using bridge rectifiers need filtering capacitors to maintain voltage levels constant. This peak voltage verses RMS voltage is lower in the case of 3 phases as opposed to having 48 phases (or 64 phases) (as in the disclosed embodiments) that overlap close enough so as to not need filtering capacitors, thus maintaining a higher RMS voltage. See FIGS. 49 & 50.

5. Lower Weight

Due to the preferred open frame large diameter construction and the use of composites, the generator weighs less than conventional 3 phase generators, which need more steel in the stator section for the magnetic path (the disclosed embodiments use laminated cores) and the individual windings. They need a heavy rotor to accept the large currents in a small diameter, as opposed to the disclosed open frame rotor and magnets, which weigh much less.

6. Lower Cost to Manufacture

By using composites and mass production of identical multiple smaller components, the cost of materials and manufacturing is reduced, and assembly and serviceability of the disclosed generators is improved over the prior art.

7. In Operation Servicing

Due to the modularity and the individuality of the disclosed stator design embodiments, a coil module may be deactivated and replaced while the generator is in operation. A conventional generator would need to be shut down, removed to another location, repaired, then replaced and tested before operation could resume.

Aspects of the Digital Electric Motor

The three principal types of conventional electric motors typically considered for deployment in EVs are the three-phase induction motor (3PIM), the switched reluctance motor (SRM) (see K. M. Rahman, et al., "Advantages of Switched Reluctance Motor Applications to EV and HEV: Design and Control Issues," IEEE Transactions on Industry Applications, Vol. 36 No. 1, January/February 2000, pp. 111-121), and the permanent magnet brushless DC motor (BCDM) (see L. Chang, "Recent Developments of Electric Vehicles and their Propulsion Systems." IEEE AES Systems Magazine, December 1993, pp 3-10). The DEM is a unique motor type which borrows some elements from all three categories. In this description we compare the DEM to the 3PIM, because it is the most prevalent design in EVs. The SRM is conceptually closer to the DEM: it also employs a high-multiple arrangement of fixed magnets (though on the stator rather than the rotor) that interact locally with coils to impart many small impulses to the rotor. However, like the 3PIM, the SRM and the BCDM cannot reconfigure themselves dynamically, and all three designs suffer from poor performance at low speeds. Although the details differ, the DEM outperforms all of these motor types for the same fundamental physical reasons.

Design elements that distinguish the DEM from conventional approaches include, without limitation:

- a "virtual" magnetic field geometry that shifts complexity from hardware to software and enables dynamic reconfiguration of the motor;
- reliance on sophisticated algorithms to run the motor and optimize its performance in real-time;
- multiple distributed, low-capacity, low-cost power modules in place of a single, high-power, high-cost inverter; and
- plastic components that are lighter than steel and are non-magnetic (possible because the high efficiency reduces heat dissipation that would melt Lexan, for example, in a conventional motor).

Preferred embodiments of the present invention are capable of a torque of 1000 N-m at stop, a rotational speed of 1500 RPM, a power output of 150 kW, the ability to accelerate a vehicle from 0-60 MPH in 7.5 seconds, a vehicle speed of 100 MPH (at a 1:1 gear ratio and no transmission), and a 100% range increase in urban traffic conditions. This last percentage value is calculated by comparing it with the best electric motor/inverter combination currently under consideration by the automobile manufacturers that provide comparable performance with the same energy source. This criterion is more meaningful than simply specifying a motor efficiency because (a) efficiency varies with load and speed; (b) actual driving conditions sample the efficiency curve to reflect real-world performance; (c) the DEM includes its own power circuitry and does not require an inverter (which introduces its own inefficiencies); (d) driving range captures the effects of improved regenerative braking; (e) the DEM simplifies the drivetrain and reduces losses between the engine and the wheels; and (f) the DEM eliminates the need for the radiator, transmission, inverter and other heavy components. In other embodiments, other torques, speeds, powers, accelerations, and other properties are possible.

Figure 19:
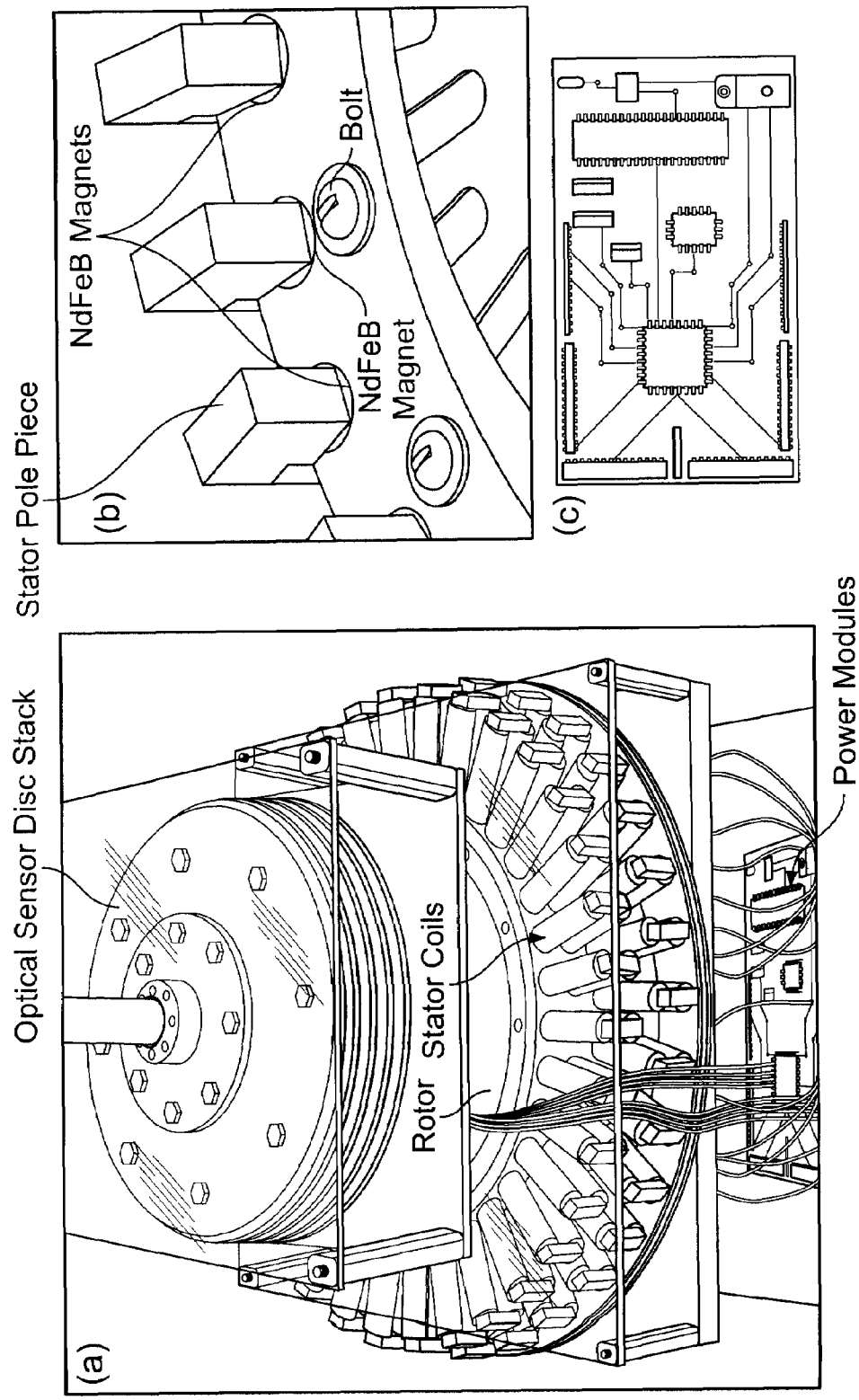
FIG. 19 depicts an overview of one embodiment, along with a close-up of a rotor edge and controller board of one embodiment.

FIG. 19(*a*) depicts one embodiment of the present invention. It shows that an inexpensive modem embedded system can effectively track the motor's state and manage the complex stator energizing pattern to spin the motor and generate high torque at low speeds. But this embodiment does not necessarily optimize energy efficiency. It employs simple hand-wrapped solid iron stator cores (which are subject to eddy current losses—discussed below), elementary power modules, on/off coil energizing without incremental steps to generate a smooth ramp, no optimization of the magnet and stator pole piece shapes, and many other sub-optimal components and design choices. This embodiment generates high torque at low speeds. FIG. 19(*b*) provides a close-up view of the rotor edge. FIG. 19(*c*) depicts a controller board of this embodiment.

Other embodiments of the invention are described below.

Sensing—One embodiment of the invention determines the rotor position by an encoder sensing light transmitted through a stack of discs fixed to the rotor with notches cut into the edges.

Control electronics—In a preferred embodiment of the invention, an FPGA directs the power modules to energize the coils in the proper sequence according to a fixed algorithm, and a microprocessor reprograms the FPGA on-the-fly as conditions change. In other preferred embodiments, the FPGA is upgraded to the latest generation, or it is completely replaced with a microcontroller. The FPGA is extremely fast, but the microcontroller is more flexible and simplifies the implementation of results from software simulation models. It is, however, typically more expensive than the FPGA.

Power electronics—In another preferred embodiment of the invention, the IGBTs that are arranged in H-bridge configuration to drive the coils are replaced with metal-oxide semiconductor field effect transistors (MOSFETs). In another preferred embodiment, the stator cores are counter-wound with two sets of coil windings and a unipolar supply is provided to one of the windings, achieving bidirectionality.

Stator core design—When a time-varying magnetic field penetrates a conductor, it induces circular currents ("eddy currents") that dissipate energy—a source of inefficiency and heating in all motor designs. Breaking up the core into layers separated by insulating material reduces eddy current losses. Other embodiments of the invention have laminated and/or powdered silicon steel cores.

Software Simulation

One aspect of the present invention is the ease with its performance may be optimized using software simulation of the motor. The state of the art in electromagnetic simulation has advanced enormously in the past few years, making feasible a complete simulation of the currents and fields surrounding the neighboring coils during motor operation. The simulations have enabled visualization and tuning of motor control algorithms and a comprehensive understanding of the various types of losses in the motor. For example, the model has enabled the partition of energy losses into several categories, such as: (1) eddy current and hysteresis losses in the stator cores; (2) resistive losses in the stator windings; and (3) uncaptured high frequency electrical energy reflected back to the power circuitry from the coils.

The software model comprises several linked models to simulate the power circuitry, static magnetic field patterns around the coils and magnets, and interacting electromagnetic characteristics (inter-coil coupling, coil-magnet interaction, core losses, etc.).

The design of the DEM lends itself particularly well to accurate simulation because the critical interaction regions are confined to the narrow gap regions of the stator coils. The simulations were run within Ansoft's Maxwell 3D Field Simulator package, using a master program that uses the Ansoft Optometrics package to invoke Maxwell 3D to calculate the fields at a given instant, determine the proper time interval, evaluate the magnetic field derivatives to calculate the change in flux, and compute the dissipation in the cores and the induced currents in the coils. The control program then incorporates these changes into the input parameters, steps the time forward, and invokes the Maxwell 3D again for a new configuration.

A set of macros create the three-dimensional representation of the coils from a set of design parameters (coil width, length, coil bending radius, pole gap, winding start and stop positions, winding density, etc.): A description vector of real numbers describes a particular coil design and the macros translate the vector into a representation format suitable for insertion into the Maxwell 3D.

Other functionalities were developed, such as computation of economic cost and weight, whole-motor simulation, and intensive stator coil modeling and optimization.

If interactions between coils and between a coil and non-adjacent permanent magnets could be neglected, then simulation of a single coil and 3 magnets would suffice to characterize the entire motor exactly. In practice, however, the mutual inductance between the coils is small but not entirely negligible.

For preferred embodiments of the present invention, the number of coils and magnets is too large to permit simulation of the entire motor. Instead, the simulation was performed for 2 to 12 adjacent stator coils interacting with up to 5 nearby permanent magnets on the motor. This approach provides guidance on how to minimize deleterious interaction effects. It is small enough to permit a perturbative "whole motor" approach that calculates the fields for nearest neighbor coils, replays the calculated field profiles in distant coils while recalculating the effect on the nearest neighbors, and so on until the iteration converges sufficiently.

Figure 59:
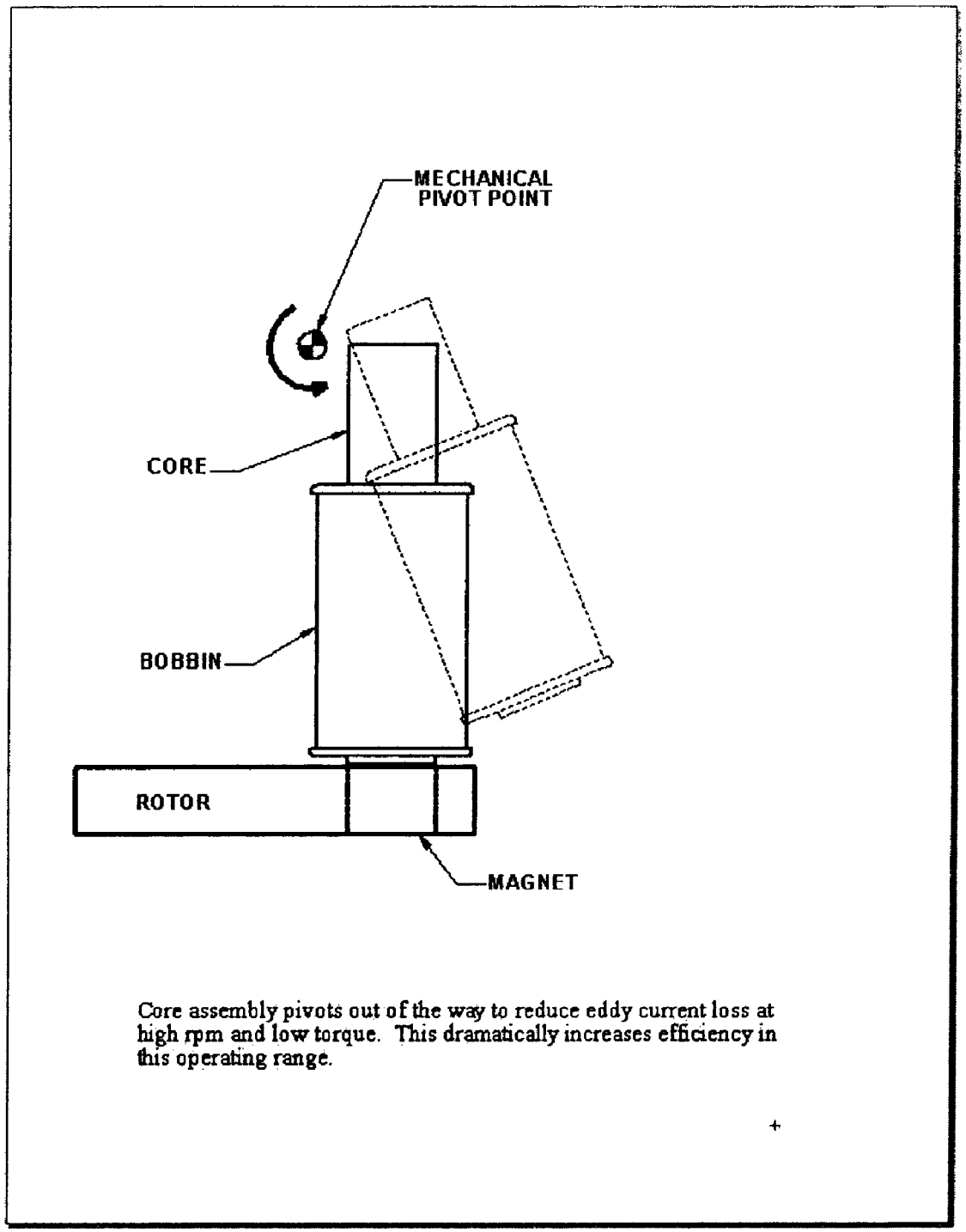
FIG. 59 illustrates preferred core movement.
Figure 60:
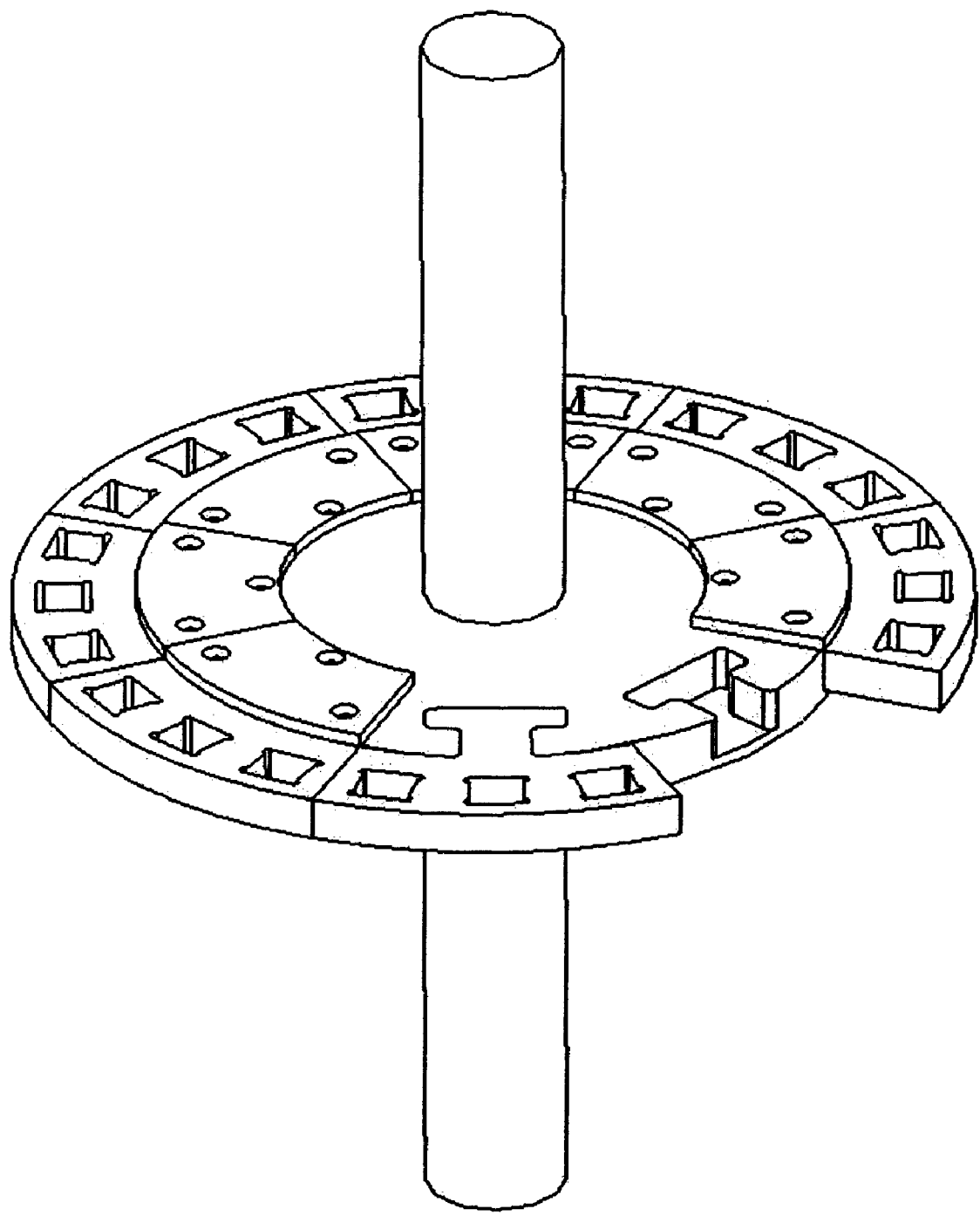
FIG. 60 depicts a preferred segmented rotor.

In an alternate embodiment, the system has only one rotor section and the laminated coil cores are situated in a modified "U" shape instead of the "C" or "E" shape described above. The "U" shape does not encapsulate the rotor edge and the entire magnet. Instead, it resides in pairs above and below the rotor section so the magnetic path goes from one "U" shaped above through the magnets in the rotor to the "U" shaped section below. This allows for a more compact motor while still maintaining the larger rotor diameter needed for high torque and lower rpm. This further allows for the coil and core sections to hinge at the curved portion of the "U" shaped core and swing outwards at the two end portions where they align with the magnets path in the rotor. This removes the core from the path of the magnets and reduces the back EMF when this coil needs to be turned off, due to a lower torque requirement, increasing efficiency. See FIG. 59. The coils preferably are moved and turned off incrementally, so as to more efficiently reconfigure the motor to be different in its output power.

In this embodiment, the motor also has the frame constructed so as to incorporate the liquid cooling system inside. This further compacts the design in size and weight, while improving its performance in cooling and strength. It is still modular in design, as in the embodiments described above, but also has only 2 inches difference from the size of the rotor to the size of the outer framework. This is accomplished by not having a laminated core extending from the top of the rotor to the bottom. The coil has a 2 stage latching mechanism that will lock the coil assembly in either the out (and not used) position or the in (and operational) position. The latch is controlled by the central processor, and the movement of the coils assembly is accomplished by the coils themselves, timed by the position of the magnets to be either continually attracting towards the rotor, to move them into the path of the magnets in operational mode, or by continually opposing the magnets to make the coil assembly retract away from the magnets' path, to place them in a standby mode and not be used. In this version the control electronics and the power electronics are located inward of the coil assemblies and towards the center of the rotor. This allows for a more compact motor and connection to the frame for the electronics to mate with the frame webbing and conduct heat to the liquid cooled frame webbings.

The description vectors were extended to encompass not just a single stator coil and its power circuitry, but to specify all the essential design variables of the complete motor. Macros were developed to translate this description vector into a complete representation in Maxwell 3D (building on the existing macros that create individual coils). Additionally, a perturbative scheme was implemented as described above with respect to the master simulation control program. The speed with which the perturbation converged was evaluated to determine an appropriate cut-off. Finally, the results of the existing modeling technique were compared with the whole motor technique for representative configurations and it was verified that the improved accuracy warrants the additional computational overhead.

| Table of Abbreviations | |
|---|---|
| 3PIM | three phase induction motor |
| AC | alternating current |
| BDCM | brushless DC motor |
| DC | direct current |
| DEG | digital electric generator |
| DEM | digital electric motor |
| EV | electric vehicle |
| FPGA | field programmable gate array |
| IGBT | insulated gate bipolar transistor |
| LUT | look-up table |
| MS | model system |
| PWM | pulse width modulation |
| RPM | rotations per minute |
| SRM | switched reluctance motor |
| ZEV | zero emission vehicle |

While the embodiments shown and described herein are fully capable of achieving the objects of the subject invention, it is evident that numerous alternatives, modifications, and variations will be apparent to those skilled in the art in light of the foregoing description. These alternatives, modifications, and variations are within the scope of the subject invention, and it is to be understood that the embodiments described herein are shown only for the purpose of illustration and not for the purpose of limitation.

What is claimed is:

1. A system for controlling an electric motor comprising a rotor, comprising:
    an encoder;
    a central processor in communication with said encoder;
    a module processor in communication with said central processor; and
    feedback circuitry in communication with said module processor;
    wherein said electric motor detects and tracks position of said rotor with resolution not exceeding one eighth of one degree.

2. A system as in claim 1, wherein said encoder is an electronic device that provides rotor and stator positional information to said central processor.

3. A system as in claim 1, further comprising a user interface in communication with said central processor, wherein said user interface enables a user to select preferred operational parameters for an electric motor.

4. A system as in claim 1, wherein said central processor receives rotor and stator positional information from said encoder and rpm values, and transmits differences in latency to said module processor.

5. A system as in claim 1, wherein said module processor receives data from said central processor and, based on said data, controls one or more coils of an electric motor.

6. A system as in claim 1, wherein said feedback circuitry receives data comprising temperature and individual coil conditions and transmits it to said module processor.

7. A system as in claim 1, wherein said central processor comprises a field programmable gate array.

8. A system as in claim 1, further comprising one or more H-bridge circuits in communication with said feedback circuitry.

9. A system as in claim 1, wherein said feedback circuitry receives data comprising temperature and coil conditions and transmits it to said module processor, said coil conditions comprising at least one of: coil position, coil angular velocity, and coil state.

10. A method for controlling an electric motor, comprising:
    determining rotor position with resolution within one eighth of one degree, based on data received from an encoder;
    determining how to energize stator coils; and
    directing a power module to provide appropriate current to appropriate coils; and monitoring rotor response.

11. A method as in claim 10, wherein said step of determining how to energize stator coils comprises consulting a look-up table.

12. A method as in claim 10, wherein said step of determining how to energize stator coils comprises determining which coils to energize.

13. A method as in claim 10, wherein said step of determining how to energize stator coils comprises determining which coils to energize at what times.

14. A method as in claim 10, wherein said step of determining how to energize stator coils comprises determining which coils to energize with how much power.

* * * * *